US012242259B2

(12) United States Patent
Elbsat et al.

(10) Patent No.: US 12,242,259 B2
(45) Date of Patent: Mar. 4, 2025

(54) MODEL PREDICTIVE MAINTENANCE SYSTEM WITH EVENT OR CONDITION BASED PERFORMANCE

(71) Applicant: Johnson Controls Technology Company, Auburn Hills, MI (US)

(72) Inventors: Mohammad N. Elbsat, Milwaukee, WI (US); Michael J. Wenzel, Oak Creek, WI (US); Farhad Balali, Milwaukee, WI (US); Robert D. Turney, Watertown, WI (US)

(73) Assignee: Tyco Fire & Security GmbH

( * ) Notice: Subject to any disclaimer, the term of this patent is extended or adjusted under 35 U.S.C. 154(b) by 441 days.

(21) Appl. No.: 16/943,781

(22) Filed: Jul. 30, 2020

(65) Prior Publication Data
US 2020/0356087 A1 Nov. 12, 2020

Related U.S. Application Data

(63) Continuation-in-part of application No. 16/899,220, filed on Jun. 11, 2020, which is a continuation-in-part
(Continued)

(51) Int. Cl.
*G05B 23/02* (2006.01)
*G16Y 10/80* (2020.01)
(Continued)

(52) U.S. Cl.
CPC ....... *G05B 23/0283* (2013.01); *G05B 23/024* (2013.01); *G16Y 10/80* (2020.01);
(Continued)

(58) Field of Classification Search
CPC ............ G05B 23/0283; G05B 23/0294; G06Q 30/0206; G06Q 10/20
(Continued)

(56) References Cited

U.S. PATENT DOCUMENTS 5,216,612 A 6/1993 Cornett et al.
5,630,070 A 5/1997 Dietrich et al.
(Continued)

FOREIGN PATENT DOCUMENTS

CA 2499695 4/2004
CN 104833063 A 8/2015
(Continued)

OTHER PUBLICATIONS

Extended European Search Report on EP 18806317.6, dated Jun. 17, 2021, 10 pages.
(Continued)

*Primary Examiner* — Juan C Ochoa
(74) *Attorney, Agent, or Firm* — Foley & Lardner LLP

(57) ABSTRACT

A model predictive maintenance (MPM) system for building equipment includes one or more processing circuits including one or more processors and memory storing instructions that, when executed by the one or more processors, cause the one or more processors to perform operations. The operations include obtaining one or more performance indicators for the building equipment and determining whether a trigger condition has been satisfied based on the one or more performance indicators. The operations include triggering a model predictive maintenance process to generate a maintenance schedule for the building equipment in response to determining that the trigger condition has been satisfied. The operations include initiating a maintenance activity for the building equipment in accordance with the maintenance schedule.

19 Claims, 20 Drawing Sheets

Related U.S. Application Data of application No. 15/895,836, filed on Feb. 13, 2018, now Pat. No. 11,487,277.

(60) Provisional application No. 62/883,508, filed on Aug. 6, 2019, provisional application No. 62/511,113, filed on May 25, 2017.

(51) Int. Cl.
*G16Y 20/30* (2020.01)
*G16Y 40/20* (2020.01)
*G16Y 40/40* (2020.01)

(52) U.S. Cl.
CPC .............. *G16Y 20/30* (2020.01); *G16Y 40/20* (2020.01); *G16Y 40/40* (2020.01)

(58) Field of Classification Search
USPC ........................................................ 703/2, 6
See application file for complete search history.

(56) References Cited

U.S. PATENT DOCUMENTS

| | | | |
|---|---|---|---|
| 6,145,751 | A | 11/2000 | Ahmed |
| 7,062,361 | B1 | 6/2006 | Lane |
| 7,124,059 | B2 | 10/2006 | Wetzer et al. |
| 7,457,762 | B2 | 11/2008 | Wetzer et al. |
| 7,464,046 | B2 | 12/2008 | Wilson et al. |
| 7,693,735 | B2 | 4/2010 | Carmi et al. |
| 8,014,892 | B2 | 9/2011 | Glasser |
| 8,126,574 | B2 | 2/2012 | Discenzo et al. |
| 8,170,893 | B1 | 5/2012 | Rossi |
| 8,396,571 | B2 | 3/2013 | Costiner et al. |
| 8,880,962 | B2 | 11/2014 | Hosking et al. |
| 9,002,530 | B2 | 4/2015 | O'Connor et al. |
| 9,058,568 | B2 | 6/2015 | Hosking et al. |
| 9,058,569 | B2 | 6/2015 | Hosking et al. |
| 9,185,176 | B2 | 11/2015 | Nielsen et al. |
| 9,235,847 | B2 | 1/2016 | Greene et al. |
| 9,424,693 | B2 | 8/2016 | Rodrigues |
| 9,436,179 | B1 | 9/2016 | Turney et al. |
| 9,514,577 | B2 | 12/2016 | Ahn et al. |
| 9,740,545 | B2 | 8/2017 | Aisu et al. |
| 9,760,068 | B2 | 9/2017 | Harkonen et al. |
| 9,945,264 | B2 | 4/2018 | Wichmann et al. |
| 10,094,586 | B2 * | 10/2018 | Pavlovski ............ G05B 13/048 |
| 10,101,731 | B2 | 10/2018 | Asmus et al. |
| 10,175,681 | B2 | 1/2019 | Wenzel et al. |
| 10,359,748 | B2 | 7/2019 | Elbsat et al. |
| 10,389,136 | B2 | 8/2019 | Drees |
| 10,437,241 | B2 | 10/2019 | Higgins et al. |
| 10,438,303 | B2 | 10/2019 | Chen et al. |
| 10,554,170 | B2 | 2/2020 | Drees |
| 10,564,610 | B2 | 2/2020 | Drees |
| 10,591,875 | B2 | 3/2020 | Shanmugam et al. |
| 10,700,942 | B2 * | 6/2020 | Hamilton ............ H04L 41/147 |
| 10,761,547 | B2 | 9/2020 | Risbeck et al. |
| 10,762,475 | B2 | 9/2020 | Song et al. |
| 10,817,530 | B2 | 10/2020 | Siebel et al. |
| 10,876,755 | B2 | 12/2020 | Martin |
| 11,003,175 | B2 | 5/2021 | Xenos et al. |
| 2002/0072988 | A1 | 6/2002 | Aram |
| 2003/0158803 | A1 | 8/2003 | Darken et al. |
| 2004/0049295 | A1 | 3/2004 | Wojsznis et al. |
| 2005/0091004 | A1 | 4/2005 | Parlos et al. |
| 2007/0227721 | A1 | 10/2007 | Springer et al. |
| 2009/0112369 | A1 | 4/2009 | Gwerder et al. |
| 2009/0204267 | A1 | 8/2009 | Sustaeta et al. |
| 2009/0210081 | A1 | 8/2009 | Sustaeta et al. |
| 2009/0240381 | A1 | 9/2009 | Lane |
| 2010/0241285 | A1 | 9/2010 | Johnson et al. |
| 2010/0262298 | A1 | 10/2010 | Johnson et al. |
| 2011/0035328 | A1 | 2/2011 | Nielsen et al. |
| 2011/0093310 | A1 | 4/2011 | Watanabe et al. |
| 2011/0130857 | A1 | 6/2011 | Budiman et al. |
| 2011/0231320 | A1 | 9/2011 | Irving |
| 2012/0016607 | A1 | 1/2012 | Cottrell et al. |
| 2012/0036250 | A1 | 2/2012 | Vaswani et al. |
| 2012/0092180 | A1 | 4/2012 | Rikkola et al. |
| 2012/0245968 | A1 | 9/2012 | Beaulieu et al. |
| 2012/0259469 | A1 | 10/2012 | Ward et al. |
| 2012/0296482 | A1 | 11/2012 | Steven et al. |
| 2012/0310860 | A1 | 12/2012 | Kim et al. |
| 2012/0316906 | A1 | 12/2012 | Hampapur et al. |
| 2013/0006429 | A1 | 1/2013 | Shanmugam et al. |
| 2013/0020443 | A1 | 1/2013 | Dyckrup et al. |
| 2013/0085614 | A1 | 4/2013 | Wenzel et al. |
| 2013/0282195 | A1 | 10/2013 | O'Connor et al. |
| 2013/0339080 | A1 | 12/2013 | Beaulieu et al. |
| 2014/0163936 | A1 | 6/2014 | Hosking et al. |
| 2014/0201018 | A1 | 7/2014 | Chassin |
| 2014/0244051 | A1 | 8/2014 | Rollins et al. |
| 2014/0277756 | A1 | 9/2014 | Bruce et al. |
| 2014/0277769 | A1 | 9/2014 | Matsuoka et al. |
| 2014/0316973 | A1 | 10/2014 | Steven et al. |
| 2014/0358291 | A1 | 12/2014 | Wells |
| 2015/0008884 | A1 | 1/2015 | Waki et al. |
| 2015/0027681 | A1 | 1/2015 | Ragland et al. |
| 2015/0081107 | A1 | 3/2015 | Graham et al. |
| 2015/0311713 | A1 | 10/2015 | Asghari et al. |
| 2015/0316903 | A1 | 11/2015 | Asmus et al. |
| 2015/0316907 | A1 | 11/2015 | Elbsat et al. |
| 2015/0326015 | A1 | 11/2015 | Steven et al. |
| 2015/0331972 | A1 | 11/2015 | McClure et al. |
| 2015/0371328 | A1 | 12/2015 | Gabel et al. |
| 2016/0077880 | A1 | 3/2016 | Santos et al. |
| 2016/0092986 | A1 | 3/2016 | Lian et al. |
| 2016/0148137 | A1 | 5/2016 | Phan et al. |
| 2016/0148171 | A1 | 5/2016 | Phan et al. |
| 2016/0190805 | A1 | 6/2016 | Steven et al. |
| 2016/0216722 | A1 | 7/2016 | Tokunaga et al. |
| 2016/0218505 | A1 | 7/2016 | Krupadanam et al. |
| 2016/0246908 | A1 | 8/2016 | Komzsik |
| 2016/0275630 | A1 | 9/2016 | Strelec et al. |
| 2016/0281607 | A1 | 9/2016 | Asati et al. |
| 2016/0305678 | A1 | 10/2016 | Pavlovski et al. |
| 2016/0329708 | A1 | 11/2016 | Day |
| 2016/0356515 | A1 | 12/2016 | Carter |
| 2016/0363948 | A1 | 12/2016 | Steven et al. |
| 2016/0373453 | A1 | 12/2016 | Ruffner et al. |
| 2016/0379149 | A1 | 12/2016 | Saito et al. |
| 2017/0003667 | A1 | 1/2017 | Nakabayashi et al. |
| 2017/0083822 | A1 | 3/2017 | Adendorff et al. |
| 2017/0097647 | A1 | 4/2017 | Lunani et al. |
| 2017/0167742 | A1 | 6/2017 | Radovanovic et al. |
| 2017/0169143 | A1 | 6/2017 | Farahat et al. |
| 2017/0205818 | A1 | 7/2017 | Adendorff et al. |
| 2017/0236222 | A1 | 8/2017 | Chen et al. |
| 2017/0268795 | A1 | 9/2017 | Yamamoto et al. |
| 2017/0309094 | A1 | 10/2017 | Farahat et al. |
| 2017/0364043 | A1 | 12/2017 | Ganti et al. |
| 2017/0366414 | A1 | 12/2017 | Hamilton et al. |
| 2018/0004171 | A1 | 1/2018 | Patel et al. |
| 2018/0004172 | A1 | 1/2018 | Patel et al. |
| 2018/0046149 | A1 | 2/2018 | Ahmed |
| 2018/0082373 | A1 | 3/2018 | Hong et al. |
| 2018/0173214 | A1 | 6/2018 | Higgins et al. |
| 2018/0180314 | A1 | 6/2018 | Brisette et al. |
| 2018/0203961 | A1 | 7/2018 | Aisu et al. |
| 2018/0341255 | A1 | 11/2018 | Turney et al. |
| 2018/0373234 | A1 | 12/2018 | Khalate et al. |
| 2019/0066236 | A1 | 2/2019 | Wenzel |
| 2019/0129403 | A1 | 5/2019 | Turney et al. |
| 2019/0271978 | A1 | 9/2019 | Elbsat et al. |
| 2019/0295034 | A1 | 9/2019 | Wenzel et al. |
| 2019/0311332 | A1 | 10/2019 | Turney et al. |
| 2019/0325368 | A1 | 10/2019 | Turney et al. |
| 2019/0338972 | A1 | 11/2019 | Schuster et al. |
| 2019/0338973 | A1 | 11/2019 | Turney et al. |
| 2019/0338974 | A1 | 11/2019 | Turney et al. |
| 2019/0338977 | A1 | 11/2019 | Turney et al. |
| 2019/0347622 | A1 | 11/2019 | Elbsat et al. |
| 2019/0354071 | A1 | 11/2019 | Turney et al. |
| 2020/0019129 | A1 | 1/2020 | Sircar et al. |

(56) References Cited

U.S. PATENT DOCUMENTS

| | | |
|---|---|---|
| 2020/0088427 A1 | 3/2020 | Li et al. |
| 2020/0090289 A1 | 3/2020 | Elbsat et al. |
| 2020/0096985 A1 | 3/2020 | Wenzel et al. |
| 2020/0166230 A1 | 5/2020 | Ng et al. |
| 2020/0191427 A1 | 6/2020 | Martin |
| 2020/0200423 A1 | 6/2020 | Gervais |
| 2020/0284458 A1* | 9/2020 | Yoshida ............... F24F 11/77 |
| 2020/0301408 A1 | 9/2020 | Elbsat et al. |

FOREIGN PATENT DOCUMENTS

| | | |
|---|---|---|
| CN | 104850013 A | 8/2015 |
| CN | 105320118 A | 2/2016 |
| CN | 106817909 A | 6/2017 |
| CN | 109980638 A | 7/2019 |
| CN | 11895625 A | 11/2020 |
| EP | 3 447 258 A1 | 2/2019 |
| JP | 2001-357112 | 12/2001 |
| JP | 2003-141178 | 5/2003 |
| JP | 2005-148955 A | 6/2005 |
| JP | 2005-182465 | 7/2005 |
| JP | 2010-078447 A | 4/2010 |
| JP | 2012-073866 | 4/2012 |
| WO | WO-2011/072332 A1 | 6/2011 |
| WO | WO-2016/144586 | 9/2016 |
| WO | WO-2017/062896 A1 | 4/2017 |
| WO | WO-2018/217251 A1 | 11/2018 |

OTHER PUBLICATIONS

Freire et al., "Predictive controllers for thermal comfort optimization and energy savings," Energy and Buildings, 2008, vol. 40, No. 7, pp. 1353-1365.
Nwankpa et al., "Activation Functions: Comparison of Trends in Practice and Research for Deep Learning," Engineering, University of Strathclyde, Glasgow, UK, 2018, 20 pages.
Schiavon et al., "Dynamic predictive clothing insulation models based on outdoor air and indoor operative temperatures," 2013, Building and Environment, 59, pp. 250-260.
Shanker et al., "Effect of Data Standardization on Neural Network Training," Omega, Int. J. Mgmt. Sci., 1996, vol. 24, No. 4, pp. 385-397.
Srivastava et al., "Dropout: a simple way to prevent neural networks from overfitting," Journal of Machine Learning Research, 2014, vol. 15, No. 1, pp. 1929-1958.
Taleghani et al., "A review into thermal comfort in buildings," Renewable and Sustainable Energy Reviews, Oct. 2013, vol. 26, pp. 201-215.
Timplalexis et al., "Thermal Comfort Metabolic Rate and Clothing Inference," Centre for Research and Technology Hellas/Information Technologies Institute, Greece, Sep. 2019, pp. 690-699.
Weigel et al., "applying GIS and OR Techniques to Solve Sears Technician—Dispatching and Home Delivery Problems," Interface, Jan.-Feb. 1999, 29:1, pp. 112-130 (20 pages total).
International Search Report and Written Opinion on PCT/US2020/042916, dated Oct. 8, 2020, 14 pages.
International Search Report and Written Opinion on PCT/US2020/045238, dated Oct. 26, 2020, 14 pages.
International Search Report and Written Opinion on PCT/US2020/045237, dated Nov. 10, 2020, 18 pages.
Moon, Jin Woo, "Performance of ANN-based predictive and adaptive thermal-control methods for disturbances in and around residential buildings," Building and Environment, 2012, vol. 48, pp. 15-26.
U.S. Appl. No. 16/294,433, filed Mar. 6, 2019, Hitachi-Johnson Controls Air Conditioning, Inc.
Afram et al., "Artificial Neural Network (ANN) Based Model Predictive Control (MPC) and Optimization of HVAC Systems: A State of the Art Review and Case Study of a Residential HVAC System," Energy and Buildings, Apr. 15, 2017, 141, pp. 96-113.
Aynur, "Variable refrigerant flow systems: A review." Energy and Buildings, 2010, 42.7, pp. 1106-1112.
Chan et al., "Estimation of Degradation-Based Reliability in Outdoor Environments," Statistics Preprints, Jun. 19, 2001, 25, 33 pages.
Chu et al., "Predictive maintenance: The one-unit replacement model," International Journal of Production Economics, 1998, 54.3, pp. 285-295.
Chua et al., "Achieving better energy-efficient air conditioning—a review of technologies and strategies," Applied Energy, 2013, 104, pp. 87-104.
Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.
De Carlo et al., "Maintenance Cost Optimization in Condition Based Maintenance: A Case Study for Critical Facilities," International Journal of Engineering and Technology, Oct.-Nov. 2013, 5.5, pp. 4296-4302.
E Costa et al., "A multi-criteria model for auditing a Predictive Maintenance Programme," European Journal of Operational Research, Sep. 29, 2011, 217.2, pp. 381-393.
Emmerich et al., "State-of-the-Art Review of $CO_2$ Demand Controlled Ventilation Technology and Application," NISTIR, Mar. 2001, 47 pages.
Fu et al., "Predictive Maintenance in Intelligent-Control-Maintenance-Management System for Hydroelectric Generating Unit," IEEE Transactions on Energy Conversion, Mar. 2004, 19.1, pp. 179-186.
Fuller, Life-Cycle Cost Analysis (LCCA) I WBDG—Whole Building Design Guide, National Institute of Standards and Technology (NIST), https://www.wbdg.org/resources/life-cycle-cost-analysis-lcca, 2016, pp. 1-13.
Gedam, "Optimizing R&M Performance of a System Using Monte Carlo Simulation", 2012 Proceedings Annual Reliability and Maintainability Symposium, 2012, pp. 1-6.
Grall et al., "Continuous-Time Predictive-Maintenance Scheduling for a Deteriorating System," IEEE Transactions on Reliability, Jun. 2002, 51.2, pp. 141-150.
Hagmark, et. al., "Simulation and Calculation of Reliability Performance and Maintenance Costs", 2007 Annual Reliability and Maintainability Symposium, IEEE Xplore, 2007, pp. 34-40.
Hong et al. "Development and Validation of a New Variable Refrigerant Flow System Model in Energyplus," Energy and Buildings, 2016, 117, pp. 399-411.
Hong et al., "Statistical Methods for Degradation Data With Dynamic Covariates Information and an Application to Outdoor Weathering Data," Technometrics, Nov. 2014, 57.2, pp. 180-193.
International Search Report and Written Opinion on PCT/US2018/018039, dated Apr. 24, 2018, 14 pages.
JP2003141178 WIPO Translation, Accessed Feb. 18, 2020, 15 pages.
Kharoufeh et al., "Semi-Markov Models for Degradation-Based Reliability," IIE Transactions, May 2010, 42.8, pp. 599-612.
Li et al., "Reliability Modeling and Life Estimation Using an Expectation Maximization Based Wiener Degradation Model for Momentum Wheels" IEEE Transactions on Cybernetics, May 2015, 45.5, pp. 969-977.
Mohsenian-Rad et al., "Smart Grid for Smart city Activities in the California City of Riverside," In: Alberto Leon-Garcia et al.: "Smart City 360°", Aug. 6, 2016, 22 Pages.
Office Action on EP 18150740.1, dated Nov. 5, 2019, 6 pages.
Office Action on EP 18176474.7 dated Sep. 11, 2019. 5 pages.
Office Action on EP 18176474.7, dated Feb. 10, 2020, 6 pages.
Office Action on EP 18190786.6, dated Feb. 5, 2020, 4 pages.
Pan et al., "Reliability modeling of degradation of products with multiple performance characteristics based on gamma processes," Reliability Engineering & System Safety, 2011, 96.8, pp. 949-957.
Peng et al., "Bayesian Degradation Analysis with Inverse Gaussian Process Models Under Time-Varying Degradation Rates," IEEE Transactions on Reliability, Mar. 2017, 66.1, pp. 84-96.

(56) References Cited

OTHER PUBLICATIONS

Peng et al., "Bivariate Analysis of Incomplete Degradation Observations Based on Inverse Gaussian Processes and Copulas," IEEE Transactions on Reliability, Jun. 2016, 65.2, pp. 624-639.

Peng et al., "Switching State-Space Degradation Model with Recursive Filter/Smoother for Prognostics of Remaining Useful Life," IEEE Transactions on Industrial Informatics, Feb. 2019, 15.2, pp. 822-832.

Perez-Lombard et al., "A review on buildings energy consumption information," Energy and Buildings, 2008, 40.3, pp. 394-398.

Rahman et al., "Cost Estimation for Maintenance Contracts for Complex Asset/Equipment", 2008 IEEE International Conference on Industrial Engineering and Engineering Management, 2008, pp. 1355-1358.

Ruijters et. al., "Fault Maintenance Trees: Reliability Centered Maintenance via Statistical Model Checking", 2016 Annual Reliability and Maintainability Symposium (RAMS), Jan. 25-28, 2016, pp. 1-6.

Wan et al., "Data Analysis and Reliability Estimation of Step-Down Stress Accelerated Degradation Test Based on Wiener Process," Prognostics and System Health Management Conference (PHM—2014 Hunan), Aug. 2014, 5 pages.

Wang et al., "Reliability and Degradation Modeling with Random or Uncertain Failure Threshold," Reliability and Maintainability Symposium, 2007, pp. 392-397.

Xiao et al., "Optimal Design for Destructive Degradation Tests with Random Initial Degradation Values Using the Wiener Process," IEEE Transactions on Reliability, Sep. 2016, 65.3, pp. 1327-1342.

Xu et al., "Real-time Reliability Prediction for a Dynamic System Based on the Hidden Degradation Process Identification," IEEE Transactions on Reliability, Jun. 2008, 57.2, pp. 230-242.

Yang et al., "Thermal comfort and building energy consumption implications—a review," Applied Energy, 2014, 115, pp. 164-173.

Zhang et al., "A Novel Variable Refrigerant Flow (VRF) Heat Recovery System Model: Development and Validation," Energy and Buildings, Jun. 2018, 168, pp. 399-412.

Zhang et al., "An Age- and State-Dependent Nonlinear Prognostic Model for Degrading Systems," IEEE Transactions on Reliability, Dec. 2015, 64.4, pp. 1214-1228.

Zhang et al., "Analysis of Destructive Degradation Tests for a Product with Random Degradation Initiation Time," IEEE Transactions on Reliability, Mar. 2015, 64.1, pp. 516-527.

Zhou et al. "Asset Life Prediction Using Multiple Degradation Indicators and Lifetime Data: a Gamma-Based State Space Model Approach," 2009 8th International Conference on Reliability, Maintainability and Safety, Aug. 2009, 5 pages.

Zhou et al., "Reliability-centered predictive maintenance scheduling for a continuously monitored system subject to degradation," Reliability Engineering & System Safety, 2007, 92.4, pp. 530-534.

Doring, Matthias, "Prediction vs Forecasting: Predictions do not always concern the future . . . ," Data Science Blog, URL: https://www.datascienceblog.net/post/machine-learning/forecasting_vs_prediction/, 3 pages, Dec. 9, 2018, 3 pages.

Furuta et al., "Optimal Allocation of Fuzzy Controller and its rule tuning for Structural Vibration," Journal of Japan Society for Fuzzy Theory and Intelligent Informatics, Dec. 2008, vol. 20, No. 6 (pp. 921-934).

JP Office Action on JP 2020-107153, dated Oct. 5, 2021, 7 pages with English language translation.

JP Office Action on JP Appl. Ser. No. 2020-109855 dated Dec. 7, 2021 (10 pages).

International Preliminary Report on Patentability on PCT Appl. Ser. No. PCT/US2020/045238 dated Feb. 17, 2022 (8 pages).

International Preliminary Report on Patentability on PCT Appl. Ser. No. PCT/US2020/042916 dated Feb. 3, 2022 (8 pages).

International Preliminary Report on patentability on PCT Appl. Ser. No. PCT/US2020/045237 dated Feb. 17, 2022 (11 pages).

JP Office Action on JP Appl. Ser. No. 2020-109855 dated Jul. 12, 2022, with translation (7 pages).

Japanese Office Action on JP Appl. No. 2019-554919 dated Mar. 29, 2022 (9 pages with English language translation).

CN Office Action on CN Appl. Ser. No. 202080065078.5 dated Jan. 30, 2023 (13 pages).

EP Office Action on EP Appl. Ser. No. 18806317.6, dated Feb. 8, 2023 (8 pages).

Jakhrani et al., "Life Cycle Cost Analysis of a Standalone PV system," IEEE, 2012 International Conference in Green and Ubiquitous Technology (pp. 82-85).

CN Office Action for CN Appl. Ser. No. 202080065078.5 dated Aug. 10, 2023 (30 pages).

CN Office Action for CN Appl. Ser. No. 202080065078.5 dated Jan. 31, 2024 (32 pages).

Japanese office Action for JP Appl. Ser. No. 2022-160166 dated Jan. 9, 2024 (8 pages).

Wikipedia Entry: "Correlation," https://en.wikipedia.org/w/index.php?title=Correlation&oldid=1114178034; printed on Oct. 10, 2022 (12 pages).

DE Office Action for DE Appl. Ser. No. 11 2020 003 719.3 dated Sep. 25, 2024 (16 pages).

Extended European Search Report on EP Appl. No. dated Oct. 24, 2024 (11 pages).

* cited by examiner

MODEL PREDICTIVE MAINTENANCE SYSTEM WITH EVENT OR CONDITION BASED PERFORMANCE

CROSS-REFERENCE TO RELATED PATENT APPLICATIONS

This application is a continuation-in-part of U.S. patent application Ser. No. 16/899,220, filed Jun. 11, 2020, which is a continuation-in-part of U.S. patent application Ser. No. 15/895,836 filed Feb. 13, 2018, which claims the benefit of and priority to U.S. Provisional Patent Application No. 62/511,113 filed May 25, 2017. U.S. patent application Ser. No. 16/899,220 also claims the benefit of and priority to U.S. Provisional Patent Application No. 62/883,508 filed Aug. 6, 2019. The entire disclosures of each of these patent applications are incorporated by reference herein.

BACKGROUND

The present disclosure relates generally to control systems for building equipment. The present disclosure relates more particularly to control systems that use predictive modeling to determine an optimal operating strategy and maintenance strategy for building equipment.

Building equipment operate to affect various conditions in a building such as temperature, humidity, air quality, lighting, etc. Building equipment degrade over time, as a result of operating the building equipment, which leads to reduced operating efficiency and increased power consumption and cost. Performing maintenance on building equipment can restore the equipment to a less degraded state and improve the operating efficiency and thus reduce operating cost. However, performing maintenance typically incurs a maintenance cost. Therefore, choosing to perform maintenance on the building equipment reduces ongoing operating cost as a result of reduced power consumption, but incurs an additional maintenance cost. Performing maintenance too frequently may result in a low operating cost but a high maintenance cost, whereas performing maintenance too infrequently may result in a low maintenance cost but a higher operating cost. It can be difficult to determine an appropriate maintenance strategy for building equipment in the interest of reducing total life cycle cost.

SUMMARY

One implementation of the present disclosure is a model predictive maintenance (MPM) system for building equipment, according to some embodiments. In some embodiments, the MPM system includes one or more processing circuits. In some embodiments, the one or more processing circuits include one or more processors and memory storing instructions that, when executed by the one or more processors, cause the one or more processors to perform operations. In some embodiments, the operations include obtaining one or more performance indicators for the building equipment. In some embodiments, the operations include determining whether a trigger condition has been satisfied based on the one or more performance indicators. In some embodiments, the operations include triggering a model predictive maintenance process to generate a maintenance schedule for the building equipment in response to determining that the trigger condition has been satisfied. In some embodiments, the operations include initiating a maintenance activity for the building equipment in accordance with the maintenance schedule.

In some embodiments, the one or more performance indicators include at least one of an estimated current degradation of the building equipment, a predicted future degradation of the building equipment, or a performance variable of the building equipment. In some embodiments, the operations further include comparing the estimated current degradation, the predicted future degradation, or the performance variable of the building equipment to a corresponding threshold. In some embodiments, the operations further include determining that the trigger condition has been satisfied in response to the estimated current degradation, the predicted future degradation, or the performance variable crossing the corresponding threshold.

In some embodiments, the one or more performance indicators include a rate of change of at least one of an estimated current degradation of the building equipment, a predicted future degradation of the building equipment, or a performance variable of the building equipment. In some embodiments, the operations further include comparing the rate of change of the estimated current degradation, the predicted future degradation, or the performance variable of the building equipment to a corresponding threshold rate of change. In some embodiments, the operations further include determining that the trigger condition is satisfied in response to the rate of change of the estimated current degradation, the predicted future degradation, or the performance variable crossing the corresponding threshold rate of change.

In some embodiments, the operations further include determining a variance or a covariance of the performance indicators. In some embodiments, the operations further include comparing the variance or covariance to a corresponding variance or covariance threshold. In some embodiments, the method further includes determining that the trigger condition is satisfied in response to the variance or the covariance and the corresponding variance or covariance threshold.

In some embodiments, the one or more performance indicators include a previously predicted future degradation of the building equipment and an estimated current degradation of the building equipment. In some embodiments, the operations further include determining a difference between the previously predicted future degradation of the building equipment and the estimated current degradation of the building equipment for a corresponding time step. In some embodiments, the operations further include comparing the difference to a corresponding difference threshold. In some embodiments, the operations further include determining that the trigger condition is satisfied in response to the difference and the corresponding difference threshold.

In some embodiments, the operations further include receiving an output of a fault detector. In some embodiments, the fault detector is configured to receive time series data and perform at least one of a peer detection method, a temporal detection method, and an artificial intelligence detection method to generate the output. In some embodiments, the operations also include determining that the trigger condition is satisfied in response to the output indicating a fault of the building equipment.

In some embodiments, the model predictive maintenance process includes predicting a resource consumption of the building equipment over an optimization period as a function of an estimated degradation state of the building equipment. In some embodiments, the model predictive maintenance process further includes defining a cost of operating the building equipment over the optimization period as a function of the predicted energy consumption. In some embodiments, the model predictive maintenance process further includes defining a cost of performing maintenance on the building equipment over the optimization period as a function the maintenance schedule for the building equipment. In some embodiments, the model predictive maintenance process further includes optimizing an objective function including the cost of operating the building equipment and the cost of performing maintenance on the building equipment to determine the maintenance schedule.

Another implementation of the present disclosure is a method for determining optimal maintenance of building equipment. In some embodiments, the method includes obtaining one or more performance indicators for the building equipment. In some embodiments, the method includes determining whether a trigger condition has been satisfied based on the one or more performance indicators. In some embodiments, the method includes triggering a model predictive maintenance process to generate a maintenance schedule for the building equipment in response to determining that the trigger condition has been satisfied. In some embodiments, the method includes initiating a maintenance activity for the building equipment in accordance with the maintenance schedule.

In some embodiments, the one or more performance indicators include at least one of an estimated current degradation of the building equipment, a predicted future degradation of the building equipment, or a performance variable of the building equipment. In some embodiments, the method further includes comparing the estimated current degradation, the predicted future degradation, or the performance variable of the building to a corresponding threshold. In some embodiments, the method further includes determining that the trigger condition has been satisfied in response to the estimated current degradation, the predicted future degradation, or the performance variable crossing the corresponding threshold.

In some embodiments, the one or more performance indicators include a rate of change of at least one of an estimated current degradation of the building equipment, a predicted future degradation of the building equipment, or a performance variable of the building equipment. In some embodiments, the method further includes comparing the rate of change of the estimated current degradation, the predicted future degradation, or the performance variable of the building equipment to a corresponding threshold rate of change. In some embodiments, the method further includes determining that the trigger condition has been satisfied in response to the rate of change of the estimated current degradation, the predicted future degradation, or the performance variable crossing the corresponding threshold rate of change.

In some embodiments, the method further includes determining a variance or a covariance of the performance indicators of the building equipment. In some embodiments, the method includes comparing the variance or covariance to a corresponding variance or covariance threshold. In some embodiments, the method includes determining that the trigger condition is satisfied in response to the variance or the covariance crossing the corresponding variance or covariance threshold.

In some embodiments, the one or more performance indicators include a previously predicted future degradation of the building equipment and an estimated current degradation of the building equipment. In some embodiments, the method further includes determining a difference between the predicted future degradation of the building equipment and the estimated current degradation of the building equipment for a corresponding time step. In some embodiments, the method includes comparing the difference to a corresponding difference threshold. In some embodiments, the method includes determining that the trigger condition is satisfied in response to the difference crossing the corresponding difference threshold.

In some embodiments, the method further includes receiving an output of a fault detector. In some embodiments, the fault detector is configured to receive time series data and perform at least one of a peer detection method, a temporal detection method, and an artificial intelligence detection method to generate the output. In some embodiments, the method includes determining that the trigger condition is satisfied in response to the output indicating a fault of the building equipment.

In some embodiments, the model predictive maintenance process includes predicting an energy consumption of the building equipment over an optimization period as a function of an estimated efficiency of the building equipment. In some embodiments, the process includes defining a cost of operating the building equipment over the optimization period as a function of the predicted energy consumption. In some embodiments, the process includes defining a cost of performing maintenance on the building equipment over the optimization period as a function of an estimated reliability of the building equipment. In some embodiments, the process includes optimizing an objective function including the cost of operating the building equipment and the cost of performing maintenance on the building equipment to determine the maintenance schedule.

Another implementation of the present disclosure is a model predictive maintenance (MPM) controller for building equipment, according to some embodiments. In some embodiments, the MPM controller includes one or more processing circuits including one or more processors and memory storing instructions that, when executed by the one or more processors, cause the one or more processors to perform operations. In some embodiments, the operations include determining whether a trigger condition has been satisfied based on one or more time-varying inputs to the MPM controller. In some embodiments, the operations include triggering a model predictive maintenance process to generate a maintenance schedule for the building equipment in response to determining that the trigger condition has been satisfied. In some embodiments, the operations include initiating a maintenance activity for the building equipment in accordance with the maintenance schedule.

In some embodiments, the one or more time-varying inputs include at least one of an estimated current degradation of the building equipment, a predicted future degradation of the building equipment, or a performance variable of the building equipment. In some embodiments, the operations further include comparing the estimated current degradation, the predicted future degradation, or the performance variable of the building to a corresponding threshold. In some embodiments, the operations further include determining that the trigger condition is satisfied in response to the comparison between the estimated current degradation, the predicted future degradation, or the performance variable crossing the corresponding threshold.

In some embodiments, the one or more time-varying inputs include a rate of change of at least one of an estimated current degradation of the building equipment, a predicted future degradation of the building equipment, or a performance variable of the building equipment. In some embodiments, the operations further include comparing the rate of change of the estimated current degradation, the predicted future degradation, or the performance variable of the building equipment to a corresponding threshold rate of change. In some embodiments, the operations further include determining that the trigger condition is satisfied in response to the comparison between the rate of change of the estimated current degradation, the predicted future degradation, or the performance variable crossing the corresponding threshold rate of change.

In some embodiments, the operations further include determining a variance or a covariance of the time-varying inputs. In some embodiments, the operations further include comparing the variance or covariance to a corresponding variance or covariance threshold. In some embodiments, the operations further include determining that the trigger condition is satisfied in response to the variance or the covariance crossing the corresponding variance or covariance threshold.

In some embodiments, the one or more time-varying inputs include a previously predicted future degradation of the building equipment and an estimated current degradation of the building equipment. In some embodiments, the operations further include determining a difference between the previously predicted future degradation of the building equipment and the estimated current degradation of the building equipment for a corresponding time step. In some embodiments, the operations further include comparing the difference to a corresponding difference threshold. In some embodiments, the operations further include determining that the trigger condition is satisfied in response to the difference crossing the corresponding difference threshold.

In some embodiments, the operations further include receiving an output of a fault detector. In some embodiments, the fault detector is configured to receive time series data and perform at least one of a peer detection method, a temporal detection method, and an artificial intelligence detection method to generate the output. In some embodiments, the operations include determining that the trigger condition is satisfied in response to the output indicating a fault of the building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
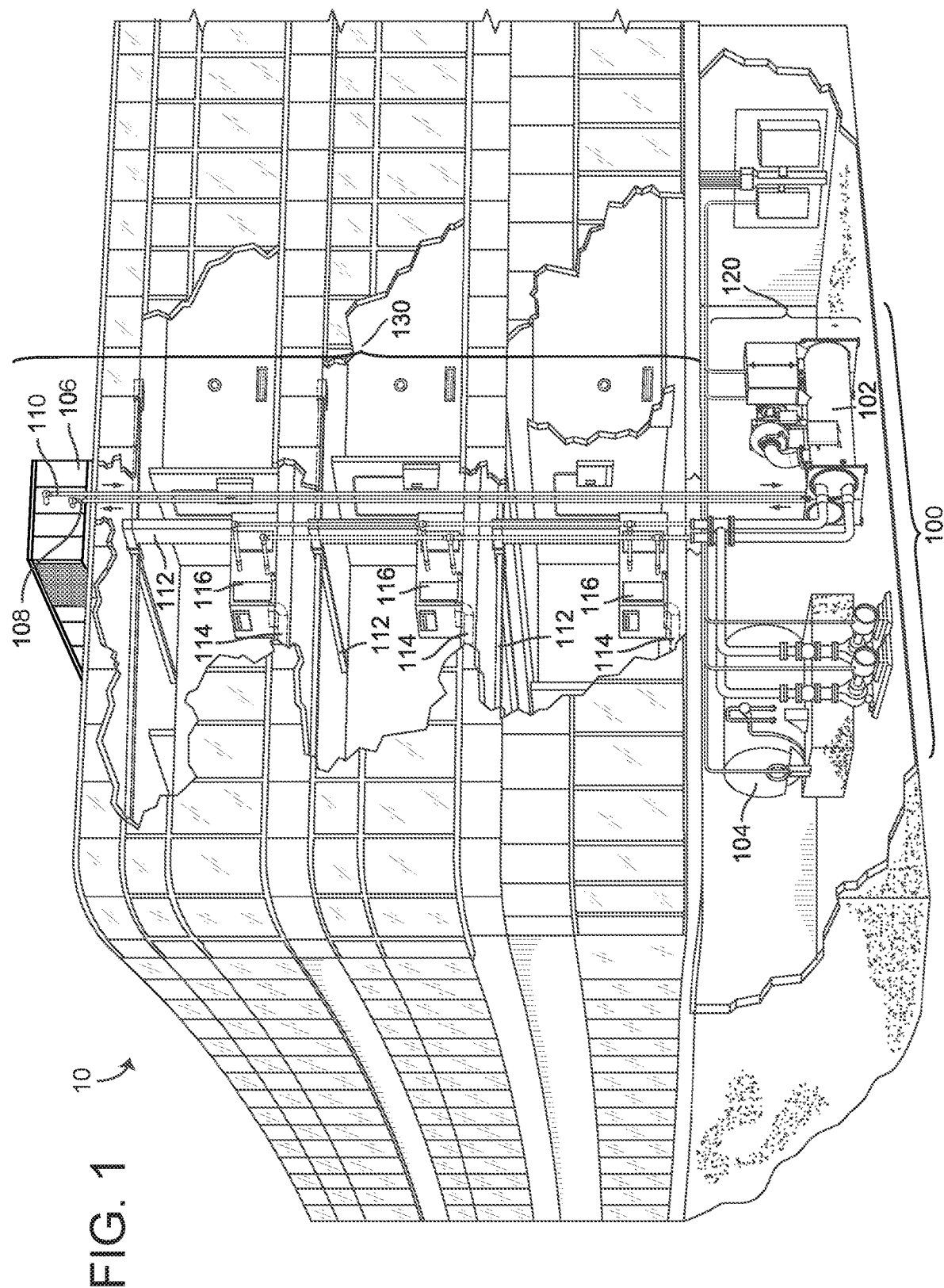
FIG. 1 is an illustration of a building equipped with a HVAC system, according some embodiments.

Referring generally to the FIGURES, systems and methods for performing model predictive maintenance (MPM) are shown, according to some embodiments. MPM can be performed for building equipment of a building to determine a maintenance and replacement strategy for the building equipment.

In order to optimize the scheduling of maintenance it is necessary to understand how degradation effects the performance of equipment. The mapping between degradation and performance can be nonlinear and have no known model form that would lend itself well to gray-box modeling. The systems and methods described herein provide a model that maps equipment degradation to operating performance using artificial intelligence (AI). Operating performance can be characterized by a model that relates the amount of resources consumed by the equipment (e.g., electricity, water, natural gas, etc.) to the amount of output resources produced by the equipment (e.g., hot water, cold water, heating load, cooling load, etc.) at a given time. Such a model can be characterized by a vector of model coefficients or parameters. The coefficients or parameters of the model may change as the equipment degrades. Accordingly, examining the relationship between degradation and model coefficients may allow for a mapping to be generated therebetween.

One example of a system in which the systems and methods of the present disclosure can be implemented is a variable refrigerant flow (VRF) system that consumes electric power to serve a heating or cooling load. A power consumption model can be used to relate the amount of power consumed by the VRF equipment to the amount of heating or cooling produced by the VRF equipment. An artificial neural network model is trained to predict values of coefficients of the power consumption model as a function of degradation state. To generate training data for the neural network model, both the degradation state and the power consumption can be estimated by the measurements collected from the VRF system. Once the neural network has been trained, the neural network can be used to predict power model coefficients as a function of the current degradation state. The power model coefficients are then used to predict the power consumption of the equipment during operation.

The predicted power consumption (or other resource consumption) can be used to perform a model predictive maintenance process to determine an optimal set of operating decisions and maintenance decisions for the equipment over a given time period. These and other features of the model predictive maintenance system are described in detail below.

In some embodiments, the MPM systems and methods are performed periodically for a building. In some embodiments, the MPM systems and methods can be performed in an event or condition driven manner. For example, various performance indicators (e.g., degradation estimations and/or predictions, fault detection, performance variables, etc.) can be monitored and used to determine if one or more events have occurred or if conditions have been satisfied. In response to the events occurring or the conditions being satisfied, the systems and methods for MPM may be initiated to determine optimal maintenance of building equipment. In some embodiments, the event or condition driven initiation of MPM results in MPM being performed at non-scheduled intervals. In some embodiments, MPM is initiated in response to a user input.

Building HVAC Systems and Building Management Systems

Figure 2:
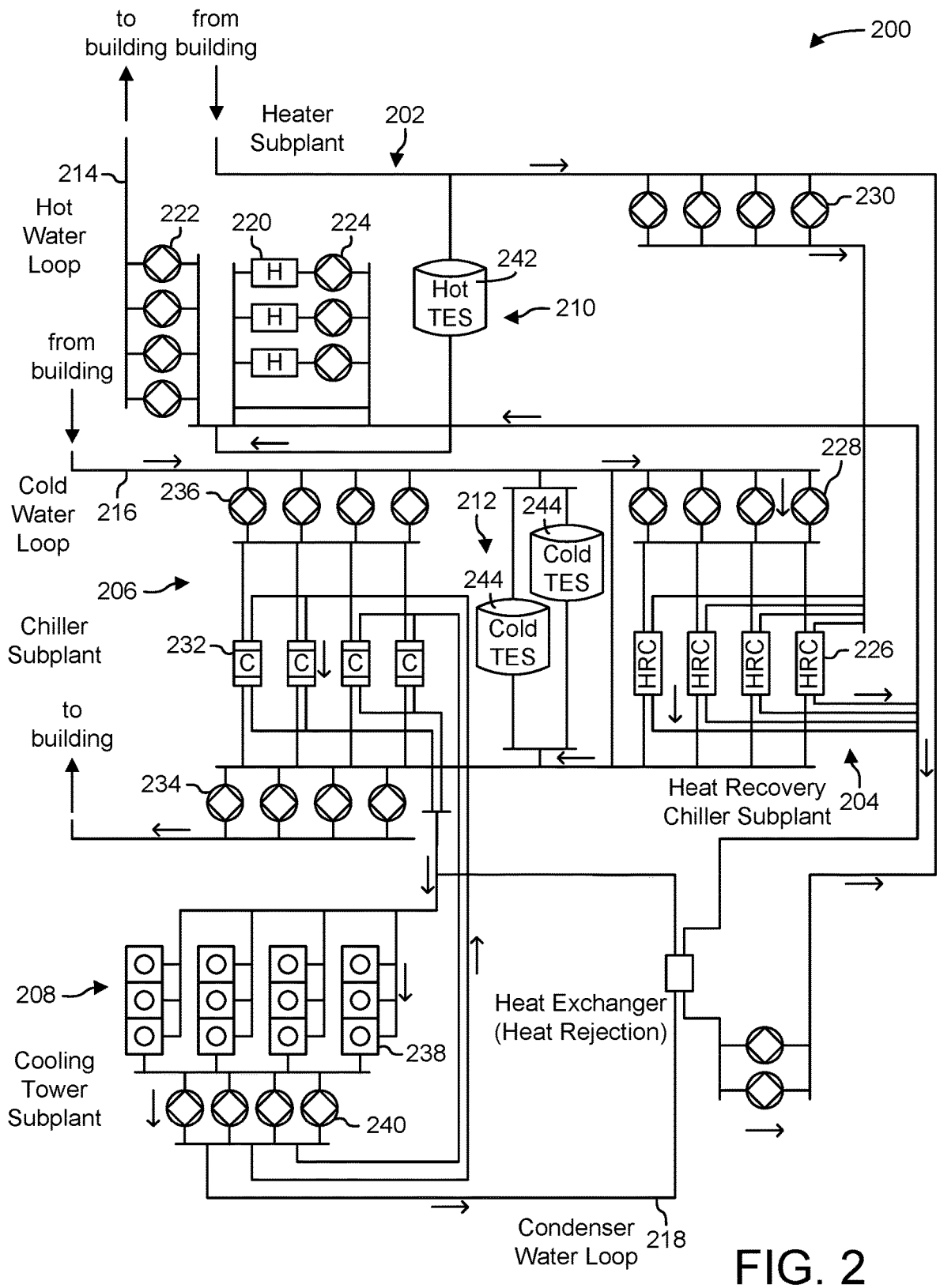
FIG. 2 is a block diagram of a waterside system that may be used in conjunction with the building of FIG. 1, according to some embodiments.
Figure 3:
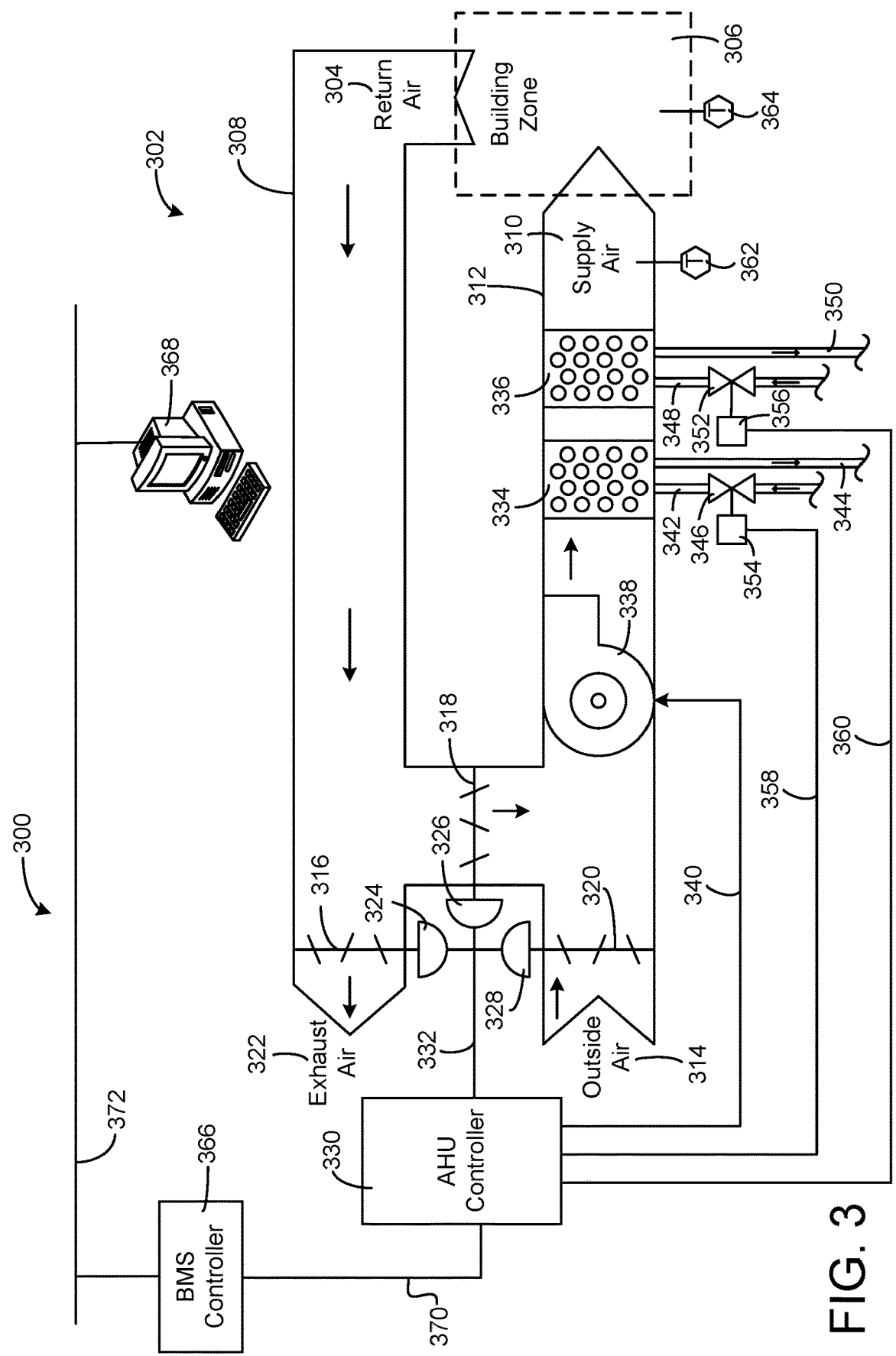
FIG. 3 is a block diagram of an airside system that may be used in conjunction with the building of FIG. 1, according to some embodiments.
Figure 4:
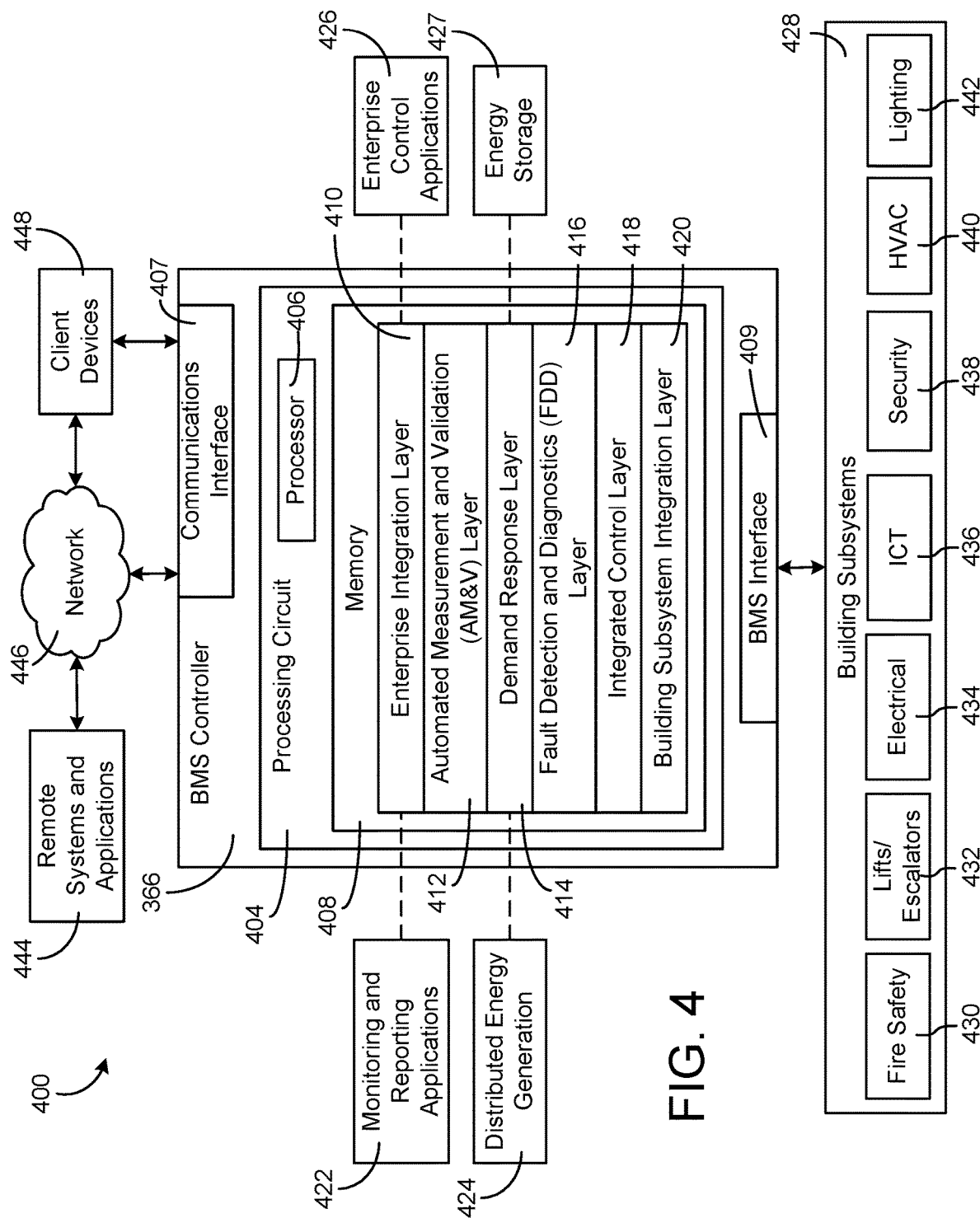
FIG. 4 is a block diagram of a building management system (BMS) which can be used to monitor and control the building of FIG. 1, according to some embodiments.
Figure 5:
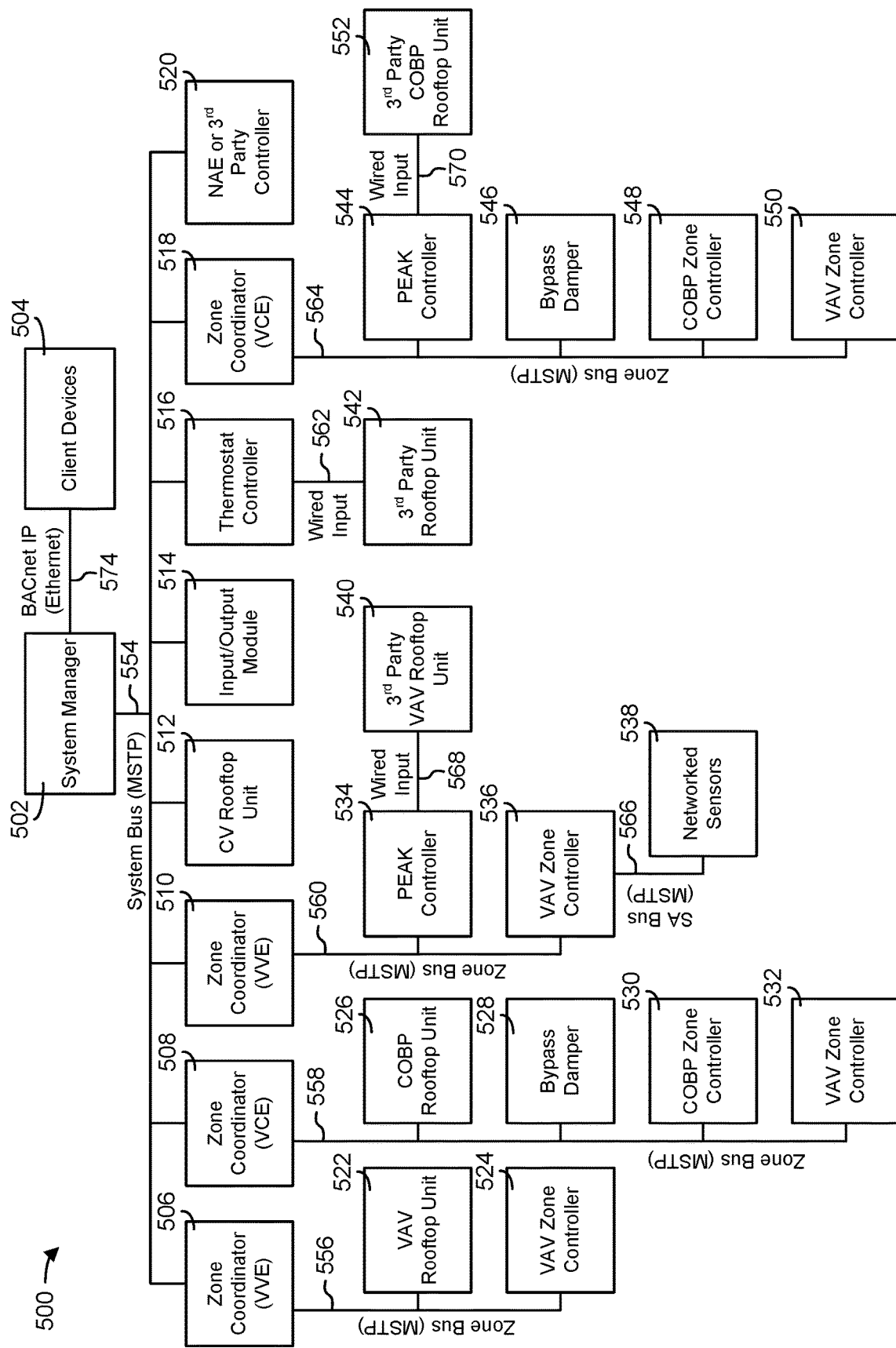
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314.

AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Model Predictive Maintenance System

Figure 6:
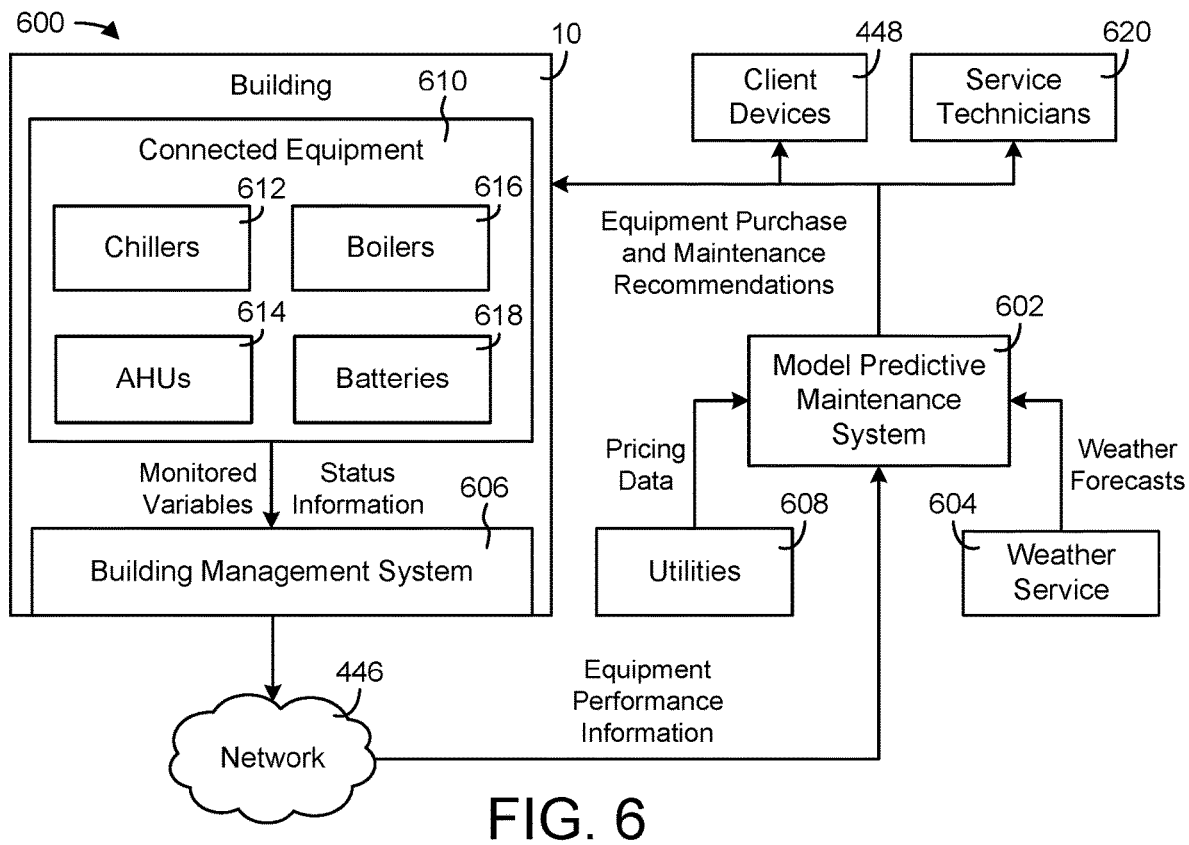
FIG. 6 is a block diagram of a building system including a model predictive maintenance (MPM) system that monitors equipment performance information from connected equipment installed in the building, according to some embodiments.

Referring now to FIG. 6, a block diagram of a building system 600 is shown, according to an exemplary embodiment. System 600 may include many of the same components as BMS 400 and BMS 500 as described with reference to FIGS. 4-5. For example, system 600 is shown to include building 10, network 446, and client devices 448. Building 10 is shown to include connected equipment 610, which can include any type of equipment used to monitor and/or control building 10. Connected equipment 610 can include connected chillers 612, connected AHUs 614, connected boilers 616, connected batteries 618, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Figure 7:
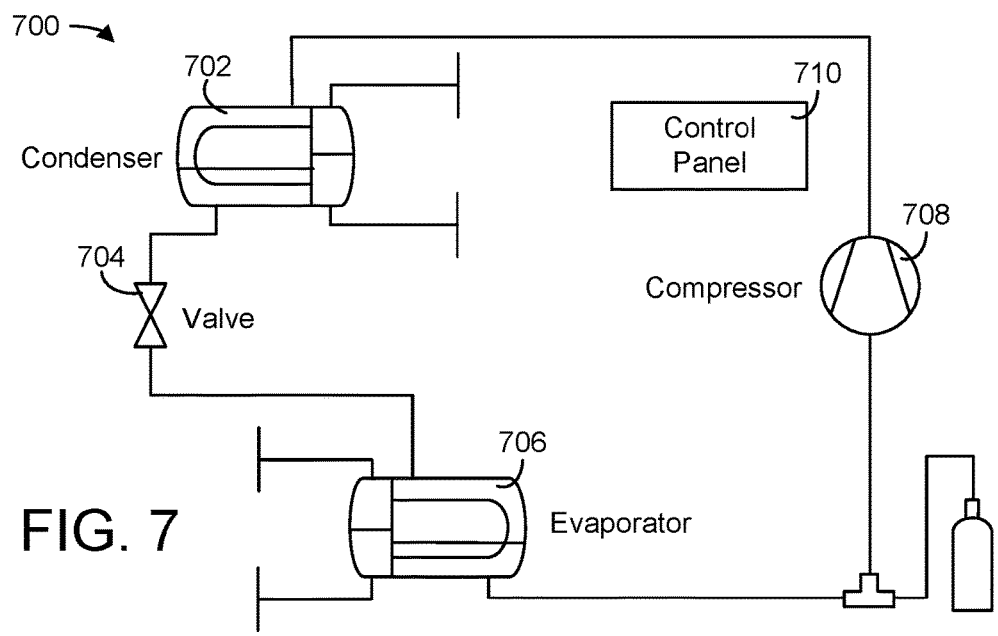
FIG. 7 is a schematic diagram of a chiller which may be a type of connected equipment that provides equipment performance information to the MPM system of FIG. 6, according to some embodiments.

Connected equipment 610 can be outfitted with sensors to monitor various conditions of the connected equipment 610 (e.g., power consumption, on/off states, operating efficiency, etc.). For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 700 which can be used as one of chillers 612 is shown in FIG. 7. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 can monitor and report variables that characterize the performance of the connected equipment 610. Each monitored variable can be forwarded to building management system 606 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, or any other information that indicates the current status of connected equipment 610. In some embodiments, each device of connected equipment 610 includes a control panel (e.g., control panel 710 shown in FIG. 7). Control panel 710 can be configured to collect monitored variables and equipment status information from connected equipment 610 and provide the collected data to BMS 606. For example, control panel 710 can compare the sensor data (or a value derived from the sensor data) to predetermined thresholds. If the sensor data or calculated value crosses a safety threshold, control panel 710 can shut down the device. Control panel 710 can generate a data point when a safety shut down occurs. The data point can include a safety fault code which indicates the reason or condition that triggered the shutdown.

Connected equipment 610 can provide monitored variables and equipment status information to BMS 606. BMS 606 can include a building controller (e.g., BMS controller 366), a system manager (e.g., system manager 503), a network automation engine (e.g., NAE 520), or any other system or device of building 10 configured to communicate with connected equipment 610. BMS 606 may include some or all of the components of BMS 400 or BMS 500, as described with reference to FIGS. 4-5. In some embodiments, the monitored variables and the equipment status information are provided to BMS 606 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled Water Temp, 7694, etc.). The point value can include an alphanumeric value indicating the current value of the data point.

BMS 606 can broadcast the monitored variables and the equipment status information to a model predictive maintenance system 602. In some embodiments, model predictive maintenance system 602 is a component of BMS 606. For example, model predictive maintenance system 602 can be implemented as part of a METASYS® brand building automation system, as sold by Johnson Controls Inc. In other embodiments, model predictive maintenance system 602 can be a component of a remote computing system or cloud-based computing system configured to receive and process data from one or more building management systems via network 446. For example, model predictive maintenance system 602 can be implemented as part of a PANOPTIX® brand building efficiency platform, as sold by Johnson Controls Inc. In other embodiments, model predictive maintenance system 602 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Model predictive maintenance (MPM) system 602 may use the monitored variables and/or the equipment status information to identify a current operating state of connected equipment 610. The current operating state can be examined by MPM system 602 to expose when connected equipment 610 begins to degrade in performance and/or to predict when faults will occur. In some embodiments, MPM system 602 uses the information collected from connected equipment 610 to estimate the reliability of connected equipment 610. For example, MPM system 602 can estimate a likelihood of various types of failures that could potentially occur based on the current operating conditions of connected equipment 610 and an amount of time that has elapsed since connected equipment 610 has been installed and/or since maintenance was last performed. In some embodiments, MPM system 602 estimates an amount of time until each failure is predicted to occur and identifies a financial cost associated with each failure (e.g., maintenance cost, increased operating cost, replacement cost, etc.). MPM system 602 can use the reliability information and the likelihood of potential failures to predict when maintenance will be needed and to estimate the cost of performing such maintenance over a predetermined time period.

MPM system 602 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions. MPM system 602 can use a model predictive control technique to formulate an objective function which expresses the total cost as a function of these decisions, which can be included as decision variables in the objective function. MPM system 602 can optimize (i.e., minimize) the objective function using any of a variety of optimization techniques to identify the optimal values for each of the decision variables.

One example of an objective function which can be optimized by MPM system 602 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., \$/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

The first term in the objective function J represents the operating cost of connected equipment 610 over the duration of the optimization period. In some embodiments, the cost per unit of energy $C_{op,i}$ is received from a utility 608 as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of building 10. The heating or cooling load can be predicted by MPM system 602 as a function of building occupancy, the time of day, the day of the week, the current season, or other factors that can affect the heating or cooling load. In some embodiments, MPM system 602 uses weather forecasts from a weather service 604 to predict the heating or cooling load. The power consumption $P_{op,i}$ may also depend on the efficiency $\eta_i$ of connected equipment 610. For example, connected equipment 610 that operate at a high efficiency may consume less power $P_{op,i}$ to satisfy the same heating or cooling load relative to connected equipment 610 that operate at a low efficiency. In general, the power consumption $P_{op,i}$ of a particular device of connected equipment 610 can be modeled using the following equations:

$$P_{op,i} = \frac{P_{ideal,i}}{\eta_i}$$

$$P_{ideal,i} = f(\text{Load}_i)$$

where $\text{Load}_i$ is the heating or cooling load on the device at time step i (e.g., tons cooling, kW heating, etc.), $P_{ideal,i}$ is the value of the equipment performance curve (e.g., tons cooling, kW heating, etc.) for the device at the corresponding load point $\text{Load}_i$, and $\eta_i$ is the operating efficiency of the device at time step i (e.g., $0 \leq \eta_i \leq 1$). The function $f(\text{Load}_i)$ may be defined by the equipment performance curve for the device or set of devices represented by the performance curve.

In some embodiments, the equipment performance curve is based on manufacturer specifications for the device under ideal operating conditions. For example, the equipment performance curve may define the relationship between power consumption and heating/cooling load for each device of connected equipment 610. However, the actual performance of the device may vary as a function of the actual operating conditions. MPM system 602 can analyze the equipment performance information provided by connected equipment 610 to determine the operating efficiency $\eta_i$ for each device of connected equipment 610. In some embodiments, MPM system 602 uses the equipment performance information from connected equipment 610 to determine the actual operating efficiency $\eta_i$ for each device of connected equipment 610. MPM system 602 can use the operating efficiency $\eta_i$ as an input to the objective function J and/or to calculate the corresponding value of $P_{op,i}$.

Advantageously, MPM system 602 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function/captures each of these costs and can be optimized by MPM system 602 to determine the optimal set of maintenance and equipment purchase decisions (i.e., optimal values for the binary decision variables $B_{main,i}$ and $B_{cap,i}$) over the duration of the optimization period.

In some embodiments, MPM system 602 uses the equipment performance information from connected equipment 610 to estimate the reliability of connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance.

MPM system 602 may receive operating data from a plurality of devices of connected equipment 610 distributed across multiple buildings and can use the set of operating data (e.g., operating conditions, fault indications, failure times, etc.) to develop a reliability model for each type of equipment. The reliability models can be used by MPM system 602 to estimate the reliability of any given device of connected equipment 610 as a function of its current operating conditions and/or other extraneous factors (e.g., time since maintenance was last performed, geographic location, water quality, etc.). In some embodiments, MPM system 602 uses the estimated reliability of each device of connected equipment 610 to determine the probability that the device will require maintenance and/or replacement at each time step of the optimization period. MPM system 602 can use these probabilities to determine the optimal set of maintenance and equipment purchase decisions (i.e., optimal values for the binary decision variables $B_{main,i}$ and $B_{cap,i}$) over the duration of the optimization period.

In some embodiments, MPM system 602 generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the 25$^{th}$ time step of the optimization period, whereas a value of $B_{cap,25}=0$ may indicate that the new device should not be purchased at that time step.

Advantageously, the equipment purchase and maintenance recommendations generated by MPM system 602 are predictive recommendations based on the actual operating conditions and actual performance of connected equipment 610. The optimization performed by MPM system 602 weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by MPM system 602 may be specific to each group of connected equipment 610 in order to achieve the optimal cost. J for that specific group of connected equipment 610. The equipment-specific recommendations may result in a lower overall cost. J relative to generic preventive maintenance recommendations provided by an equipment manufacturer (e.g., service equipment every year) which may be sub-optimal for some groups of connected equipment 610 and/or some operating conditions.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

In some embodiments, MPM system 602 includes a data analytics and visualization platform. MPM system 602 may provide a web interface which can be accessed by service technicians 620, client devices 448, and other systems or devices. The web interface can be used to access the equipment performance information, view the results of the optimization, identify which equipment is in need of maintenance, and otherwise interact with MPM system 602. Service technicians 620 can access the web interface to view a list of equipment for which maintenance is recommended by MPM system 602. Service technicians 620 can use the equipment purchase and maintenance recommendations to proactively repair or replace connected equipment 610 in order to achieve the optimal cost predicted by the objective function J. These and other features of MPM system 602 are described in greater detail below.

Figure 8:
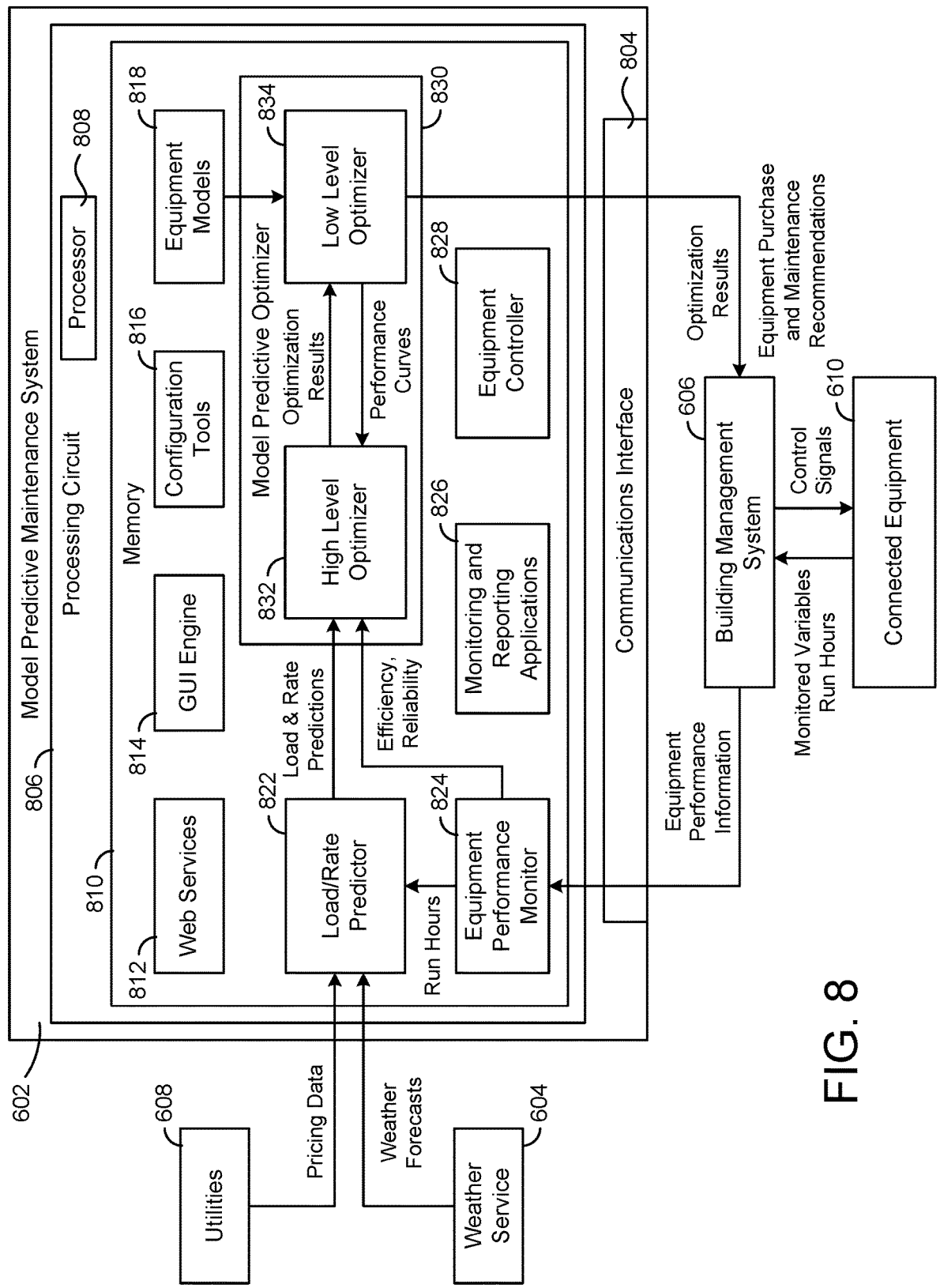
FIG. 8 is a block diagram illustrating the MPM system of FIG. 6 in greater detail, according to some embodiments.

Referring now to FIG. 8, a block diagram illustrating MPM system 602 in greater detail is shown, according to an exemplary embodiment. MPM system 602 is shown providing optimization results to a building management system (BMS) 606. BMS 606 can include some or all of the features of BMS 400 and/or BMS 500, as described with reference to FIGS. 4-5. The optimization results provided to BMS 606 may include the optimal values of the decision variables in the objective function/for each time step i in the optimization period. In some embodiments, the optimization results include equipment purchase and maintenance recommendations for each device of connected equipment 610.

BMS 606 may be configured to monitor the operation and performance of connected equipment 610. BMS 606 may receive monitored variables from connected equipment 610. Monitored variables can include any measured or calculated values indicating the performance of connected equipment 610 and/or the components thereof. For example, monitored variables can include one or more measured or calculated temperatures, pressures, flow rates, valve positions, resource consumptions (e.g., power consumption, water consumption, electricity consumption, etc.), control setpoints, model parameters (e.g., equipment model coefficients), or any other variables that provide information about how the corresponding system, device, or process is performing.

In some embodiments, the monitored variables indicate the operating efficiency $\eta_i$ of each device of connected equipment 610 or can be used to calculate the operating efficiency $\eta_i$. For example, the temperature and flow rate of chilled water output by a chiller can be used to calculate the cooling load (e.g., tons cooling) served by the chiller. The cooling load can be used in combination with the power consumption of the chiller to calculate the operating efficiency $\eta_i$ (e.g., tons cooling per kW of electricity consumed). BMS 606 may report the monitored variables to MPM system 602 for use in calculating the operating efficiency $\eta_i$ of each device of connected equipment 610.

In some embodiments, BMS 606 monitors the run hours of connected equipment 610. The run hours may indicate the number of hours within a given time period during which each device of connected equipment 610 is active. For example, the run hours for a chiller may indicate that the chiller is active for approximately eight hours per day. The run hours can be used in combination with the average power consumption of the chiller when active to estimate the total power consumption $P_{op,i}$ of connected equipment 610 at each time step i.

In some embodiments, BMS 606 monitors the equipment failures and fault indications reported by connected equipment 610. BMS 606 can record the times at which each failure or fault occurs and the operating conditions of connected equipment 610 under which the fault or failure occurred. The operating data collected from connected equipment 610 can be used by BMS 606 and/or MPM system 602 to develop a reliability model for each device of connected equipment 610. BMS 606 may provide the monitored variables, the equipment run hours, the operating conditions, and the equipment failures and fault indications to MPM system 602 as equipment performance information.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to MPM system 602. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate connected equipment 610 to affect the monitored conditions within the building and to serve the thermal energy loads of the building.

BMS 606 may provide control signals to connected equipment 610 specifying on/off states, charge/discharge rates, and/or setpoints for connected equipment 610. BMS 606 may control the equipment (e.g., via actuators, power relays, etc.) in accordance with the control signals to achieve setpoints for various building zones and/or devices of connected equipment 610. In various embodiments, BMS 606 may be combined with MPM system 602 or may be part of a separate building management system. According to an exemplary embodiment, BMS 606 is a METASYS® brand building management system, as sold by Johnson Controls, Inc.

MPM system 602 may monitor the performance of connected equipment 610 using information received from BMS 606. MPM system 602 may be configured to predict the thermal energy loads (e.g., heating loads, cooling loads, etc.) of the building for plurality of time steps in the optimization period (e.g., using weather forecasts from a weather service 604). MPM system 602 may also predict the cost of electricity or other resources (e.g., water, natural gas, etc.) using pricing data received from utilities 608. MPM system 602 may generate optimization results that optimize the economic value of operating, maintaining, and purchasing connected equipment 610 over the duration of the optimization period subject to constraints on the optimization process (e.g., load constraints, decision variable constraints, etc.). The optimization process performed by MPM system 602 is described in greater detail below.

According to an exemplary embodiment, MPM system 602 can be integrated within a single computer (e.g., one server, one housing, etc.). In various other exemplary embodiments, MPM system 602 can be distributed across multiple servers or computers (e.g., that can exist in distributed locations). In another exemplary embodiment, MPM system 602 may integrated with a smart building manager that manages multiple building systems and/or combined with BMS 606.

MPM system 602 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between MPM system 602 and various external systems or devices (e.g., BMS 606, connected equipment 610, utilities 510, etc.). For example, MPM system 602 may receive information from BMS 606 indicating one or more measured states of the controlled building (e.g., temperature, humidity, electric loads, etc.) and equipment performance information for connected equipment 610 (e.g., run hours, power consumption, operating efficiency, etc.). Communications interface 804 may receive inputs from BMS 606 and/or connected equipment 610 and may provide optimization results to BMS 606 and/or other external systems or devices. The optimization results may cause BMS 606 to activate, deactivate, or adjust a setpoint for connected equipment 610 in order to achieve the optimal values of the decision variables specified in the optimization results.

Still referring to FIG. 8, processing circuit 806 is shown to include a processor 808 and memory 810. Processor 808 may be a general purpose or specific purpose processor, an application specific integrated circuit (ASIC), one or more field programmable gate arrays (FPGAs), a group of processing components, or other suitable processing components. Processor 808 may be configured to execute computer code or instructions stored in memory 810 or received from other computer readable media (e.g., CDROM, network storage, a remote server, etc.).

Memory 810 may include one or more devices (e.g., memory units, memory devices, storage devices, etc.) for storing data and/or computer code for completing and/or facilitating the various processes described in the present disclosure. Memory 810 may include random access memory (RAM), read-only memory (ROM), hard drive storage, temporary storage, non-volatile memory, flash memory, optical memory, or any other suitable memory for storing software objects and/or computer instructions. Memory 810 may include database components, object code components, script components, or any other type of information structure for supporting the various activities and information structures described in the present disclosure. Memory 810 may be communicably connected to processor 808 via processing circuit 806 and may include computer code for executing (e.g., by processor 808) one or more processes described herein.

MPM system 602 is shown to include an equipment performance monitor 824. Equipment performance monitor 824 can receive equipment performance information from BMS 606 and/or connected equipment 610. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of connected equipment 610. In some embodiments, equipment performance monitor 824 uses the equipment performance information to calculate the current efficiency $\eta_i$ and reliability of each device of connected equipment 610. Equipment performance monitor 824 can provide the efficiency $\eta_i$ and reliability values to model predictive optimizer 830 for use in optimizing the objective function J.

Still referring to FIG. 8, MPM system 602 is shown to include a load/rate predictor 822. Load/rate predictor 822 may be configured to predict the energy loads ($Load_i$) (e.g., heating load, cooling load, electric load, etc.) of the building or campus for each time step i of the optimization period. Load/rate predictor 822 is shown receiving weather forecasts from a weather service 604. In some embodiments, load/rate predictor 822 predicts the energy loads $Load_i$ as a function of the weather forecasts. In some embodiments, load/rate predictor 822 uses feedback from BMS 606 to predict loads $Load_i$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 822 receives a measured electric load and/or previous measured load data from BMS 606 (e.g., via equipment performance monitor 824). Load/rate predictor 822 may predict loads Load$_i$ as a function of a given weather forecast ($\hat{\phi}_w$), a day type (day), the time of day (t), and previous measured load data ($Y_{i-1}$). Such a relationship is expressed in the following equation:

$$\text{Load}_i = f(\hat{\phi}_w, day, t | Y_{i-1})$$

In some embodiments, load/rate predictor 822 uses a deterministic plus stochastic model trained from historical load data to predict loads Load$_i$. Load/rate predictor 822 may use any of a variety of prediction methods to predict loads Load$_i$ (e.g., linear regression for the deterministic portion and an AR model for the stochastic portion). Load/rate predictor 822 may predict one or more different types of loads for the building or campus. For example, load/rate predictor 822 may predict a hot water load Load$_{Hot,i}$, a cold water load Load$_{Cold,i}$, and an electric load Load$_{Elec,i}$ for each time step i within the optimization period. The predicted load values Load$_i$ can include some or all of these types of loads. In some embodiments, load/rate predictor 822 makes load/rate predictions using the techniques described in U.S. patent application Ser. No. 14/717,593.

Load/rate predictor 822 is shown receiving utility rates from utilities 608. Utility rates may indicate a cost or price per unit of a resource (e.g., electricity, natural gas, water, etc.) provided by utilities 608 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 822.

In some embodiments, the utility rates include demand charges for one or more resources provided by utilities 608. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 830 may be configured to account for demand charges in the high level optimization process performed by high level optimizer 832. Utilities 608 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 822 may store the predicted loads Load$_i$ and the utility rates in memory 810 and/or provide the predicted loads Load$_i$ and the utility rates to model predictive optimizer 830.

Still referring to FIG. 8, MPM system 602 is shown to include a model predictive optimizer 830. Model predictive optimizer 830 can be configured to perform a multi-level optimization process to optimize the total cost associated with purchasing, maintaining, and operating connected equipment 610. In some embodiments, model predictive optimizer 830 includes a high level optimizer 832 and a low level optimizer 834. High level optimizer 832 may optimize the objective function J for an entire set of connected equipment 610 (e.g., all of the devices within a building) or for a subset of connected equipment 610 (e.g., a single device, all of the devices of a subplant or building subsystem, etc.) to determine the optimal values for each of the decision variables (e.g., $P_{op,i}$ and $B_{cap,i}$) in the objective function J. The optimization performed by high level optimizer 832 is described in greater detail with reference to FIG. 9.

In some embodiments, low level optimizer 834 receives the optimization results from high level optimizer 832. The optimization results may include optimal power consumption values $P_{op,i}$ and/or load values Load$_i$ for each device or set of devices of connected equipment at each time step i in the optimization period. Low level optimizer 834 may determine how to best run each device or set of devices at the load values determined by high level optimizer 832. For example, low level optimizer 834 may determine on/off states and/or operating setpoints for various devices of connected equipment 610 in order to optimize (e.g., minimize) the power consumption of connected equipment 610 meeting the corresponding load value Load$_i$.

Low level optimizer 834 may be configured to generate equipment performance curves for each device or set of devices of connected equipment 610. Each performance curve may indicate an amount of resource consumption (e.g., electricity use measured in kW, water use measured in L/s, etc.) by a particular device or set of devices of connected equipment 610 as a function of the load on the device or set of devices. In some embodiments, low level optimizer 834 generates the performance curves by performing a low level optimization process at various combinations of load points (e.g., various values of Load$_i$) and weather conditions to generate multiple data points. The low level optimization may be used to determine the minimum amount of resource consumption required to satisfy the corresponding heating or cooling load. An example of a low level optimization process which can be performed by low level optimizer 834 is described in detail in U.S. patent application Ser. No. 14/634,615 titled "Low Level Central Plant Optimization" and filed Feb. 27, 2015, the entire disclosure of which is incorporated by reference herein. Low level optimizer 834 may fit a curve to the data points to generate the performance curves.

In some embodiments, low level optimizer 834 generates equipment performance curves for a set of connected equipment 610 (e.g., a chiller subplant, a heater subplant, etc.) by combining efficiency curves for individual devices of connected equipment 610. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 818. For some devices, the device efficiency curves may indicate that resource consumption is a U-shaped function of load. Accordingly, when multiple device efficiency curves are combined into a performance curve for multiple devices, the resultant performance curve may be a wavy curve. The waves are caused by a single device loading up before it is more efficient to turn on another device to satisfy the subplant load. Low level optimizer 834 may provide the equipment performance curves to high level optimizer 832 for use in the high level optimization process.

Still referring to FIG. 8, MPM system 602 is shown to include an equipment controller 828. Equipment controller 828 can be configured to control connected equipment 610 to affect a variable state or condition in building 10 (e.g., temperature, humidity, etc.). In some embodiments, equipment controller 828 controls connected equipment 610 based on the results of the optimization performed by model predictive optimizer 830. In some embodiments, equipment controller 828 generates control signals which can be provided to connected equipment 610 via communications interface 804 and/or BMS 606. The control signals may be based on the optimal values of the decision variables in the objective function J. For example, equipment controller 828 may generate control signals which cause connected equipment 610 to achieve the optimal power consumption values $P_{op,i}$ for each time step i in the optimization period.

Data and processing results from model predictive optimizer 830, equipment controller 828, or other modules of MPM system 602 may be accessed by (or pushed to) monitoring and reporting applications 826. Monitoring and reporting applications 826 may be configured to generate real time "system health" dashboards that can be viewed and navigated by a user (e.g., a system engineer). For example, monitoring and reporting applications 826 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across building management systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the building system.

Still referring to FIG. 8, MPM system 602 may include one or more GUI servers, web services 812, or GUI engines 814 to support monitoring and reporting applications 826. In various embodiments, applications 826, web services 812, and GUI engine 814 may be provided as separate components outside of MPM system 602 (e.g., as part of a smart building manager). MPM system 602 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. MPM system 602 may be configured to provide the results of any such processing to other databases, tables, XML files, or other data structures for further querying, calculation, or access by, for example, external monitoring and reporting applications.

MPM system 602 is shown to include configuration tools 816. Configuration tools 816 can allow a user to define (e.g., via graphical user interfaces, via prompt-driven "wizards," etc.) how MPM system 602 should react to changing conditions in BMS 606 and/or connected equipment 610. In an exemplary embodiment, configuration tools 816 allow a user to build and store condition-response scenarios that can cross multiple devices of connected equipment 610, multiple building systems, and multiple enterprise control applications (e.g., work order management system applications, entity resource planning applications, etc.). For example, configuration tools 816 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 816 can present user interfaces for building such conditional logic. The user interfaces may allow users to define policies and responses graphically. In some embodiments, the user interfaces may allow a user to select a pre-stored or pre-constructed policy and adapt it or enable it for use with their system.

High Level Optimizer

Figure 9:
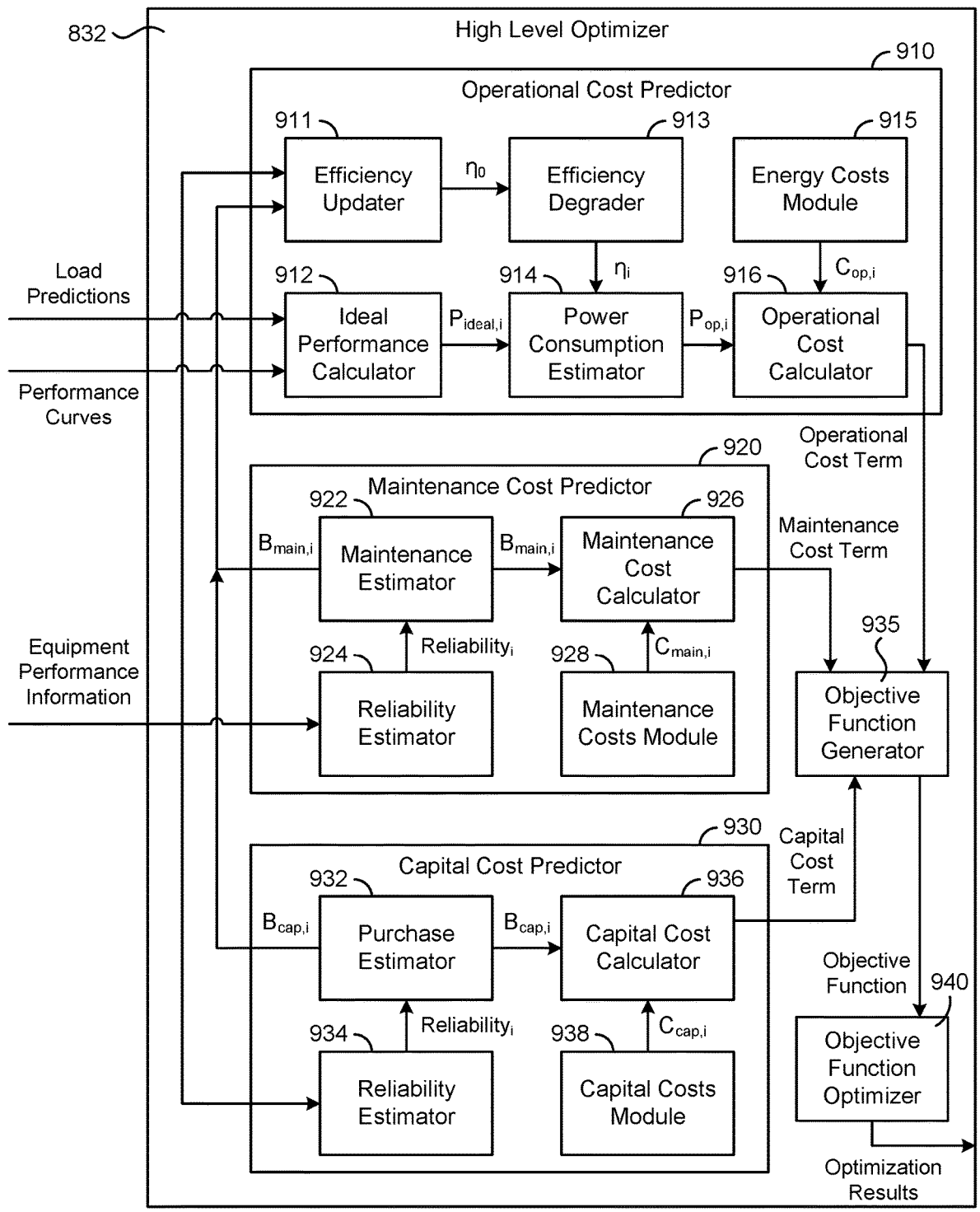
FIG. 9 is a block diagram illustrating a high level optimizer of the MPM system of FIG. 6 in greater detail, according to some embodiments.

Referring now to FIG. 9, a block diagram illustrating high level optimizer 832 in greater detail is shown, according to an exemplary embodiment. High level optimizer 832 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions.

High level optimizer 832 is shown to include an operational cost predictor 910, a maintenance cost predictor 920, a capital cost predictor 930, an objective function generator 935, and an objective function optimizer 940. Cost predictors 910, 920, and 930 can use a model predictive control technique to formulate an objective function which expresses the total cost as a function of several decision variables (e.g., maintenance decisions, equipment purchase decisions, etc.) and input parameters (e.g., energy cost, device efficiency, device reliability). Operational cost predictor 910 can be configured to formulate an operational cost term in the objective function. Similarly, maintenance cost predictor 920 can be configured to formulate a maintenance cost term in the objective function and capital cost predictor 930 can be configured to formulate a capital cost term in the objective function. Objective function optimizer 940 can optimize (i.e., minimize) the objective function using any of a variety of optimization techniques to identify the optimal values for each of the decision variables.

One example of an objective function which can be generated by high level optimizer 832 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Operational Cost Predictor

Operational cost predictor 910 can be configured to formulate the first term in the objective function J. The first term in the objective function J represents the operating cost of connected equipment 610 over the duration of the optimization period and is shown to include three variables or parameters (i.e., $C_{op,i}$, $P_{op,i}$, and $\Delta t$). In some embodiments, the cost per unit of energy $C_{op,i}$ is determined by energy costs module 915. Energy costs module 915 can receive a set of energy prices from utility 608 as energy pricing data. In some embodiments, the energy prices are time-varying cost that depend on the time of day, the day of the week (e.g., weekday vs. weekend), the current season (e.g., summer vs. winter), or other time-based factors. For example, the cost of electricity may be higher during peak energy consumption periods and lower during off-peak or partial-peak energy consumption periods.

Energy costs module 915 can use the energy costs to define the value of $C_{op,i}$ for each time step i of the optimization period. In some embodiments, energy costs module 915 stores the energy costs as an array $C_{op}$ including a cost element for each of the h time steps in the optimization period. For example, energy costs module 915 can generate the following array:

$$C_{op}=[C_{op,1} C_{op,2} \ldots C_{op,h}]$$

where the array $C_{op}$ has a size of 1×h and each element of the array $C_{op}$ includes an energy cost value $C_{op,i}$ for a particular time step i=1 . . . h of the optimization period.

Still referring to FIG. 9, operational cost predictor 910 is shown to include an ideal performance calculator 912. Ideal performance calculator 912 may receive load predictions $Load_i$ from load/rate predictor 822 and may receive performance curves from low level optimizer 834. As discussed above, the performance curves may define the ideal power consumption $P_{ideal}$ of a device or set of devices of connected equipment 610 as a function of the heating or cooling load on the device or set of devices. For example, the performance curve one or more devices of connected equipment 610 can be defined by the following equation:

$$P_{ideal,i}=f(Load_i)$$

where $P_{ideal,i}$ is the ideal power consumption (e.g., kW) of connected equipment 610 at time step i and $Load_i$ is the load (e.g., tons cooling, kW heating, etc.) on connected equipment 610 at time step i. The ideal power consumption $P_{ideal,i}$ may represent the power consumption of the one or more devices of connected equipment 610 assuming they operate at perfect efficiency.

Ideal performance calculator 912 can use the performance curve for a device or set of devices of connected equipment 610 to identify the value of $P_{ideal,i}$ that corresponds to the load point $Load_i$ for the device or set of devices at each time step of the optimization period. In some embodiments, ideal performance calculator 912 stores the ideal load values as an array $P_{ideal}$ including an element for each of the h time steps in the optimization period. For example, ideal performance calculator 912 can generate the following array:

$$P_{ideal}=[P_{ideal,1} P_{ideal,2} \ldots P_{ideal,h}]^T$$

where the array $P_{ideal}$ has a size of h×1 and each element of the array $P_{ideal}$ includes an ideal power consumption value $P_{ideal,i}$ for a particular time step i=1 h of the optimization period.

Still referring to FIG. 9, operational cost predictor 910 is shown to include an efficiency updater 911 and an efficiency degrader 913. Efficiency updater 911 can be configured to determine the efficiency $\eta$ of connected equipment 610 under actual operating conditions. In some embodiments, the efficiency represents the ratio of the ideal power consumption $P_{ideal}$ of connected equipment to the actual power consumption $P_{actual}$ of connected equipment 610, as shown in the following equation:

$$\eta = \frac{P_{ideal}}{P_{actual}}$$

where $P_{ideal}$ is the ideal power consumption of connected equipment 610 as defined by the performance curve for connected equipment 610 and $P_{actual}$ is the actual power consumption of connected equipment 610. In some embodiments, efficiency updater 911 uses the equipment performance information collected from connected equipment 610 to identify the actual power consumption value $P_{actual}$. Efficiency updater 911 can use the actual power consumption $P_{actual}$ in combination with the ideal power consumption $P_{ideal}$ to calculate the efficiency $\eta$.

Efficiency updater 911 can be configured to periodically update the efficiency $\eta$ to reflect the current operating efficiency of connected equipment 610. For example, efficiency updater 911 can calculate the efficiency $\eta$ of connected equipment 610 once per day, once per week, once per year, or at any other interval as may be suitable to capture changes in the efficiency $\eta$ over time. Each value of the efficiency $\eta$ may be based on corresponding values of $P_{ideal}$ and $P_{actual}$ at the time the efficiency $\eta$ is calculated. In some embodiments, efficiency updater 911 updates the efficiency $\eta$ each time the high level optimization process is performed (i.e., each time the objective function J is optimized). The efficiency value calculated by efficiency updater 911 may be stored in memory 810 as an initial efficiency value $\eta_0$, where the subscript 0 denotes the value of the efficiency $\eta$ at or before the beginning of the optimization period (e.g., at time step 0).

In some embodiments, efficiency updater 911 updates the efficiency $\eta_i$ for one or more time steps during the optimization period to account for increases in the efficiency $\eta$ of connected equipment 610 that will result from performing maintenance on connected equipment 610 or purchasing new equipment to replace or supplement one or more devices of connected equipment 610. The time steps i at which the efficiency $\eta_i$ is updated may correspond to the predicted time steps at which the maintenance will be performed or the equipment will replaced. The predicted time steps at which maintenance will be performed on connected equipment 610 may be defined by the values of the binary decision variables $B_{main,i}$ in the objective function J. Similarly, the predicted time steps at which the equipment will be replaced may be defined by the values of the binary decision variables $B_{cap,i}$ in the objective function J.

Efficiency updater 911 can be configured to reset the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, efficiency updater 911 can be configured to reset the value of $\eta_i$ to $\eta_{main}$, where $\eta_{main}$ is the efficiency value that is expected to result from the maintenance performed at time step i. Similarly, if $B_{cap,i}=1$, efficiency updater 911 can be configured to reset the value of $\eta_i$ to $\eta_{cap}$, where $\eta_{cap}$ is the efficiency value that is expected to result from purchasing a new device to supplement or replace one or more devices of connected equipment 610 performed at time step i. Efficiency updater 911 can dynamically reset the efficiency $\eta_i$ for one or more time steps while the optimization is being performed (e.g., with each iteration of the optimization) based on the values of binary decision variables and $B_{cap,i}$.

Efficiency degrader 913 can be configured to predict the efficiency $\eta_i$ of connected equipment 610 at each time step i of the optimization period. The initial efficiency $\eta_0$ at the beginning of the optimization period may degrade over time as connected equipment 610 degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Efficiency degrader 913 can be configured to account for such degradation by incrementally reducing the efficiency $\eta_i$ over the duration of the optimization period.

In some embodiments, the initial efficiency value $\eta_{70}$ is updated at the beginning of each optimization period. However, the efficiency $\eta$ may degrade during the optimization period such that the initial efficiency value $\eta_{70}$ becomes increasingly inaccurate over the duration of the optimization period. To account for efficiency degradation during the optimization period, efficiency degrader 913 can decrease the efficiency $\eta$ by a predetermined amount with each successive time step. For example, efficiency degrader 913 can define the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main,i}$ or $\eta_{cap}$ as previously described.

In some embodiments, the value of $\Delta\eta$ is based on a time series of efficiency values calculated by efficiency updater 911. For example, efficiency degrader 913 may record a time series of the initial efficiency values $\eta_{70}$ calculated by efficiency updater 911, where each of the initial efficiency values $\eta_{70}$ represents the empirically-calculated efficiency of connected equipment 610 at a particular time. Efficiency degrader 913 can examine the time series of initial efficiency values $\eta_{70}$ to determine the rate at which the efficiency degrades. For example, if the initial efficiency $\eta_0$ at time $t_1$ is $\eta_{0,1}$ and the initial efficiency at time $t_2$ is $\eta_{0,2}$, efficiency degrader 913 can calculate the rate of efficiency degradation as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate of efficiency degradation. Efficiency degrader 913 can multiply $$\frac{\Delta\eta}{\Delta t}$$

by the duration of each time step $\Delta t$ to calculate the value of $\Delta\eta$ $$\left(\text{i.e., } \Delta\eta = \frac{\Delta\eta}{\Delta t} * \Delta t\right).$$

In some embodiments, efficiency degrader 913 stores the efficiency values over the duration of the optimization period in an array $\eta_1$ including an element for each of the h time steps in the optimization period. For example, efficiency degrader 913 can generate the following array:

$$\eta = [\eta_1 \eta_2 \ldots \eta_h]$$

where the array $\eta$ has a size of 1× h and each element of the array $\eta$ includes an efficiency value $\eta_i$ for a particular time step i=1 . . . h of the optimization period. Each element i of the array $\eta$ may be calculated based on the value of the previous element and the value of $\Delta\eta$ (e.g., if $B_{main,i}=0$ and $B_{cap,i}=0$) or may be dynamically reset to either $\eta_{main}$ or $\eta_{cap}$ (e.g., if $B_{main,i}=1$ or $B_{cap,i}=1$.

The logic characterizing the efficiency updating and resetting operations performed by efficiency updater 911 and efficiency degrader 913 can be summarized in the following equations:

if $B_{main,i}=1 \rightarrow \eta_i = \eta_{main}$ if $B_{cap,i}=1 \rightarrow \eta_i = \eta_{cap}$ if $B_{main,i}=0$ and $B_{cap,i}=0 \rightarrow \eta_i = \eta_{i-1} - \Delta\eta$ which can be applied as constraints on the high level optimization performed by objective function optimizer 940.

Advantageously, efficiency updater 911 and efficiency degrader 913 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ at the beginning of the optimization period and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Still referring to FIG. 9, operational cost predictor 910 is shown to include a power consumption estimator 914 and an operational cost calculator 916. Power consumption estimator 914 can be configured to estimate the power consumption $P_{op,i}$ of connected equipment 610 at each time step i of the optimization period. In some embodiments, power consumption estimator 914 estimates the power consumption $P_{op,i}$ as a function of the ideal power consumption $P_{ideal,i}$ calculated by ideal performance calculator 912 and the efficiency $\eta_i$ determined by efficiency degrader 913 and/or efficiency updater 911. For example, power consumption estimator 914 can calculate the power consumption $P_{op,i}$ using the following equation:

$$P_{op,i} = \frac{P_{ideal,i}}{\eta_i}$$

where $P_{ideal,i}$ is the power consumption calculated by ideal performance calculator 912 based on the equipment performance curve for the device at the corresponding load point Load$_i$, and $\eta_i$ is the operating efficiency of the device at time step i.

In some embodiments, power consumption estimator 914 stores the power consumption values as an array $P_{op}$ including an element for each of the h time steps in the optimization period. For example, power consumption estimator 914 can generate the following array:

$$P_{op} = [P_{op,1} P_{op,2} \ldots P_{op,h}]^T$$

where the array $P_{op}$ has a size of h×1 and each element of the array $P_{op}$ includes a power consumption value $P_{op,i}$ for a particular time step i=1 h of the optimization period.

Operational cost calculator 916 can be configured to estimate the operational cost of connected equipment 610 over the duration of the optimization period. In some embodiments, operational cost calculator 916 calculates the operational cost during each time step i using the following equation:

$$\text{Cost}_{op,i} = C_{op,i} P_{op,i} \Delta t$$

where $P_{op,i}$ is the predicted power consumption at time step i determined by power consumption estimator 914, $C_{op,i}$ is the cost per unit of energy at time step i determined by energy costs module 915, and $\Delta t$ is the duration of each time step. Operational cost calculator 916 can sum the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, operational cost calculator 916 estimates the operational cost $\text{Cost}_{op}$ by multiplying the cost array $C_{op}$ by the power consumption array $P_{op}$ and the duration of each time step $\Delta t$ as shown in the following equations:

$$\text{Cost}_{op} = C_{op} P_{op} \Delta t$$

$$\text{Cost}_{op} = [C_{op,1} C_{op,2} \ldots C_{op,h}][P_{op,1} P_{op,2} \ldots P_{op,h}]^T \Delta t$$

Maintenance Cost Predictor

Maintenance cost predictor 920 can be configured to formulate the second term in the objective function J. The second term in the objective function J represents the cost of performing maintenance on connected equipment 610 over the duration of the optimization period and is shown to include two variables or parameters (i.e., $C_{main,i}$ and $B_{main,i}$). Maintenance cost predictor 920 is shown to include a maintenance estimator 922, a reliability estimator 924, a maintenance cost calculator 926, and a maintenance costs module 928.

Reliability estimator 924 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed.

In some embodiments, reliability estimator 924 uses the equipment performance information to identify a current operating state of connected equipment 610. The current operating state can be examined by reliability estimator 924 to expose when connected equipment 610 begins to degrade in performance and/or to predict when faults will occur. In some embodiments, reliability estimator 924 estimates a likelihood of various types of failures that could potentially occur in connected equipment 610. The likelihood of each failure may be based on the current operating conditions of connected equipment 610, an amount of time that has elapsed since connected equipment 610 has been installed, and/or an amount of time that has elapsed since maintenance was last performed. In some embodiments, reliability estimator 924 identifies operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, reliability estimator 924 receives operating data from a plurality of devices of connected equipment 610 distributed across multiple buildings. The operating data can include, for example, current operating conditions, fault indications, failure times, or other data that characterize the operation and performance of connected equipment 610. Reliability estimator 924 can use the set of operating data to develop a reliability model for each type of equipment. The reliability models can be used by reliability estimator 924 to estimate the reliability of any given device of connected equipment 610 as a function of its current operating conditions and/or other extraneous factors (e.g., time since maintenance was last performed, time since installation or purchase, geographic location, water quality, etc.).

One example of a reliability model which can be used by reliability estimator 924 is shown in the following equation:

$$\text{Reliability}_i = f(\text{OpCond}_i, \Delta t_{main,i}, \Delta t_{cap,i})$$

where Reliability$_i$ is the reliability of connected equipment 610 at time step i, OpCond$_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which connected equipment 610 was purchased or installed and time step i. Reliability estimator 924 can be configured to identify the current operating conditions OpCond$_i$ based on the equipment performance information received as a feedback from connected equipment 610. Operating under more strenuous conditions (e.g., high load, extreme temperatures, etc.) may result in a lower reliability, whereas operating under less strenuous conditions (e.g., low load, moderate temperatures, etc.) may result in a higher reliability.

Reliability estimator 924 may determine the amount of time $\Delta t_{main,i}$ that has elapsed since maintenance was last performed on connected equipment 610 based on the values of the binary decision variables $B_{main,i}$. For each time step i, reliability estimator 924 can examine the corresponding values of $B_{main}$ at time step i and each previous time step (e.g., time steps i−1, i−2, . . . , 1). Reliability estimator 924 can calculate the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, reliability estimator 924 may determine the amount of time $\Delta t_{cap,i}$ that has elapsed since connected equipment 610 was purchased or installed based on the values of the binary decision variables $B_{cap,i}$. For each time step i, reliability estimator 924 can examine the corresponding values of $B_{cap}$ at time step i and each previous time step (e.g., time steps i−1, i−2, . . . , 1). Reliability estimator 924 can calculate the value of $\Delta t_{cap,i}$ by subtracting the time at which connected equipment 610 was purchased or installed (i.e., the most recent time at which $B_{cap,i}=1$) from the time associated with time step i. A long amount of time $\Delta t_{cap,i}$ since connected equipment 610 was purchased or installed may result in a lower reliability, whereas a short amount of time since connected equipment 610 was purchased or installed may result in a higher reliability.

Reliability estimator 924 can be configured to reset the reliability for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, reliability estimator 924 can be configured to reset the value of Reliability$_i$) to Reliability$_{main}$, where Reliability$_{main}$ is the reliability value that is expected to result from the maintenance performed at time step i. Similarly, if $B_{cap,i}=1$, reliability estimator 924 can be configured to reset the value of Reliability$_i$ to Reliability$_{cap}$, where Reliability$_{cap}$ is the reliability value that is expected to result from purchasing a new device to supplement or replace one or more devices of connected equipment 610 performed at time step i. Reliability estimator 924 can dynamically reset the reliability for one or more time steps while the optimization is being performed (e.g., with each iteration of the optimization) based on the values of binary decision variables $B_{main,i}$ and $B_{cap,i}$.

Maintenance estimator 922 can be configured to use the estimated reliability of connected equipment 610 over the duration of the optimization period to determine the probability that connected equipment 610 will require maintenance and/or replacement at each time step of the optimization period. In some embodiments, maintenance estimator 922 is configured to compare the probability that connected equipment 610 will require maintenance at a given time step to a critical value. Maintenance estimator 922 can be configured to set the value of $B_{main,i}=1$ in response to a determination that the probability that connected equipment 610 will require maintenance at time step i exceeds the critical value. Similarly, maintenance estimator 922 can be configured to compare the probability that connected equipment 610 will require replacement at a given time step to a critical value. Maintenance estimator 922 can be configured to set the value of $B_{cap,i}=1$ in response to a determination that the probability that connected equipment 610 will require replacement at time step i exceeds the critical value.

In some embodiments, a reciprocal relationship exists between the reliability of connected equipment 610 and the values of the binary decision variables $B_{main,i}$ and $B_{cap,i}$. In other words, the reliability of connected equipment 610 can affect the values of the binary decision variables $B_{main,i}$ and $B_{cap,i}$ selected in the optimization, and the values of the binary decision variables $B_{main,i}$ and $B_{cap,i}$ can affect the reliability of connected equipment 610. Advantageously, the optimization performed by objective function optimizer 940 can identify the optimal values of the binary decision variables $B_{main,i}$ and $B_{cap,i}$ while accounting for the reciprocal relationship between the binary decision variables $B_{main,i}$ and $B_{cap,i}$ and the reliability of connected equipment 610.

In some embodiments, maintenance estimator 922 generates a matrix $B_{main}$ of the binary maintenance decision variables. The matrix $B_{main}$ may include a binary decision variable for each of the different maintenance activities that can be performed at each time step of the optimization period. For example, maintenance estimator 922 can generate the following matrix:

$$B_{main} = \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where the matrix $B_{main}$ has a size of m×h and each element of the matrix $B_{main}$ includes a binary decision variable for a particular maintenance activity at a particular time step of the optimization period. For example, the value of the binary decision variable $B_{main\ j,i}$ indicates whether the jth maintenance activity will be performed during the ith time step of the optimization period.

Still referring to FIG. 9, maintenance cost predictor 920 is shown to include a maintenance costs module 928 and a maintenance costs calculator 926. Maintenance costs module 928 can be configured to determine costs $C_{main,i}$ associated with performing various types of maintenance on connected equipment 610. Maintenance costs module 928 can receive a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost.

Maintenance costs module 928 can use the maintenance costs to define the values of $C_{main,i}$ in objective function J. In some embodiments, maintenance costs module 928 stores the maintenance costs as an array $C_{main}$ including a cost element for each of the maintenance activities that can be performed. For example, maintenance costs module 928 can generate the following array:

$$C_{main} = [C_{main,1} C_{main,2} \cdots C_{main,m}]$$

where the array $C_{main}$ has a size of 1× m and each element of the array $C_{main}$ includes a maintenance cost value $C_{main,i}$ for a particular maintenance activity j=1 . . . m.

Some maintenance activities may be more expensive than other. However, different types of maintenance activities may result in different levels of improvement to the efficiency η and/or the reliability of connected equipment 610. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of connected equipment 610. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, maintenance estimator 922 stores each of the different levels of $\eta_{main}$ and Reliability$_{main}$ in a corresponding array. For example, the parameter $\eta_{main}$ can be defined as an array $\eta_{main}$ with an element for each of the m different types of maintenance activities. Similarly, the parameter Reliability$_{main}$ can be defined as an array Reliability$_{main}$ with an element for each of the m different types of maintenance activities. Examples of these arrays are shown in the following equations:

$$\eta_{main} = [\eta_{main,1} \eta_{main,2} \cdots \eta_{main,m}]$$

$$\text{Reliability}_{main} = [\text{Reliability}_{main,1} \text{Reliability}_{main,2} \cdots \text{Reliability}_{main,m}]$$

where the array $\eta_{main}$ has a size of 1× m and each element of the array $\eta_{main}$ includes a post-maintenance efficiency value $\eta_{main,j}$ for a particular maintenance activity. Similarly, the array Reliability$_{main}$ has a size of 1× m and each element of the array Reliability$_{main}$ includes a post-maintenance reliability value Reliability$_{main,j}$ for a particular maintenance activity.

In some embodiments, efficiency updater 911 identifies the maintenance activity associated with each binary decision variable $B_{main,j,i}$ and resets the efficiency η to the corresponding post-maintenance efficiency level $\eta_{main,j}$ if $B_{main\,j,i}=1$. Similarly, reliability estimator 924 can identify the maintenance activity associated with each binary decision variable $B_{main\,j,i}$ and can reset the reliability to the corresponding post-maintenance reliability level Reliability$_{main,j}$ if $B_{main\,j,i}=1$.

Maintenance cost calculator 926 can be configured to estimate the maintenance cost of connected equipment 610 over the duration of the optimization period. In some embodiments, maintenance cost calculator 926 calculates the maintenance cost during each time step i using the following equation:

$$\text{Cost}_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Maintenance cost calculator 926 can sum the maintenance costs over the duration of the optimization period as follows:

$$\text{Cost}_{main} = \sum_{i=1}^{h} \text{Cost}_{main,i}$$

where Cost$_{main}$ is the maintenance cost term of the objective function J.

In other embodiments, maintenance cost calculator 926 estimates the maintenance cost Cost$_{main}$ by multiplying the maintenance cost array $C_{main}$ by the matrix of binary decision variables $B_{main}$ as shown in the following equations:

$$\text{Cost}_{main} = C_{main} B_{main}$$

$$\text{Cost}_{main} = [\,C_{main,1} \;\; C_{main,2} \;\; \cdots \;\; C_{main,m}\,]$$

$$\begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

Capital Cost Predictor

Capital cost predictor 930 can be configured to formulate the third term in the objective function J. The third term in the objective function J represents the cost of purchasing new devices of connected equipment 610 over the duration of the optimization period and is shown to include two variables or parameters (i.e., $C_{cap,i}$ and $B_{cap,i}$). Capital cost predictor 930 is shown to include a purchase estimator 932, a reliability estimator 934, a capital cost calculator 936, and a capital costs module 938.

Reliability estimator 934 can include some or all of the features of reliability estimator 924, as described with reference to maintenance cost predictor 920. For example, reliability estimator 934 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed. Reliability estimator 934 can include some or all of the features and/or functionality of reliability estimator 924, as previously described.

Purchase estimator 932 can be configured to use the estimated reliability of connected equipment 610 over the duration of the optimization period to determine the probability that new devices of connected equipment 610 will be purchased at each time step of the optimization period. In some embodiments, purchase estimator 932 is configured to compare the probability that new devices of connected equipment 610 will be purchased at a given time step to a critical value. Purchase estimator 932 can be configured to set the value of $B_{cap,i}=1$ in response to a determination that the probability that connected equipment 610 will be purchased at time step i exceeds the critical value.

In some embodiments, purchase estimator 932 generates a matrix $B_{cap}$ of the binary capital decision variables. The matrix $B_{cap}$ may include a binary decision variable for each of the different capital purchases that can be made at each time step of the optimization period. For example, purchase estimator 932 can generate the following matrix:

$$B_{cap} = \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the matrix $B_{cap}$ has a size of p×h and each element of the matrix $B_{cap}$ includes a binary decision variable for a particular capital purchase at a particular time step of the optimization period. For example, the value of the binary decision variable $B_{cap,k,i}$ indicates whether the kth capital purchase will be made during the ith time step of the optimization period.

Still referring to FIG. 9, capital cost predictor 930 is shown to include a capital costs module 938 and a capital cost calculator 936. Capital costs module 938 can be configured to determine costs $C_{cap,i}$ associated with various capital purchases (i.e., purchasing one or more new devices of connected equipment 610). Capital costs module 938 can receive a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost.

Capital costs module 938 can use the purchase costs to define the values of $C_{cap,i}$ in objective function J. In some embodiments, capital costs module 938 stores the capital costs as an array $C_{cap}$ including a cost element for each of the capital purchases that can be made. For example, capital costs module 938 can generate the following array:

$$C_{cap} = [C_{cap,1} C_{cap,2} \ldots C_{cap,p}]$$

where the array $C_{cap}$ has a size of 1×p and each element of the array $C_{cap}$ includes a cost value $C_{cap,k}$ for a particular capital purchase k=1 . . . p.

Some capital purchases may be more expensive than other. However, different types of capital purchases may result in different levels of improvement to the efficiency η and/or the reliability of connected equipment 610. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of connected equipment 610. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, purchase estimator 932 stores each of the different levels of $\eta_{cap}$ and Reliability$_{cap}$ in a corresponding array. For example, the parameter $\eta_{cap}$ can be defined as an array $\eta_{cap}$ with an element for each of the p different types of capital purchases which can be made. Similarly, the parameter Reliability$_{cap}$ can be defined as an array Reliability$_{cap}$ with an element for each of the p different types of capital purchases that can be made. Examples of these arrays are shown in the following equations:

$$\eta_{cap} = [\eta_{cap,1} \eta_{cap,2} \eta_{cap,p}]$$

$$\text{Reliability}_{cap} = [\text{Reliability}_{cap,1} \text{ Reliability}_{cap,2} \ldots \text{Reliability}_{cap,p}]$$

where the array $\eta_{cap}$ has a size of 1×p and each element of the array $\eta_{cap}$ includes a post-purchase efficiency value $\eta_{cap,k}$ for a particular capital purchase k. Similarly, the array Reliability$_{cap}$ has a size of 1×p and each element of the array Reliability$_{cap}$ includes a post-purchase reliability value Reliability$_{cap,k}$ for a particular capital purchase k.

In some embodiments, efficiency updater 911 identifies the capital purchase associated with each binary decision variable $B_{main,k,i}$ and resets the efficiency η to the corresponding post-purchase efficiency level $\eta_{cap,k}$ if $B_{cap,k,i}=1$. Similarly, reliability estimator 924 can identify the capital purchase associated with each binary decision variable $B_{cap,k,i}$ and can reset the reliability to the corresponding post-purchase reliability level Reliability$_{cap,k}$ if $B_{main,k,i}=1$.

Capital cost calculator 936 can be configured to estimate the capital cost of connected equipment 610 over the duration of the optimization period. In some embodiments, capital cost calculator 936 calculates the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Capital cost calculator 936 can sum the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, capital cost calculator 936 estimates the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [C_{cap,1} \ C_{cap,2} \ \ldots \ C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

Objective Function Optimizer

Still referring to FIG. 9, high level optimizer 832 is shown to include an objective function generator 935 and an objective function optimizer 940. Objective function generator 935 can be configured to generate the objective function J by summing the operational cost term, the maintenance cost term, and the capital cost term formulated by cost predictors 910, 920, and 930. One example of an objective function which can be generated by objective function generator 935 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, Δt is the duration of each time step i, is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated by objective function generator 935 is shown in the following equation:

$$J = C_{op}P_{op}\Delta t + C_{main}B_{main} + C_{cap}B_{cap}$$

$$J = [\,C_{op,1}\ \ C_{op,2}\ \ \ldots\ \ C_{op,h}\,][\,P_{op,1}\ \ P_{op,2}\ \ \ldots\ \ P_{op,h}\,]^T$$

$$\Delta t + [\,C_{main,1}\ \ C_{main,2}\ \ \ldots\ \ C_{main,m}\,]$$

$$\begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix} + [\,C_{cap,1}\ \ C_{cap,2}\ \ \ldots\ \ C_{cap,p}\,]$$

$$\begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,i}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Objective function generator 935 can be configured to impose constraints on one or more variables or parameters in the objective function J. The constraints can include any of the equations or relationships described with reference to operational cost predictor 910, maintenance cost predictor 920, and capital cost predictor 930. For example, objective function generator 935 can impose a constraint which defines the power consumption values $P_{op,i}$ for one or more devices of connected equipment 610 as a function of the ideal power consumption $P_{ideal,i}$ and the efficiency (e.g., $P_{op,i}=P_{ideal,i}/\eta_i$). Objective function generator 935 can impose a constraint which defines the efficiency $\eta_i$ as a function of the binary decision variables $B_{main,i}$ and $B_{cap,i}$, as described with reference to efficiency updater 911 and efficiency degrader 913. Objective function generator 935 can impose a constraint which constrains the binary decision variables $B_{main,i}$ and $B_{cap,i}$ to a value of either zero or one and defines the binary decision variables $B_{main}$ and $B_{cap,i}$ as a function of the reliability Reliability$_i$ of connected equipment 610, as described with reference to maintenance estimator 922 and purchase estimator 932. Objective function generator 935 can impose a constraint which defines the reliability Reliability$_i$ of connected equipment 610 as a function of the equipment performance information (e.g., operating conditions, run hours, etc.) as described with reference to reliability estimators 924 and 934.

Objective function optimizer 940 can optimize the objective function J to determine the optimal values of the binary decision variables $B_{main,i}$ and $B_{cap,i}$ over the duration of the optimization period. Objective function optimizer 940 can use any of a variety of optimization techniques to formulate and optimize the objective function J. For example, objective function optimizer 940 can use integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, objective function optimizer 940 uses mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of connected equipment 610. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, maintenance estimator 922 and purchase estimator 932 use a mixed integer stochastic technique to define the values of the binary decision variables $B_{main,i}$ and $B_{cap,i}$ as a probabilistic function of the reliability of connected equipment 610.

As discussed above, the objective function J may represent the predicted cost of operating, maintaining, and purchasing one or more devices of connected equipment 610 over the duration of the optimization period. In some embodiments, objective function optimizer 940 is configured to project these costs back to a particular point in time (e.g., the current time) to determine the net present value (NPV) of the one or more devices of connected equipment 610 at a particular point in time. For example, objective function optimizer 940 can project each of the costs in objective function J back to the current time using the following equation:

$$NPV_{cost} = \sum_{i=1}^{h} \frac{Cost_i}{(1+r)^i}$$

where r is the interest rate, Cost$_i$ is the cost incurred during time step i of the optimization period, and NPV$_{cost}$ is the net present value (i.e., the present cost) of the total costs incurred over the duration of the optimization period. In some embodiments, objective function optimizer 940 optimizes the net present value NPV$_{cost}$ to determine the NPV of one or more devices of connected equipment 610 at a particular point in time.

As discussed above, one or more variables or parameters in the objective function J can be updated dynamically based on closed-loop feedback from connected equipment 610. For example, the equipment performance information received from connected equipment 610 can be used to update the reliability and/or the efficiency of connected equipment 610. Objective function optimizer 940 can be configured to optimize the objective function J periodically (e.g., once per day, once per week, once per month, etc.) to dynamically update the predicted cost and/or the net present value $NPV_{cost}$ based on the closed-loop feedback from connected equipment 610.

In some embodiments, objective function optimizer 940 generates optimization results. The optimization results may include the optimal values of the decision variables in the objective function J for each time step i in the optimization period. The optimization results include operating decisions, equipment maintenance decisions, and/or equipment purchase decisions for each device of connected equipment 610. In some embodiments, the optimization results optimize the economic value of operating, maintaining, and purchasing connected equipment 610 over the duration of the optimization period. In some embodiments, the optimization results optimize the net present value of one or more devices of connected equipment 610 at a particular point in time. The optimization results may cause BMS 606 to activate, deactivate, or adjust a setpoint for connected equipment 610 in order to achieve the optimal values of the decision variables specified in the optimization results.

In some embodiments, MPM system 602 uses the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Model Predictive Maintenance Process

Figure 10:
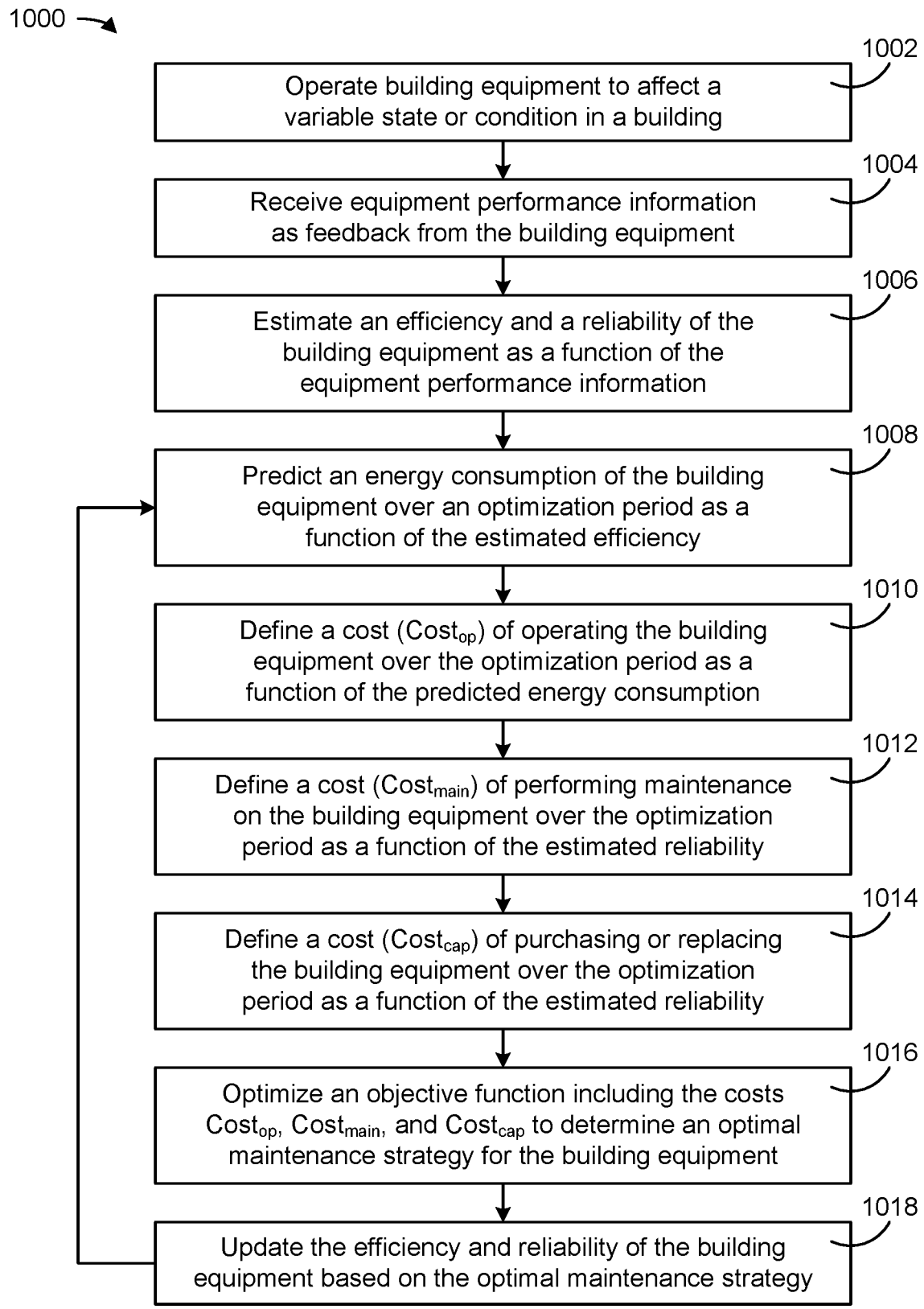
FIG. 10 is a flowchart of a process for operating the MPM system of FIG. 6, according to some embodiments.

Referring now to FIG. 10, a flowchart of a model predictive maintenance process 1000 is shown, according to an exemplary embodiment. Process 1000 can be performed by one or more components of building system 600. In some embodiments, process 1000 is performed by MPM system 602, as described with reference to FIGS. 6-9.

Process 1000 is shown to include operating building equipment to affect a variable state or condition of a building (step 1002) and receiving equipment performance information as feedback from the building equipment (step 1004). The building equipment can include type of equipment which can be used to monitor and/or control a building (e.g., connected equipment 610). For example, the building equipment can include chillers, AHUs, boilers, batteries, heaters, economizers, valves, actuators, dampers, cooling towers, fans, pumps, lighting equipment, security equipment, refrigeration equipment, or any other type of equipment in a building system or building management system. The building equipment can include any of the equipment of HVAC system 100, waterside system 200, airside system 300, BMS 400, and/or BMS 500, as described with reference to FIGS. 1-5. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of the building equipment.

Process 1000 is shown to include estimating an efficiency and reliability of the building equipment as a function of the equipment performance information (step 1006). In some embodiments, step 1006 is performed by efficiency updater 911 and reliability estimators 924, 926 as described with reference to FIG. 9. Step 1006 can include using the equipment performance information to determine the efficiency η of the building equipment under actual operating conditions. In some embodiments, the efficiency $\eta_i$ represents the ratio of the ideal power consumption $P_{ideal}$ of the building equipment to the actual power consumption $P_{actual}$ of the building equipment, as shown in the following equation:

$$\eta = \frac{P_{ideal}}{P_{actual}}$$

where $P_{ideal}$ is the ideal power consumption of the building equipment as defined by the performance curve for the building equipment and $P_{actual}$ is the actual power consumption of the building equipment. In some embodiments, step 1006 includes using the equipment performance information collected in step 1002 to identify the actual power consumption value $P_{actual}$. Step 1006 can include using the actual power consumption $P_{actual}$ in combination with the ideal power consumption $P_{ideal}$ to calculate the efficiency η.

Step 1006 can include periodically updating the efficiency η to reflect the current operating efficiency of the building equipment. For example, step 1006 can include calculating the efficiency η of the building equipment once per day, once per week, once per year, or at any other interval as may be suitable to capture changes in the efficiency η over time. Each value of the efficiency η may be based on corresponding values of $P_{ideal}$ and $P_{actual}$ at the time the efficiency η is calculated. In some embodiments, step 1006 includes updating the efficiency η each time the high level optimization process is performed (i.e., each time the objective function J is optimized). The efficiency value calculated in step 1006 may be stored in memory 810 as an initial efficiency value $\eta_0$, where the subscript 0 denotes the value of the efficiency η at or before the beginning of the optimization period (e.g., at time step 0).

Step 1006 can include predicting the efficiency $\eta_i$ of the building equipment at each time step i of the optimization period. The initial efficiency $\eta_0$ at the beginning of the optimization period may degrade over time as the building equipment degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Step 1006 can account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, step 1006 can include decreasing the efficiency $\eta$ by a predetermined amount with each successive time step. For example, step 1006 can include defining the efficiency at each time step i=1 h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ in step 1018.

In some embodiments, the value of $\Delta\eta$ is based on a time series of efficiency values. For example, step 1006 may include recording a time series of the initial efficiency values $\eta_0$, where each of the initial efficiency values $\eta_0$ represents the empirically-calculated efficiency of the building equipment at a particular time. Step 1006 can include examining the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, the rate of efficiency degradation can be calculated as follows:

$$\frac{\Delta\eta}{\Delta t} = \frac{\eta_{0,2} - \eta_{0,1}}{t_2 - t_1},$$

where $$\frac{\Delta\eta}{\Delta t}$$

is the rate of efficiency degradation. Step 1006 can include multiplying $$\frac{\Delta\eta}{\Delta t}$$

by the duration of each time step $\Delta t$ to calculate the value of $\Delta\eta$ (i.e., $$\Delta\eta = \frac{\Delta\eta}{\Delta t} * \Delta t).$$

Step 1006 can include estimating the reliability of the building equipment based on the equipment performance information received in step 1004. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment were purchased or installed.

In some embodiments, step 1006 includes using the equipment performance information to identify a current operating state of the building equipment. The current operating state can be examined to expose when the building equipment begin to degrade in performance and/or to predict when faults will occur. In some embodiments, step 1006 includes estimating a likelihood of various types of failures that could potentially occur the building equipment. The likelihood of each failure may be based on the current operating conditions of the building equipment, an amount of time that has elapsed since the building equipment have been installed, and/or an amount of time that has elapsed since maintenance was last performed. In some embodiments, step 1006 includes identifying operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, step 1006 includes receiving operating data from building equipment distributed across multiple buildings. The operating data can include, for example, current operating conditions, fault indications, failure times, or other data that characterize the operation and performance of the building equipment. Step 1006 can include using the set of operating data to develop a reliability model for each type of equipment. The reliability models can be used in step 1006 to estimate the reliability of any given device of the building equipment as a function of its current operating conditions and/or other extraneous factors (e.g., time since maintenance was last performed, time since installation or purchase, geographic location, water quality, etc.).

One example of a reliability model which can be used in step 1006 is shown in the following equation:

$$\text{Reliability}_i = f(\text{OpCond}_i, \Delta t_{main,i}, \Delta t_{cap,i})$$

where Reliability$_i$ is the reliability of the building equipment at time step i, OpCond$_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which the building equipment were purchased or installed and time step i. Step 1006 can include identifying the current operating conditions OpCond$_i$ based on the equipment performance information received as a feedback from the building equipment. Operating under more strenuous conditions (e.g., high load, extreme temperatures, etc.) may result in a lower reliability, whereas operating under less strenuous conditions (e.g., low load, moderate temperatures, etc.) may result in a higher reliability.

Still referring to FIG. 10, process 1000 is shown to include predicting an energy consumption of the building equipment over an optimization period as a function of the estimated efficiency (step 1008). In some embodiments, step 1008 is performed by ideal performance calculator 912 and/or power consumption estimator, as described with reference to FIG. 9. Step 1008 can include receiving load predictions Load$_i$ from load/rate predictor 822 and performance curves from low level optimizer 834. As discussed above, the performance curves may define the ideal power consumption $P_{ideal}$ of the building equipment a function of the heating or cooling load on the device or set of devices.

For example, the performance curve for the building equipment can be defined by the following equation:

$$P_{ideal,i} = f(Load_i)$$

where $P_{ideal,i}$ is the ideal power consumption (e.g., kW) of the building equipment at time step i and $Load_i$ is the load (e.g., tons cooling, kW heating, etc.) on the building equipment at time step i. The ideal power consumption $P_{ideal,i}$ may represent the power consumption of the building equipment assuming they operate at perfect efficiency. Step 1008 can include using the performance curve for the building equipment to identify the value of $P_{ideal,i}$ that corresponds to the load point $Load_i$ for the building equipment at each time step of the optimization period.

In some embodiments, step 1008 includes estimating the power consumption $P_{op,i}$ as a function of the ideal power consumption $P_{ideal,i}$ and the efficiency $\eta_i$ of the building equipment. For example, step 1008 can include calculating the power consumption $P_{op,i}$ using the following equation:

$$P_{op,i} = \frac{P_{ideal,i}}{\eta_i}$$

where $P_{ideal,i}$ is the power consumption based on the equipment performance curve for the building equipment at the corresponding load point $Load_i$, and $\eta_i$ is the operating efficiency of the building equipment at time step i.

Still referring to FIG. 10, process 1000 is shown to include defining a cost $Cost_{op}$ of operating the building equipment over the optimization period as a function of the predicted energy consumption (step 1010). In some embodiments, step 1010 is performed by operational cost calculator 916, as described with reference to FIG. 9. Step 1010 can include calculating the operational cost during each time step i using the following equation:

$$Cost_{op,i} = C_{op,i} P_{op,i} \Delta t$$

where $P_{op,i}$ is the predicted power consumption at time step i determined in step 1008, $C_{op,i}$ is the cost per unit of energy at time step i, and $\Delta t$ is the duration of each time step. Step 1010 can include summing the operational costs over the duration of the optimization period as follows:

$$Cost_{op} = \sum_{i=1}^{h} Cost_{op,i}$$

where $Cost_{op}$ is the operational cost term of the objective function J.

In other embodiments, step 1010 can include calculating the operational cost $Cost_{op}$ by multiplying the cost array $C_{op}$ by the power consumption array $P_{op}$ and the duration of each time step $\Delta t$ as shown in the following equations:

$$Cost_{op} = C_{op} P_{op} \Delta t$$

$$Cost_{op} = [C_{op,1} C_{op,2} \cdots C_{op,h}][P_{op,1} P_{op,2} \cdots P_{op,h}]^T \Delta t$$

where the array $C_{op}$ includes an energy cost value $C_{op,i}$ for a particular time step i=1 h of the optimization period, the array $P_{op}$ includes a power consumption value $P_{op,i}$ for a particular time step i=1 h of the optimization period.

Still referring to FIG. 10, process 1000 is shown to include defining a cost of performing maintenance on the building equipment over the optimization period as a function of the estimated reliability (step 1012). Step 1012 can be performed by maintenance cost predictor 920, as described with reference to FIG. 9. Step 1012 can include using the estimated reliability of the building equipment over the duration of the optimization period to determine the probability that the building equipment will require maintenance and/or replacement at each time step of the optimization period. In some embodiments, step 1012 includes comparing the probability that the building equipment will require maintenance at a given time step to a critical value. Step 1012 can include setting the value of $B_{main,i}=1$ in response to a determination that the probability that the building equipment will require maintenance at time step i exceeds the critical value. Similarly, step 1012 can include comparing the probability that the building equipment will require replacement at a given time step to a critical value. Step 1012 can include setting the value of $B_{cap,i}=1$ in response to a determination that the probability that the building equipment will require replacement at time step i exceeds the critical value.

Step 1012 can include determining the costs $C_{main,i}$ associated with performing various types of maintenance on the building equipment. Step 1012 can include receiving a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost. Step 1012 can include using the maintenance costs to define the values of $C_{main,i}$ in objective function J.

Step 1012 can include estimating the maintenance cost of the building equipment over the duration of the optimization period. In some embodiments, step 1012 includes calculating the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Step 1012 can include summing the maintenance costs over the duration of the optimization period as follows:

$$Cost_{main} = \sum_{i=1}^{h} Cost_{main,i}$$

where $Cost_{main}$ is the maintenance cost term of the objective function J.

In other embodiments, step 1012 includes estimating the maintenance cost $Cost_{main}$ by multiplying the maintenance cost array $C_{main}$ by the matrix of binary decision variables $B_{main}$ as shown in the following equations:

$$Cost_{main} = C_{main} B_{main}$$

$$Cost_{main} = [C_{main,1} \quad C_{main,2} \quad \cdots \quad C_{main,m}]$$

-continued $$\begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where each element of the array $C_{main}$ includes a maintenance cost value $C_{main}$ for a particular maintenance activity $j=1 \ldots m$ and each element of the matrix $B_{main}$ includes a binary decision variable for a particular maintenance activity $j=1 \ldots m$ at a particular time step $i=1 \ldots h$ of the optimization period.

Still referring to FIG. 10, process 1000 is shown to include defining a cost $Cost_{cap}$ of purchasing or replacing the building equipment over the optimization period as a function of the estimated reliability (step 1014). Step 1014 can be performed by capital cost predictor 930, as described with reference to FIG. 9. In some embodiments, step 1014 includes using the estimated reliability of the building equipment over the duration of the optimization period to determine the probability that new devices of the building equipment will be purchased at each time step of the optimization period. In some embodiments, step 1014 includes comparing the probability that new devices of the building equipment will be purchased at a given time step to a critical value. Step 1014 can include setting the value of $B_{cap,i}=1$ in response to a determination that the probability that the building equipment will be purchased at time step i exceeds the critical value.

Step 1014 can include determining the costs $C_{cap,i}$ associated with various capital purchases (i.e., purchasing one or more new devices of the building equipment). Step 1014 can include receiving a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost. Step 1014 can include using the purchase costs to define the values of $C_{cap,i}$ in objective function J.

Some capital purchases may be more expensive than other. However, different types of capital purchases may result in different levels of improvement to the efficiency η and/or the reliability of the building equipment. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of the building equipment. Accordingly, multiple different levels of post-purchase efficiency (i.e., $\eta_{cap}$) and post-purchase reliability (i.e., $Reliability_{cap}$) may exist. Each level of $\eta_{cap}$ and $Reliability_{cap}$ may correspond to a different type of capital purchase.

Step 1014 can include estimating the capital cost of the building equipment over the duration of the optimization period. In some embodiments, step 1014 includes calculating the capital cost during each time step i using the following equation:

$$Cost_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Step 1014 can include summing the capital costs over the duration of the optimization period as follows:

$$Cost_{cap} = \sum_{i=1}^{h} Cost_{cap,i}$$

where $Cost_{cap}$ is the capital cost term of the objective function J.

In other embodiments, step 1014 includes estimating the capital cost $Cost_{cap}$ by multiplying the capital cost array $C_{cap}$ by the matrix of binary decision variables $B_{cap}$ as shown in the following equations:

$$Cost_{cap} = C_{cap} B_{cap}$$

$$Cost_{cap} = [C_{cap,1} \quad C_{cap,2} \quad \cdots \quad C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where each element of the array $C_{cap}$ includes a capital cost value $C_{cap,k}$ for a particular capital purchase $k=1 \ldots p$ and each element of the matrix $B_{cap}$ includes a binary decision variable for a particular capital purchase $k=1 \ldots p$ at a particular time step $i=1$ h of the optimization period.

Still referring to FIG. 10, process 1000 is shown to include optimizing an objective function including the costs $Cost_{op}$, $Cost_{main}$, and $Cost_{cap}$ to determine an optimal maintenance strategy for the building equipment (step 1016). Step 1016 can include generating the objective function J by summing the operational cost term, the maintenance cost term, and the capital cost term formulated in steps 1010-1014. One example of an objective function which can be generated in step 1016 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated in step 1016 is shown in the following equation:

$$J = C_{op} P_{op} \Delta t + C_{main} B_{main} + C_{cap} B_{cap}$$

$$J = [C_{op,1} \quad C_{op,2} \quad \cdots \quad C_{op,h}][P_{op,1} \quad P_{op,2} \quad \cdots \quad P_{op,h}]^T$$

-continued $$\Delta t + [\,C_{main,1} \quad C_{main,2} \quad \ldots \quad C_{main,m}\,]$$

$$\begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix} + [\,C_{cap,1} \quad C_{cap,2} \quad \ldots \quad C_{cap,p}\,]$$

$$\begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Step 1016 can include imposing constraints on one or more variables or parameters in the objective function J. The constraints can include any of the equations or relationships described with reference to operational cost predictor 910, maintenance cost predictor 920, and capital cost predictor 930. For example, step 1016 can include imposing a constraint which defines the power consumption values $P_{op,i}$ for one or more devices of the building equipment as a function of the ideal power consumption $P_{ideal,i}$ and the efficiency (e.g., $P_{op,i}=P_{ideal,i}/\eta_i$). Step 1016 can include imposing a constraint which defines the efficiency $\eta_i$ as a function of the binary decision variables $B_{main,i}$ and $B_{cap,i}$, as described with reference to efficiency updater 911 and efficiency degrader 913. Step 1016 can include imposing a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Step 1016 can include imposing a constraint which defines the reliability Reliability$_i$ of connected equipment 610 as a function of the equipment performance information (e.g., operating conditions, run hours, etc.) as described with reference to reliability estimators 924 and 934.

Step 1016 can include optimizing the objective function J to determine the optimal values of the binary decision variables $B_{main,i}$ and $B_{cap,i}$ over the duration of the optimization period. Step 1016 can include using any of a variety of optimization techniques to formulate and optimize the objective function J. For example, step 1016 can include using integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, step 1016 includes using mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of the building equipment. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, step 1016 includes using a mixed integer stochastic technique to define the values of the binary decision variables $B_{main,i}$ and $B_{cap,i}$ as a probabilistic function of the reliability of the building equipment.

As discussed above, the objective function J may represent the predicted cost of operating, maintaining, and purchasing one or more devices of the building equipment over the duration of the optimization period. In some embodiments, step 1016 includes projecting these costs back to a particular point in time (e.g., the current time) to determine the net present value (NPV) of the one or more devices of the building equipment at a particular point in time. For example, step 1016 can include projecting each of the costs in objective function J back to the current time using the following equation:

$$NPV_{cost} = \sum_{i=1}^{h} \frac{\text{Cost}_i}{(1+r)^i}$$

where r is the interest rate, Cost$_i$ is the cost incurred during time step i of the optimization period, and NPV$_{cost}$ is the net present value (i.e., the present cost) of the total costs incurred over the duration of the optimization period. In some embodiments, step 1016 includes optimizing the net present value NPV$_{cost}$ to determine the NPV of the building equipment at a particular point in time.

As discussed above, one or more variables or parameters in the objective function J can be updated dynamically based on closed-loop feedback from the building equipment. For example, the equipment performance information received from the building equipment can be used to update the reliability and/or the efficiency of the building equipment. Step 1016 can include optimizing the objective function J periodically (e.g., once per day, once per week, once per month, etc.) to dynamically update the predicted cost and/or the net present value NPV$_{cost}$ based on the closed-loop feedback from the building equipment.

In some embodiments, step 1016 include generating optimization results. The optimization results may include the optimal values of the decision variables in the objective function J for each time step i in the optimization period. The optimization results include operating decisions, equipment maintenance decisions, and/or equipment purchase decisions for each device of the building equipment. In some embodiments, the optimization results optimize the economic value of operating, maintaining, and purchasing the building equipment over the duration of the optimization period. In some embodiments, the optimization results optimize the net present value of one or more devices of the building equipment at a particular point in time. The optimization results may cause BMS 606 to activate, deactivate, or adjust a setpoint for the building equipment in order to achieve the optimal values of the decision variables specified in the optimization results.

In some embodiments, process 1000 includes using the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the 25$^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Still referring to FIG. 10, process 1000 is shown to include updating the efficiency and the reliability of the building equipment based on the optimal maintenance strategy (step 1018). In some embodiments, step 1018 includes updating the efficiency $\eta_i$ for one or more time steps during the optimization period to account for increases in the efficiency $\eta$ of the building equipment that will result from performing maintenance on the building equipment or purchasing new equipment to replace or supplement one or more devices of the building equipment. The time steps i at which the efficiency $\eta_i$ is updated may correspond to the predicted time steps at which the maintenance will be performed or the equipment will replaced. The predicted time steps at which maintenance will be performed on the building equipment may be defined by the values of the binary decision variables $B_{main,i}$ in the objective function J. Similarly, the predicted time steps at which the building equipment will be replaced may be defined by the values of the binary decision variables $B_{cap,i}$ in the objective function J.

Step 1018 can include resetting the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, step 1018 can include resetting the value of $\eta_i$ to $\eta_{main}$, where $\eta_{main}$ is the efficiency value that is expected to result from the maintenance performed at time step i. Similarly, if $B_{cap,i}=1$, step 1018 can include resetting the value of $\eta_i$ to $\eta_{cap}$, where $\eta_{cap}$ is the efficiency value that is expected to result from purchasing a new device to supplement or replace one or more devices of the building equipment performed at time step i. Step 1018 can include resetting the efficiency $\eta_i$ for one or more time steps while the optimization is being performed (e.g., with each iteration of the optimization) based on the values of binary decision variables $B_{main,i}$ and $B_{cap,i}$.

Step 1018 may include determining the amount of time $\Delta t_{main,i}$ that has elapsed since maintenance was last performed on the building equipment based on the values of the binary decision variables $B_{main,i}$. For each time step i, step 1018 can examine the corresponding values of $B_{main}$ at time step i and each previous time step (e.g., time steps i−1, i−2, . . . , 1). Step 1018 can include calculating the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, step 1018 may include determining the amount of time $\Delta t_{cap,i}$ that has elapsed since the building equipment were purchased or installed based on the values of the binary decision variables $B_{cap,i}$. For each time step i, step 1018 can examine the corresponding values of $B_{cap}$ at time step i and each previous time step (e.g., time steps i−1, i−2, . . . , 1). Step 1018 can include calculating the value of $\Delta t_{cap,i}$ by subtracting the time at which the building equipment were purchased or installed (i.e., the most recent time at which $B_{cap,i}=1$) from the time associated with time step i. A long amount of time $\Delta t_{cap,i}$ since the building equipment were purchased or installed may result in a lower reliability, whereas a short amount of time since the building equipment were purchased or installed may result in a higher reliability Some maintenance activities may be more expensive than other. However, different types of maintenance activities may result in different levels of improvement to the efficiency $\eta$ and/or the reliability of the building equipment. For example, merely changing the oil in a chiller may result in a minor improvement in efficiency $\eta$ and/or a minor improvement in reliability, whereas completely disassembling the chiller and cleaning all of the chilled water tubes may result in a significantly greater improvement to the efficiency $\eta$ and/or the reliability of the building equipment. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, step 1018 includes identifying the maintenance activity associated with each binary decision variable $B_{main,j,i}$ and resets the efficiency $\eta$ to the corresponding post-maintenance efficiency level $\eta_{main,j}$ if $B_{main,j,i}=1$. Similarly, step 1018 may include identifying the maintenance activity associated with each binary decision variable $B_{main,j,i}$ and can reset the reliability to the corresponding post-maintenance reliability level Reliability$_{main,j}$ if $B_{main,j,i}=1$. Step 1018 can include initiating a maintenance activity for the building equipment in accordance with the maintenance schedule. Initiating the maintenance activity can include prompting a technician to perform maintenance, dispatching maintenance, displaying a recommended maintenance schedule to a user, etc., or any other action to initiate maintenance activity.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency $\eta$ and/or a minor improvement in reliability, whereas purchasing a new chiller and control system may result in a significantly greater improvement to the efficiency $\eta$ and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, step 1018 includes identifying the capital purchase associated with each binary decision variable $B_{main,k,i}$ and resetting the efficiency $\eta$ to the corresponding post-purchase efficiency level $\eta_{cap,k}$ if $B_{cap,k,i}=1$. Similarly, step 1018 may include identifying the capital purchase associated with each binary decision variable $B_{cap,k,i}$ and can resetting the reliability to the corresponding post-purchase reliability level Reliability$_{cap,k}$ if $B_{main,k,i}=1$.

Model Predictive Maintenance with Degradation Estimation/Prediction

Model Predictive Maintenance System with Degradation Impact Model

Figure 11:
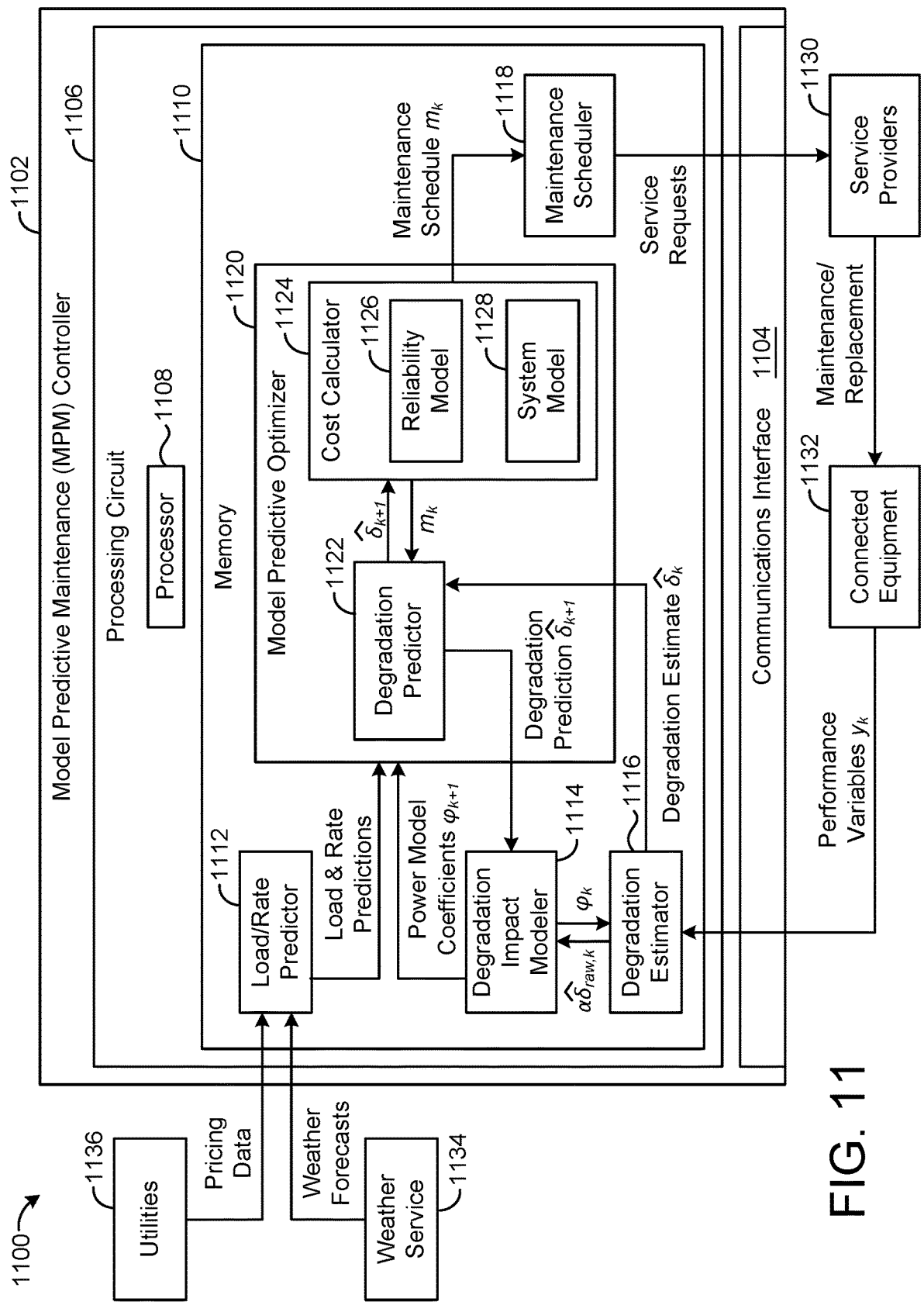
FIG. 11 is another block diagram illustrating the MPM system of FIG. 6 in greater detail, according to some embodiments.

Referring now to FIG. 11, a model predictive maintenance (MPM) system 1100 is shown, according to some embodiments. In some embodiments, one or more of the components of MPM system 1100 may be the same as or similar to the corresponding components of building system 600 and/or MPM system 602 as described with reference to FIGS. 6-10. The components of MPM system 1100 are given new reference numbers in FIG. 11 for ease of explanation. However, it should be understood that MPM system 1100 may be integrated into building system 600 in the same manner as MPM system 602 and may perform some or all of the functions of MPM system 602 as described with reference to FIGS. 6-10.

MPM system 1100 is shown to include a MPM controller 1102, service providers 1130, connected equipment 1132, a weather service 1134, and utilities 1136. Connected equipment 1132 may be the same as or similar to connected equipment 610, as described with reference to FIGS. 6 and 8. For example, connected equipment 1132 may include one or more chillers, boilers, air handling units, batteries, valves, actuators, thermal energy storage tanks, fans, dampers, or any other type of equipment that can be used to perform the various functions of a building or campus. Connected equipment 1132 may include sensors, local controllers, and/or communications electronics capable of providing performance variables $y_k$ to MPM controller 1102.

The performance variables $y_k$ can include measurements or other performance data characterizing the operating performance of connected equipment 1132. For example, the performance variables $y_k$ may include an amount of electricity consumed by connected equipment 1132, an amount of other resources (e.g., water, natural gas, etc.) consumed by connected equipment 1132, an amount of time it takes connected equipment 1132 to affect a desired change in a zone of the building, an operating efficiency of connected equipment 1132 (e.g., a ratio of resources produced to resources consumed, a coefficient of performance, etc.), a number of run hours of connected equipment, or any other variable that can be used to estimate the degradation state of connected equipment 1132. The performance variables $y_k$ can be provided to MPM controller 1102 and used by MPM controller 1102 to estimate a degradation state of connected equipment 1132. In some embodiments, the variable $y_k$ is a vector that includes values for one or more performance variables at time step k.

Service providers 1130 may include any entity capable of performing maintenance on connected equipment 1132, repairing connected equipment 1132, replacing connected equipment 1132, or otherwise performing actions in accordance with the maintenance schedule $m_k$ generated by MPM controller 1102. For example, service providers 1130 may include maintenance personnel who work within the building or campus, external service providers such as contractors, service technicians, or any other person or entity capable of executing the maintenance activities specified by the maintenance schedule $m_k$. Service providers 1130 may receive service requests from MPM controller 1102 and execute the service requests by performing maintenance, repairing, replacing, or otherwise servicing connected equipment 1132.

Weather service 1134 and utilities 1136 may be the same as or similar to weather service 604 and utilities 608, as described with reference to FIGS. 6 and 8. Utilities 1136 may provide utility pricing data (e.g., electricity prices, natural gas prices, water prices, demand charge prices, etc.) to MPM controller 1102, whereas weather service 1134 may provide weather forecasts (e.g., outdoor air temperature, outdoor air humidity, wind speed, precipitation forecasts, etc.) to MPM controller 1102. MPM controller 1102 may use the pricing data and weather forecasts to predict the energy loads of the building or campus and utility prices at each time step of an optimization period.

MPM controller 1102 is shown to include a communications interface 1104 and a processing circuit 1106. Communications interface 1104 may include wired or wireless interfaces (e.g., jacks, antennas, transmitters, receivers, transceivers, wire terminals, etc.) for conducting data communications with various systems, devices, or networks. For example, communications interface 1104 may include an Ethernet card and port for sending and receiving data via an Ethernet-based communications network and/or a Wi-Fi transceiver for communicating via a wireless communications network. Communications interface 1104 may be configured to communicate via local area networks or wide area networks (e.g., the Internet, a building WAN, etc.) and may use a variety of communications protocols (e.g., BACnet, IP, LON, etc.).

Communications interface 1104 may be a network interface configured to facilitate electronic data communications between MPM controller 1102 and various external systems or devices (e.g., connected equipment 1132, utilities 1136, weather service 1134, service providers 1130, etc.). For example, MPM controller 1102 may receive performance variables $y_k$ from connected equipment 1132 indicating one or more measured states of the controlled building (e.g., temperature, humidity, electric loads, etc.) and/or equipment performance information (e.g., run hours, power consumption, operating efficiency, etc.). Communications interface 1104 may receive inputs from utilities 1136, weather service 1134, connected equipment 1132 and may provide a maintenance schedule $m_k$ or service requests to service providers 1130 or other external systems or devices.

Processing circuit 1106 is shown to include a processor 1108 and memory 1110. Processor 1108 may be a general purpose or specific purpose processor, an application specific integrated circuit (ASIC), one or more field programmable gate arrays (FPGAs), a group of processing components, or other suitable processing components. Processor 1108 may be configured to execute computer code or instructions stored in memory 1110 or received from other computer readable media (e.g., CDROM, network storage, a remote server, etc.).

Memory 1110 may include one or more devices (e.g., memory units, memory devices, storage devices, etc.) for storing data and/or computer code for completing and/or facilitating the various processes described in the present disclosure. Memory 1110 may include random access memory (RAM), read-only memory (ROM), hard drive storage, temporary storage, non-volatile memory, flash memory, optical memory, or any other suitable memory for storing software objects and/or computer instructions. Memory 1110 may include database components, object code components, script components, or any other type of information structure for supporting the various activities and information structures described in the present disclosure. Memory 1110 may be communicably connected to processor 1108 via processing circuit 1106 and may include computer code for executing (e.g., by processor 1108) one or more processes described herein.

Still referring to FIG. 11, MPM controller 1102 is shown to include a load/rate predictor 1112, a degradation impact modeler 1114, a degradation estimator 1116, a model predictive optimizer 1120, and a maintenance scheduler 1118. Load/rate predictor 1112 may be configured to predict the energy loads (Load$_i$) (e.g., heating load, cooling load, electric load, etc.) of the building or campus for each time step i of the optimization period. Load/rate predictor 1112 is shown receiving weather forecasts from weather service 1134. In some embodiments, load/rate predictor 1112 predicts the energy loads Load$_i$ as a function of the weather forecasts. In some embodiments, load/rate predictor 1112 uses feedback from connected equipment 1132 to predict loads Load$_i$. Feedback from connected equipment 1132 may include various types of sensory inputs (e.g., temperature, flow, humidity, enthalpy, etc.) or other data relating to the controlled building (e.g., inputs from a HVAC system, a lighting control system, a security system, a water system, etc.) and may be included in performance variables y$_k$.

In some embodiments, load/rate predictor 1112 receives a measured electric load and/or previous measured load data from connected equipment 1132. Load/rate predictor 1112 may predict loads Load$_i$ as a function of a given weather forecast ($\hat{\phi}_w$), a day type (day), the time of day (t), and previous measured load data (Y$_{i-1}$). Such a relationship is expressed in the following equation:

$$Load_i = f(\hat{\phi}_w, day, t | Y_{i-1})$$

In some embodiments, load/rate predictor 1112 uses a deterministic plus stochastic model trained from historical load data to predict loads Load$_i$. Load/rate predictor 1112 may use any of a variety of prediction methods to predict loads Load$_i$ (e.g., linear regression for the deterministic portion and an AR model for the stochastic portion). Load/rate predictor 1112 may predict one or more different types of loads for the building or campus. For example, load/rate predictor 1112 may predict a hot water load Load$_{Hot,i}$, a cold water load Load$_{Cold,i}$, and an electric load Load$_{Elec,i}$ for each time step i within the optimization period. The predicted load values Load can include some or all of these types of loads. In some embodiments, load/rate predictor 1112 makes load/rate predictions using the techniques described in U.S. patent application Ser. No. 14/717,593.

Load/rate predictor 1112 is shown receiving utility rates from utilities 1136. Utility rates may indicate a cost or price per unit of a resource (e.g., electricity, natural gas, water, etc.) provided by utilities 1136 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 1112.

In some embodiments, the utility rates include demand charges for one or more resources provided by utilities 1136. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 1120 may be configured to account for demand charges in a high level optimization process performed by model predictive optimizer 1120. Utilities 1136 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 1112 may store the predicted loads Load$_i$ and the utility rates in memory 1110 and/or provide the predicted loads Load$_i$ and the utility rates to model predictive optimizer 1120.

Degradation estimator 1116 can be configured to estimate the degradation states $\hat{\delta}_k$ of connected equipment 1132. As used herein, the variable $\hat{\delta}_k$ denotes one or more estimated degradation states of connected equipment 1132 at time step k. In some embodiments, the variable $\hat{\delta}_k$ is a vector containing a plurality of degradation state estimates. For example, the variable $\hat{\delta}_k$ may be defined as:

$$\hat{\delta}_k = \begin{bmatrix} \hat{\delta}_{1,k} \\ \hat{\delta}_{2,k} \\ \vdots \\ \hat{\delta}_{n,k} \end{bmatrix}$$

where $\hat{\delta}_{1,k}$ is a first estimated degradation state of connected equipment 1333 at time step k, $\hat{\delta}_{2,k}$ is a second estimated degradation state of connected equipment 1333 at time step k, and $\hat{\delta}_{n,k}$ is a n$^{th}$ estimated degradation state of connected equipment 1333 at time step k, where n is the total number of estimated degradation states contained within vector $\hat{\delta}_k$. In various embodiments, the degradation states $\hat{\delta}_{1,k}$, $\hat{\delta}_{2,k}$, ... $\hat{\delta}_{n,k}$ may represent degradation states of different devices of connected equipment 1132 (e.g., the degradation state of a chiller, the degradation state of a boiler, the degradation state of a fan, etc.) and/or degradation states of particular components of a device of connected equipment 1132 (e.g., the degradation state of a chiller's compressor, the degradation state of the same chiller's refrigerant tubes, etc.).

In some embodiments, degradation estimator 1116 estimates the degradation states $\hat{\delta}_k$ based on the performance variables y$_k$ received from connected equipment 1132. Values of the performance variables y$_k$ can be gathered by various sensors and/or other devices in a building and provided as inputs to degradation estimator 1116. For example, y$_k$ can include information such as an operating temperature of a building device as gathered by a temperature sensor, power consumption of a building device as gathered by an electrical measurement device, a current flowing through building equipment, a pressure of components in a building device, etc. Degradation estimator 1116 can estimate the degradation state $\hat{\delta}_k$ of connected equipment 1132 at time step k as a function of the performance variables $y_k$, as shown in the following equation:

$$\hat{\delta}_k = f(y_k)$$

where the function $f( )$ is a function that relates the performance variables $y_k$ to the degradation states $\hat{\delta}_k$.

It is contemplated that the function $f( )$ can have any of a variety of forms. For example, the function $f( )$ may include operations that compare one or more values of the performance variables $y_k$ (or functions thereof) to design parameters of connected equipment 1132 and calculate the degradation states $\hat{\delta}_k$ based on the values of the performance variables $y_k$ relative to the design parameters (e.g., a ratio of operating efficiency at time step k relative to design efficiency). In other embodiments, the function $f( )$ may represent a degradation estimation model that can be generated empirically by degradation estimator 1116. For example, degradation estimator 1116 may use a set of historical data from one or more building sites to train the degradation estimation model. The set of historical data may include values of the performance variables $y_k$ and corresponding values of the degradation states $\hat{\delta}_k$ or values representative of the degradation states $\hat{\delta}_k$ (e.g., equipment efficiency, operating cost, etc.). The degradation estimation model may include a regression model, a neural network, or any other type of model that provides a mapping between the performance variables $y_k$ and the degradation states $\hat{\delta}_k$. The estimated degradation state $\hat{\delta}_k$ at time step k can be provided to degradation predictor 1122.

In some embodiments, degradation estimator 1116 generates a raw degradation estimate $\hat{\delta}_{raw,k}$. The raw degradation estimate $\hat{\delta}_{raw,k}$ may be a function of the performance variables $y_k$ and can be calculated using the same or similar technique as the estimated degradation states $\hat{\delta}_k$. Like the estimated degradation states $\hat{\delta}_k$, the raw degradation estimate $\hat{\delta}_{raw,k}$ may be a vector that includes an estimated degradation state for each device of connected equipment 1132 and/or components of the devices of connected equipment 1132. In some embodiments, the raw degradation estimate $\hat{\delta}_{raw,k}$ is a function of the values of the performance variables $y_k$ at time step k and one or more previous time steps. For example, the raw degradation estimate $\hat{\delta}_{raw,k}$ can be defined as:

$$\hat{\delta}_{raw,k} = f(Y_k)$$

where $Y_k$ is a matrix that includes all of the values of the performance variables $y_k$ over the period of time from $k-h_b$ to k, where k is the time step at which the degradation state is evaluated and $h_b$ is a backward looking time horizon. The matrix $Y_k$ may include a value of each performance variable at each time step from $k-h_b$ to k and may be defined as:

$$Y_k = \begin{bmatrix} y_{1,k-h_b} & \cdots & y_{1,k} \\ \vdots & \ddots & \vdots \\ y_{n,k-h_b} & \cdots & y_{n,k} \end{bmatrix}$$

where $y_1$ is the first performance variable, $y_n$ is the $n^{th}$ performance variable, $k-h_b$ is the first time step included in the matrix $Y_k$ (i.e., $h_b$ time steps before time step k), and k is the last time step included in the matrix $Y_k$. The raw degradation state $\hat{\delta}_{k,raw}$ at time step k can be provided to degradation impact modeler 1114.

In some embodiments, degradation estimator 1116 scales the raw degradation state $\hat{\delta}_{raw,k}$ by a scaling factor $\alpha$ (e.g., by multiplying $\hat{\delta}_{raw,k}$ by the scaling factor $\alpha$) to produce a scaled degradation estimate $\alpha\hat{\delta}_{raw,k}$. The scaled degradation estimate $\alpha\hat{\delta}_{raw,k}$ represents a scaled output of degradation estimator 1116 and can be provided to degradation impact modeler 1114. Scaling the values of $\hat{\delta}_{raw,k}$ can ensure inputs to a neural network used by degradation impact modeler 1114 are scaled to limit the values between a lower threshold and an upper threshold. Degradation estimator 1116 can provide the scaled values of $\alpha\hat{\delta}_{raw,k}$ to degradation impact modeler 1114. If a scale value of $\hat{\delta}_{raw,k}$ is not calculated, a can effectively be considered one (i.e. 1.0). Degradation impact modeler 1114 can use the values of $\alpha\hat{\delta}_{raw,k}$ to train a neural network to map degradation states to power model coefficients, described in greater detail below.

In some embodiments, degradation estimator 1116 performs an optimization process to generate a value of the scaling factor $\alpha$. For example, degradation estimator 1116 can find value of the scaling factor $\alpha$ that optimizes the following objective function:

$$\underset{\alpha}{\operatorname{argmin}} \sum_{l=1}^{\infty} \left| P_{k-l} - \hat{P}_{k-l}(Q_{k-l}, \varphi(\alpha\hat{\delta}_{raw,k})) \right| e^{-\frac{l}{\tau}}$$

where $P_{k-l}$ is the actual power consumption of connected equipment 1132 at time step k-l, $\hat{P}_{k-l}$ is a predicted power consumption of connected equipment 1132 at time step k-l, $Q_{k-l}$ is the heating or cooling load of connected equipment 1132 at time step k-l, $\varphi$ are coefficients of a power consumption model used to predict $\hat{P}_{k-l}$, and $e^{-l/\tau}$ is a weighting factor. The predicted power consumption $\hat{P}_{k-l}$ can be predicted using a power model that predicts $\hat{P}_{k-l}$ as a function of power model coefficients $\varphi$ and the heating or cooling load $Q_{k-l}$. The power model coefficients $\varphi$ can be generated by degradation impact modeler 1114 as a function of the degradation state $\alpha\hat{\delta}_{raw,k}$, as described in greater detail below. By optimizing this objective function, degradation estimator 1116 may seek to minimize the difference between the actual power consumption $P_{k-l}$ and the model predicted power consumption $\hat{P}_{k-l}$.

In some embodiments, degradation estimator 1116 separates the degradation estimation into two processes: (1) an offline process that trains a degradation estimation model with historical data from various building sites and (2) an online process that uses data from past time horizons from the specific building site at which connected equipment 1132 are located and estimates the current state of degradation $\hat{\delta}_k$. Calculating the values of the degradation states $\hat{\delta}_k$ as a function of the performance variables $y_k$ using the function $f( )$ can be considered the online portion, whereas generating the degradation estimation model represented by the function $f( )$ can be considered the offline portion.

Degradation impact modeler 1114 can be configured to determine the impact of the estimated degradation state $\hat{\delta}_k$ or scaled degradation estimate $\alpha\hat{\delta}_{raw,k}$ on the cost of operating connected equipment 1132. In some embodiments, the cost of operating connected equipment 1132 depends on the amount of electric power or other resource (e.g., water, natural gas, etc.) consumed by connected equipment 1132 during operation, which in turn may be a function of the degradation state. Although degradation impact modeler 1114 is described primarily with reference to electric power consumption, it should be understood that any other resource consumed by connected equipment 1132 can be used instead of electric power or in addition to electric power without departing from the teachings of the present disclosure.

Advantageously, degradation impact modeler 1114 can be configured to predict the power consumption of connected equipment 1132 as a function of the estimated degradation state $\hat{\delta}_k$ or scaled degradation estimate $\alpha\hat{\delta}_{raw,k}$. For ease of explanation, the following description assumes that degradation impact modeler 1114 uses the scaled degradation estimate $\alpha\hat{\delta}_{raw,k}$. However, it should be understood that the estimated degradation state $\hat{\delta}_k$ can be used in place of or in addition to the scaled degradation estimate $\alpha\hat{\delta}_{raw,k}$ without departing from the teachings of the present disclosure. The predicted power consumption of connected equipment 1132 can be provided to model predictive optimizer 1120 for use in calculating the cost of operating connected equipment.

In some embodiments, degradation impact modeler 1114 is configured to generate power model coefficients $\varphi$ of connected equipment 1132 as a function of the estimated degradation state $\hat{\delta}_k$ or scaled degradation estimate $\alpha\hat{\delta}_{raw,k}$. The power model coefficients $\varphi$ may be coefficients of a power consumption model that is used by model predictive optimizer 1120 to determine that power consumption of connected equipment 1132 as a function of the operating decisions for connected equipment 1132. For example, the power consumption model may provide a mapping between the amount of power consumed by connected equipment 1132 and the heating or cooling load on connected equipment 1132 (e.g., if connected equipment 1132 is a heater or chiller). More generally, the power consumption model may be a function or curve that defines the relationship between the amount of an input resource (or multiple input resources) consumed by connected equipment 1132 and the corresponding amount of an output resource (or multiple output resources) produced by connected equipment 1132. In this regard, the power consumption model may be similar to or the same as equipment models 818, described with reference to FIG. 8. As the degradation state of connected equipment 1132 increases, degradation impact modeler 1114 may update the power consumption model to reflect the decreased efficiency of connected equipment 1132 as a result of the degradation. Accordingly, by mapping the scaled degradation estimate $\alpha\hat{\delta}_{raw,k}$ to the power model coefficients $\varphi$, degradation impact modeler 1114 can automatically adjust the power consumption model to account for equipment degradation. The updated values of the power model coefficients $\varphi$ may be provided as an input to model predictive optimizer 1120.

Still referring to FIG. 11, model predictive optimizer 1120 can be configured to perform an optimization process to generate the maintenance schedule $m_k$ for connected equipment 1132 along with operating decisions for connected equipment 1132. Model predictive optimizer 1120 may receive the degradation estimate $\hat{\delta}_k$ from degradation estimator 1116, the load and rate predictions from load/rate predictor 1112, and the power model coefficients $\varphi$ from degradation impact modeler 1114. Model predictive optimizer 1120 may use these inputs to perform an optimization process that seeks to optimize (e.g., minimize) the total cost of operating connected equipment 1132 and performing maintenance on connected equipment 1132 over a given time period (i.e., the optimization period).

The maintenance schedule $m_k$ may be provided as an output of the optimization process performed by model predictive optimizer 1120. It should be appreciated that $m_k$ can be likewise referred to as a maintenance schedule, a maintenance and replacement schedule, and/or a maintenance strategy. The maintenance schedule $m_k$ can include various information such as when connected equipment 1132 should have maintenance or replacement performed, specific building devices of connected equipment 1132 to have maintenance or replacement performed, equipment parts required for the maintenance or replacement activities, etc. It should be understood that the maintenance schedule $m_k$ is not limited to maintenance activities and can also include replacement activities, equipment upgrades, adding new equipment that does not replace existing equipment, or any other type of service or modification that alters the set of connected equipment 1132 as a whole. In general, the maintenance schedule $m_k$ can include any information necessary for connected equipment 1132 to be suitably maintained, replaced, upgraded, repaired, and/or otherwise serviced.

Model predictive optimizer 1120 is shown to include a degradation predictor 1122 and a cost calculator 1124. Degradation predictor 1122 can be configured to predict future degradation states $\hat{\delta}_{k+1}$ of connected equipment 1132 at one or more time steps after time step k. In some embodiments, degradation predictor 1122 uses a degradation prediction model to predict the future degradation states $\hat{\delta}_{k+1}$ as a function of the degradation states $\hat{\delta}_k$ at time step k and the maintenance schedule $m_k$ for time step k. For example, the future degradation states $\hat{\delta}_{k+1}$ can be predicted using the following equation:

$$\hat{\delta}_{k+1} = f(\hat{\delta}_k, m_k)$$

where $\hat{\delta}_{k+1}$ is a vector of the future degradation states of connected equipment 1132 at a future time step k+1 (i.e., a time step after k) and $m_k$ is the maintenance schedule at time step k. In some embodiments, the maintenance schedule $m_k$ is generated by cost calculator 1124 and provided back to degradation predictor 1122 to predict the future degradation states $\hat{\delta}_{k+1}$.

In some embodiments, both the maintenance schedule $m_k$ and the future degradation states $\hat{\delta}_{k+1}$ are generated as results of an optimization process performed by model predictive optimizer 1120. The optimization process may seek to optimize (e.g., minimize) the total cost of operating connected equipment 1132 and performing maintenance on connected equipment 1132 over a given time horizon. The cost of operating connected equipment 1132 at the future time step k+1 can be defined as a function of the future degradation states $\hat{\delta}_{k+1}$. Both the cost of performing maintenance on connected equipment 1132 and the future degradation states $\hat{\delta}_{k+1}$ can be defined as functions of the maintenance schedule $m_k$. For example, maintenance/replacement activities that occur at time step k can affect (e.g., improve) a degradation state of connected equipment 1132 and therefore can affect a predicted degradation state at time step k+1. Accordingly, the optimization performed by model predictive optimizer 1120 may generate optimal values of the maintenance schedule $m_k$ and the resulting future degradation states $\hat{\delta}_{k+1}$. The future degradation states $\hat{\delta}_{k+1}$ may be provided as an input to degradation impact modeler 1114 and used by degradation impact modeler 1114 to determine the corresponding values of the power model coefficients $\varphi_{k+1}$ at the future time step.

Cost calculator 1124 is shown to include a reliability model 1126 and a system model 1128. Reliability model 1126 can be used to estimate projections of reliability forward in time for connected equipment 1132. In this way, reliability model 1126 can incorporate a risk of failure of connected equipment 1132 into the optimization problem solved by model predictive optimizer 1120. System model 1128 may model the operating performance of connected equipment 1132 and may include the power consumption model described above (or any other model that relates input resource consumption to output resource generation). In some embodiments, system model 1128 has parameters φ as well as the independent variable inputs x. For example, system model 1128 may have the form:

$$p = p_{equip}(\varphi; x)$$

where p is the predicted power consumption of connected equipment 1320, $p_{equip}$ is a function that defines power consumption p as a function of the power model parameters φ and the independent variables x, φ includes estimated power parameters, and x is a matrix or vector of power estimation predictors (i.e., independent variables).

For example, in a variable refrigerant flow (VRF) system, system model 1128 may define the power consumption of VRF equipment (i.e., a type of connected equipment 1132) as a function of one or more model parameters φ and a set of independent variable inputs x that represent the heating and cooling loads on the system (i.e., $\hat{Q}_h$ and $\hat{Q}_c$) as well as the temperature lift $\hat{T}_{lift}$ (i.e., the difference between outdoor air temperature and a setpoint temperature value). Accordingly, the matrix or vector of independent variable inputs x can be defined as:

$$x = \begin{bmatrix} \hat{Q}_c \\ \hat{Q}_h \\ \hat{T}_{lift} \end{bmatrix}$$

where $\hat{Q}_c$ is the estimated cooling load, $\hat{Q}_h$ is the estimated heating load, and $\hat{T}_{lift}$ is a lift temperature. Although x is shown as a vector in the equation above, it should be understood that each of the variables $\hat{Q}_c$, $\hat{Q}_h$, and $\hat{T}_{lift}$ may include multiple values (e.g., one value for each time step. The multiple values of $\hat{Q}_c$, $\hat{Q}_h$, and $\hat{T}_{lift}$ can be included in x by adding another dimension to x, in which case x becomes a 3 by n matrix where n is the total number of time steps included in the matrix x.

Continuing the example of the VRF system, the system model 1128 for the VRF system can be defined as:

$$P = P_{design}((\varphi_1 \cdot \max(\hat{Q}_c, \hat{Q}_h) + \varphi_2 \cdot |\hat{Q}_c - \hat{Q}_h| \varphi_3 \cdot \max(\hat{Q}_c, \hat{Q}_h)) \cdot \hat{T}_{lift})$$

where p is the power consumption of the VRF equipment, $P_{design}$ is the design power of the VRF equipment, $\varphi_1$, $\varphi_2$, and $\varphi_3$ are parameters of the system model 1128, and the remaining variables are the same as previously described.

Cost calculator 1124 may use the power model coefficients $\varphi_{k+1}$ provided by degradation impact modeler 1114 to update system model 1128 and may use the updated system model 1128 to formulate the optimization problem. For example, cost calculator 1124 may use system model 1128 to define a relationship between the power consumption of connected equipment 1132 and the load served by connected equipment 1132. The relationship between power consumption and load served may be imposed as a constraint on the optimization problem solved by model predictive optimizer 1120.

Cost calculator 1124 can be configured to obtain (e.g., generate, receive, formulate, etc.) an objective function J that is optimized by model predictive optimizer 1120. An example of such an objective function J is:

$$J(m_k) = \sum_{i=k}^{h_b+k-1} \left\{ c_{op,i}(\delta_i) + \begin{bmatrix} c_{main,i} \\ c_{replace,i} \end{bmatrix}^T m_i + c_{fail,i}^T p_{fail,i}(\delta_i) \right\}$$

where $m_k$ is a maintenance and replacement schedule, k is a given time step (past, present, or future) $h_b$ is a backward optimization horizon (backward from the time step k), $c_{op,i}(\delta_i)$ is an operational cost dependent on a degradation state $\delta_i$ at time step i, $c_{main,i}$ is a cost of maintenance at time step i, $c_{replace,i}$ is a replacement cost at time step i, $m_i$ is a binary vector representing which maintenance actions are taken at time step i, $c_{fail,i}$ is a cost of failure of building equipment at time step i, and $p_{fail,i}(\delta_i)$ is a vector of probabilities of failure for each component of building equipment dependent on the state of degradation $\delta_i$. In the above objective function, the T superscript indicates a transpose of the associated matrix. Values of $c_{fail,k}$ can include a cost to repair/replace the tracked building equipment and/or any opportunity costs related to failure of the tracked building equipment.

It should be appreciated that a first portion of the maintenance vector $m_i$ (i.e., the portion to which maintenance costs $c_{main,i}$ are applied) includes maintenance decisions, whereas a second portion of the maintenance vector $m_i$ (i.e., the portion to which replacement costs $C_{replace,i}$ are applied) includes replacement decisions. For example, the maintenance vector $m_i$ can be defined as $$m_i = \begin{bmatrix} m_{main,i} \\ m_{replace,i} \end{bmatrix}.$$

Each maintenance action $m_{main,i}$ is associated with a corresponding maintenance cost $c_{main,i}$ whereas each replacement action $m_{replace,i}$ is associated with a corresponding replacement cost $c_{replace,i}$. Further, it should be appreciated that $c_{fail,k}^T p_{fail,k}(\delta_k)$ represents a risk cost term of the objective function. In some embodiments, the probability of failure (PoF) given each degradation state, $p_{fail,k}(\delta_k)$, can be an output of reliability model 1126.

The objective function J is shown as a summation of three costs. The first term of the objective function J (i.e., $c_{op,i}(\delta_i)$) represents the total cost of operating connected equipment 1132 over the time period from time step k to time step $h_b+k-1$. The second term of the objective function J (i.e., $$\begin{bmatrix} c_{main,i} \\ c_{replace,i} \end{bmatrix}^T m_i)$$

represents the total cost of performing any of the maintenance or replacement activities defined by the maintenance vector $m_i$ on connected equipment 1132 over the time period from time step k to time step $h_b+k-1$. The third term of the objective function J (i.e., $c_{fail,i}^T p_{fail,k}(\delta_k)$) represents the total cost of failure of connected equipment 1132 over the time period from time step k to time step $h_b+k-1$. The time step k can be any time step in the past, present, or future. Accordingly, the time period ranging from time step k to time step $h_b+k-1$ may be entirely in the past; partially in the past and partially in the present; partially in the past, present, and future; partially in the present and partially in the future; or entirely in the future in various embodiments.

Model predictive optimizer 1120 can be configured to perform an optimization of the objective function J subject to a set of constraints. The constraints may include the power consumption model or any other type of system model 1128 that defines the relationship between the operating cost $c_{op,i}$ and the load served by connected equipment 1132. For example, one constraint on the objective function J may be a power consumption model that defines the amount of power consumed $p_1$ as a function of the load served by connected equipment and the power model parameters $\varphi_1$. Another constraint on the objective function J may be a cost model that defines the operating cost $c_{op,i}$ as a function of the amount of power consumed $p_i$ and the pricing data received from utilities 1136. Another constraint on the objective function J may be a model that defines the relationship between the probability of failure $p_{fail,i}$ and the degradation state $\delta_i$. Another constraint on the objective function J may require connected equipment 1132 to satisfy the predicted heating or cooling load provided by load/rate predictor 1112. Another constraint on the objective function J may require connected equipment 1132 to operate within their respective capacity limits (e.g., limiting the amount of input resources consumed, output resources produced, or other capacity-related variables at each time step). Other constraints on the objective function J can include any of the equations or relationships described with reference to operational cost predictor 910, maintenance cost predictor 920, and capital cost predictor 930, as described with reference to FIG. 9.

Model predictive optimizer 1120 can perform an optimization of the objective function J, subject to the constraints, to determine the maintenance schedule $m_k$ as well as operating decisions for connected equipment 1132. The maintenance schedule $m_k$ can be provided to maintenance scheduler 1118, which may operate to schedule maintenance/replacement activities to be performed by service providers 1130 at times indicated by $m_k$. In some embodiments, maintenance scheduler 1118 selects a particular service provider 1330 by determining available service providers 1130 that are capable of performing a maintenance/replacement activity indicated by $m_k$ at a particular time. If $m_k$ indicates multiple maintenance/replacement activities to be performed, maintenance scheduler 1118 may schedule each particular activity at an associated time. It should be appreciated that different service providers 1130 can be scheduled for different maintenance/replacement activities. In other words, the same service provider 1330 need not perform all maintenance/replacement activities indicated by $m_k$.

Service providers 1130 may receive service requests from maintenance scheduler 1118 and perform the requested maintenance/replacement activities. As a result of the maintenance/replacement activity, the degradation state of connected equipment 1132 can be improved (e.g., reduced). In this way, operational costs associated with connected equipment 1132 can be reduced. The maintenance/replacement activities performed by service providers 1130 can include any number of maintenance/replacement activities as indicated by $m_k$ and scheduled by maintenance scheduler 1118.

Degradation Impact Modeling

Figure 12:
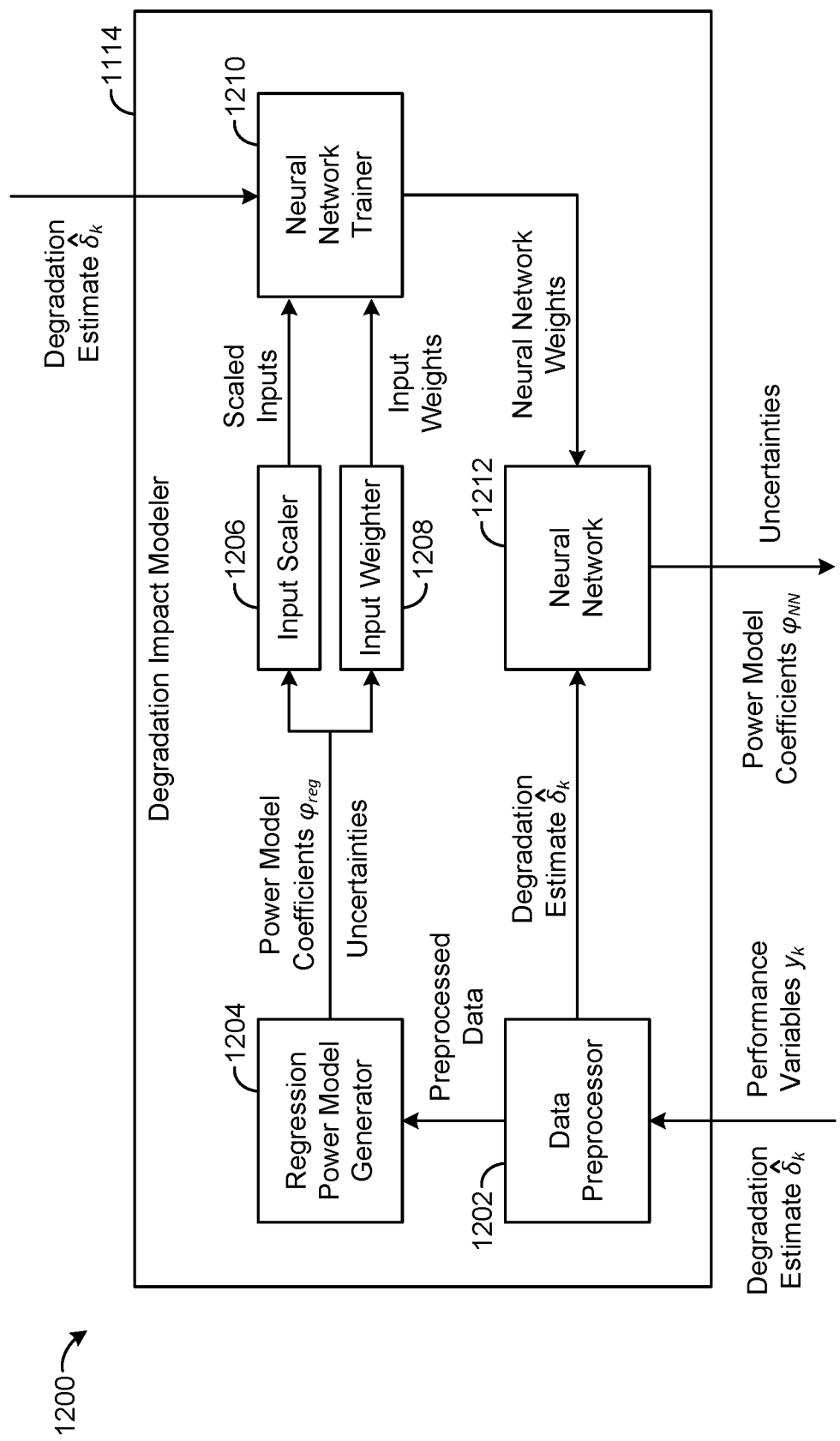
FIG. 12 is a block diagram illustrating a portion of the MPM system of FIG. 11 in greater detail, according to some embodiments.

Referring now to FIG. 12, a block diagram illustrating degradation impact modeler 1114 in greater detail is shown, according to an exemplary embodiment. As discussed above, degradation impact modeler 1114 may be configured to generate power model coefficients $\varphi$ of connected equipment 1132 as a function of the estimated degradation state $\hat{\delta}_k$. The power model coefficients $\varphi$ may be coefficients of a power consumption model that is used by model predictive optimizer 1120 to determine that power consumption of connected equipment 1132 as a function of the operating decisions for connected equipment 1132. For example, the power consumption model may provide a mapping between the amount of power consumed by connected equipment 1132 and the heating or cooling load on connected equipment 1132 (e.g., if connected equipment 1132 is a heater or chiller).

Although degradation impact modeler 1114 is described primarily with reference to electric power consumption, it should be understood that any other resource consumed by connected equipment 1132 can be used instead of electric power or in addition to electric power without departing from the teachings of the present disclosure. For example, the power consumption model may be a function or curve that defines the relationship between the amount of an input resource (or multiple input resources) consumed by connected equipment 1132 and the corresponding amount of an output resource (or multiple output resources) produced by connected equipment 1132, even if none of the input resources or output resources are electric power. In some embodiments, the input resource is electric power and the output resources are heating or cooling load. However, the input resource and output resource can be replaced with any other resources in various embodiments. For example, a gas-fueled boiler may consume natural gas as the input resource instead of electric power.

In some embodiments, degradation impact modeler 1114 uses a neural network 1212 to generate the power model coefficients $\varphi_{NN}$ as a function of the estimated degradation state $\hat{\delta}_k$. Degradation impact modeler 1114 may train the neural network 1212 using a set of training data that includes input values of the estimated degradation state $\hat{\delta}_k$ and corresponding values of the power model coefficients $\varphi_{reg}$. The values of the estimated degradation state $\hat{\delta}_k$ in the training data may be generated by degradation estimator 1116 as described above. The values of the power model coefficients $\varphi_{reg}$ in the training data may be generated by performing a regression process, described in greater detail below. As used herein, the variable $\varphi_{NN}$ denotes the power model coefficients generated by neural network 1212, whereas the variable $\varphi_{reg}$ denotes the power model coefficients generated by performing the regression process. Although degradation impact modeler 1114 is described primarily as using neural network 1212 to generate the power model coefficients and/or predict the resource consumption as a function of the estimated degradation state, it should be understood that any other type of model (i.e., other than neural network models) can be used in addition to or in place of neural network 1212. Examples of such models may include regression models, polynomial models, physics-based models, linear or nonlinear models, static or dynamic models, discrete or continuous models, deterministic or stochastic models, or any other type of model that relates the estimated degradation state to the power model coefficients and/or the predicted resource consumption.

Degradation impact modeler 1114 is shown to include a data preprocessor 1202. Data preprocessor 1202 can be configured to associate values of the performance variables $y_k$ with corresponding values of the estimated degradation state $\hat{\delta}_k$. The performance variables $y_k$ may include any of a variety of variables that characterize the performance of connected equipment 1132 including for example, power consumption, natural gas consumption, water consumption, heating load produced, cooling load produced, temperature lift, or any other variable that indicates the resource consumption or production of connected equipment 1132 or characterizes the performance of connected equipment 1132. In some embodiments, data preprocessor 1202 generates a plurality of different sets of preprocessed data. Each set of preprocessed data may include a value of the estimated degradation state $\hat{\delta}_k$ and corresponding values of the performance variables $y_k$.

In some embodiments, data preprocessor 1202 prepares the raw input data to be used by regression power model generator 1204. For example, data preprocessor 1202 may modify the input data such that it fits an expected form for use in the power regression model. Prior to being processed, a raw dataset can include one or more files (e.g., an Excel file) which are a combination of both cooling and heating mode data. Each file in the raw dataset can be related to a specific degradation case that has been generated by simulation for an amount of time (e.g., one hour, two hours, etc.). Each file can include several feature columns. However, only specific features of the raw dataset may be needed by regression power model generator 1204.

Data preprocessor 1202 can be configured to extract information from the raw data including a degradation state, a power value, a load value, $\hat{T}_{lift}$, $\hat{P}_{lift}$, etc. Data preprocessor 1202 can also organize the extracted information based on the degradation state. In particular, information related to the same degradation state can be concatenated together. In some embodiments, the processed data is divided into processed data files. Each processed data file can include both heating and cooling mode information. As a result of performing the preprocessing, data preprocessor 1202 can generate one or more data files such that each data file relates to a different degradation case and is ready to feed to regression power model generator 1204.

Regression power model generator 1204 can be configured to perform a regression process to generate a set of power model coefficients $\varphi_{reg}$ and related uncertainties based on the preprocessed data. The power model coefficients $\varphi_{reg}$ parameters may be used to train neural network 1212. To obtain the power model coefficients $\varphi_{reg}$ and related uncertainties, regression power model generator 1204 can perform a regression process, using the preprocessed data as training data, to generate a power consumption regression model. For example, the preprocessed data may include values of power consumption P, heating load $\dot{Q}_h$, cooling load $\dot{Q}_c$, temperature lift $T_{lift}$, or any other variable included in the power consumption regression model. Regression power model generator 1204 can use any of a variety of regression techniques (e.g., ordinary least squares, linear, nonlinear, weighted least squares, ridge regression, etc.) to generate the power model coefficients $\varphi_{reg}$. The following equation is one example of the power consumption model for which the power model coefficients $\varphi_{reg}$ can be generated:

$$P = \varphi_1 * \max(\dot{Q}_c, \dot{Q}_h) + \varphi_2 * \max(\dot{Q}_c, \dot{Q}_h) * T_{lift}$$

where P is a power value, $\varphi_1$ and $\varphi_2$ are the power model coefficients, $\dot{Q}_c$ is an estimated cooling load, $\dot{Q}_h$ is an estimated heating load, and $T_{lift}$ is the difference between the outside ambient temperature and the predefined setpoint value.

In some embodiments, it may be desirable to have uncorrelated predictors in the power consumption model. In other words, it may be desirable that the terms of the power consumption model are not correlated with each other. Regression power model generator 1204 can be configured to reduce or eliminate correlation between the two predictors $\max(\dot{Q}_c, \dot{Q}_h)$ and $\max(\dot{Q}_c, \dot{Q}_h) * T_{lift}$. Eliminating the correlation can be achieved using orthogonalization by performing two consecutive regression steps.

In some embodiments, regression power model generator 1204 performs the first regression step using the following model:

$$\max(\dot{Q}_c, \dot{Q}_h) * T_{lift} = \varphi_1 * \max(\dot{Q}_c, \dot{Q}_h) + \text{Residual of}(\max(\dot{Q}_c, \dot{Q}_h) * T_{lift})$$

In the first regression step, a regression model can be constructed for the second predictor (i.e., $\max(\dot{Q}_c, \dot{Q}_h) * T_{lift}$) based on the first predictor (i.e., $\max(\dot{Q}_c, \dot{Q}_h)$). The residual obtained in the first regression step (i.e., Residual of (max $(\dot{Q}_c, \dot{Q}_h) * T_{lift}$)) indicates the amount of the second predictor that is orthogonal or uncorrelated with the first predictor. Regression power model generator 1204 can provide the values of heating load $\dot{Q}_h$, cooling load $\dot{Q}_c$, and temperature lift $T_{lift}$ as inputs to the regression process to determine the values of $\varphi_1$ and the residual Residual of $(\max(\dot{Q}_c, \dot{Q}_h) * T_{lift})$.

In some embodiments, regression power model generator 1204 performs the second regression step using the following model:

$$P = \varphi_1' * \max(\dot{Q}_c, \dot{Q}_h) + \varphi_2' * \text{Residual of}(\max(\dot{Q}_c, \dot{Q}_h) * T_{lift})$$

where P is the desired variable of power. Regression power model generator 1204 can provide the values of power consumption P, heating load $\dot{Q}_h$, cooling load $\dot{Q}_c$, and the residual Residual of $(\max(\dot{Q}_c, \dot{Q}_h) * T_{lift})$ as inputs to the second regression step to determine the values of $\varphi_1'$ and $\varphi_2'$ and their related uncertainties. Accordingly, the final outputs of the regression process are the power model coefficients $\varphi_1'$ and $\varphi_2'$ and their related uncertainties (for parameters total). $\varphi_1'$ and $\varphi_2'$ are also referred to as $\varphi_{1,reg}$ and $\varphi_{2,reg}$ respectively, or $\varphi_{reg}$ collectively, throughout the present disclosure. In some embodiments, regression power model generator 1204 removes outputs which have p-values greater than a threshold value (e.g., 0.1).

Regression power model generator 1204 can be configured to repeat the regression process for each set of the preprocessed data to generate a plurality of different sets of power model coefficients $\varphi_{reg}$. Each set of the power model coefficients $\varphi_{reg}$ may be associated with a corresponding set of estimated degradation states $\hat{\delta}_k$. Regression power model generator 1204 can update the sets of preprocessed data provided by data preprocessor 1202 to include the values of the power model coefficients $\varphi_{reg}$ that were generated from the corresponding values of the performance variables $y_k$ and may associate each set of the power model coefficients $\varphi_{reg}$ with the degradation states $\hat{\delta}_k$ previously associated with the corresponding values of the performance variables $y_k$. From a physical standpoint, the set of power model coefficients $\varphi_{reg}$ represents the relationship between resource consumption (e.g., power consumption) and resource production (e.g., heating or cooling load) predicted to result from the corresponding degradation states $\hat{\delta}_k$.

Degradation impact modeler 1114 is shown to include an input scaler 1206 and an input weighter 1208. In some embodiments, prior to using the sets of power model coefficients $\varphi_{reg}$ and corresponding degradation states $\hat{\delta}_k$ as inputs to train neural network 1212, input scaler 1206 may scale these inputs to limit their values between a lower threshold and an upper threshold. For example, input scaler 1206 may add or subtract a scaling value from the inputs and/or multiply the inputs by a scaling factor to ensure that each input has a value between the lower and upper thresholds. In some embodiments, input scaler 1206 standardizes (e.g., modifies, adjusts, etc.) the input data such that adjusted values have zero mean and unity variance.

Input weighter 1208 can be configured to assign a weight to each set of power model coefficients $\varphi_{reg}$ and corresponding degradation states $\hat{\delta}_k$. It may be beneficial in training neural network 1212 if inputs that correspond to more efficient operation of connected equipment 1132 (e.g., higher coefficient of performance (COP) values) have a larger effect on training neural network 1212 as compared to inputs that correspond to less efficient operation of connected equipment 1132 (e.g., lower COP values). Input weighter 1208 can apply a weighting function to the inputs to assign larger weights to inputs with higher COP values and smaller weights to inputs with higher COP values.

To generate the weight function, input weighter 1208 can divide the model used in the second regression step described above by the variable $\max(\dot{Q}_c, \dot{Q}_h)$. This results in the left side of the equation being the inverse of the coefficient of performance (i.e., 1/COP) and the right side of the equation being proportional to $\varphi_1'$. Accordingly, this relationship is defined as:

$$\varphi_1' \propto \frac{1}{COP}$$

Due to the inverse relationship between $\varphi_1'$ and COP, input weighter 1208 can generate a weighting function that assigns weights that are inversely proportional to the value of $\varphi_1'$. An example of such a weighting function is:

$$\text{weight}=10^{1-\varphi_1'}$$

Referring still to FIG. 12, neural network trainer 1210 is shown receiving scaled inputs input scaler 1206 (e.g., the power model coefficients $\varphi_{reg}$) and the corresponding input weights from input weighter 1208. Neural network trainer 1210 may also receive the estimated degradation states $\hat{\delta}_k$ from degradation estimator 1116. Neural network trainer 1210 may use these inputs to train neural network 1212. In some embodiments, neural network 1212 is a radial basis function neural network (RBFNN). However, other various types of neural networks can be used. Neural network trainer 1210 can train neural network 1212 to map between the degradation states $\hat{\delta}_k$ and the power model parameters $\varphi_{reg}$. Accordingly, once neural network 1212 has been trained, the output of neural network 1212 (i.e., $\varphi_{NN}$) may be the same as or similar to the values of $\varphi_{reg}$ used to train neural network 1212.

Neural network 1212 can be configured to map degradation states $\hat{\delta}_k$ of connected equipment 1132 to the power model coefficients $\varphi_{NN}$, which can be used to calculate predicted operational costs for connected equipment 1132. The degradation states $\hat{\delta}_k$ can specify which of the degradation indices is contributing to coefficients of power (COP) reduction. For this reason, it can be desirable to have a standard COP calculation from the degradation states $\hat{\delta}_k$ that is consistent with a standard COP calculation from measuring the site data. For example, a standard COP calculation can be given by the following equation:

$$\overline{COP}(\Phi_{reg}, x_{standard}, w) = \overline{COP}((\varphi_{NN}, x_{standard}, w)$$

where $\varphi_{reg}$ are the values of the power model coefficients generated by regression power model generator 1204, $x_{standard}$ is a standard matrix of power estimation predictors, w is a weight calculated by a weight function, and $\varphi_{NN}$ are the power model coefficients generated by neural network 1212. The previous equation shows that the two COP calculations are equivalent, regardless of whether the power model coefficients $\varphi_{reg}$ or $\varphi_{NN}$ are used.

Advantageously, neural network 1212 benefits the MPM optimization process performed by MPM system 1100. In some embodiments, neural network 1212 accepts degradation states $\hat{\delta}_k$ as inputs (e.g., refrigerant leakage, compressor power, and airflow restriction) and outputs values of the power model coefficients $\varphi_{NN}$ parameters as well as their related uncertainties. The power model coefficients $\varphi_{NN}$ generated by neural network 1212 may be used in place of the power model coefficients $\varphi_{reg}$ generated by regression power model generator 1204 when calculating the power consumption and resulting operating cost of connected equipment 1132.

In some embodiments, the data used to train neural network 1212 is generated using a simulation framework. The simulation framework can be used to generate a variety of degradation cases that can be used to train neural network 1212. In some embodiments, a simulation platform such as Simulink is used to generate the operational simulation data of the system. Further, neural network 1212 can be retrained as new data is obtain obtained. Retraining neural network 1212 can ensure neural network 1212 properly maps degradation states $\hat{\delta}_k$ to power model coefficients $\varphi_{NN}$ even as the system changes.

In some embodiments, degradation impact modeler 1114 trains neural network 1212 to map the degradation state $\hat{\delta}_k$ to power consumption or other resource consumption of connected equipment 1132. For example, neural network trainer 1210 can receive a set of training data including the estimated degradation states $\hat{\delta}_k$ at each time step k from degradation estimator 1116 along with data indicating the amounts of input resources consumed and output resources produced at each time step k. The amounts of resources consumed and produced at each time step k may be indicated by the performance variables $y_k$.

Neural network trainer 1210 can use these training data to train neural network 1212 to predict the amount of one or more input resources consumed by connected equipment 1132 as a function of both the degradation states $\hat{\delta}_k$ and the requested amount(s) of one or more output resources to be produced by connected equipment 1132. For example, for a VRF system, neural network 1212 can be trained to predict the amount of power consumed at time step k as a function of the degradation states $\hat{\delta}_k$ of the VRF equipment at time step k as well as the requested heating load or cooling load to be served by the VRF equipment at time step k. In this way, neural network 1212 can be trained to predict resource consumption as a function of both the degradation states $\hat{\delta}_k$ and the requested load on connected equipment 1132 without explicitly generating power model coefficients $\varphi_{NN}$ in some embodiments.

Event or Condition Driven Model Predictive Maintenance Overview

Referring particularly to FIGS. 13-20, an MPM system 1300 is configured to monitor performance indicators (e.g., conditions or events) to initiate a model predictive maintenance routine in an event or condition-driven manner. In some embodiments, MPM system 1300 is the same as or similar to MPM system 1100, MPM system 602, etc., as described in greater detail above. In some embodiments, MPM system 1300 (e.g., MPM controller 1302) is configured to perform process 1000 as described in greater detail above with reference to FIG. 10.

MPM systems can provide optimized dispatch to future maintenance for customers. MPM functionality may be tailored or designed for particular applications (e.g., particular equipment or a particular building system) through known configuration or setting or behaviors of system components. In some embodiments, MPM systems are configured for use with VRF systems based on empirical data or studies performed at different sites.

Each time MPM is performed at a site (e.g., each time model predictive optimizer 1120 performs its functionality), results of the MPM technique may suggest a different schedule of maintenances (e.g., different maintenance schedules $m_k$). In some embodiments, model predictive optimizer 1120 performs its functionality at scheduled intervals. In some embodiments, MPM controller 1302 (shown in FIG. 13) can be configured to use prognosis and health management (PHM) data to determine when to initiate the functionality of model predictive optimizer 1120. PHM seeks to estimate health status of assets (e.g., of the connected equipment 1132) based on real-time sensor measurements and analytics. In some embodiments, results of PHM techniques (e.g., degradation estimation or prediction) reflect a score of the system (e.g., of connected equipment 1132 or a health of a system of building equipment).

In some embodiments, MPM system 1300 may experience unexpected events (e.g., rapid equipment degradation, failure, etc.). In some embodiments, MPM system 1300 is configured to monitor various conditions (e.g., sensor data, degradation predictions, degradation estimations, etc.) and initiate the functionality of model predictive optimizer 1120 at non-scheduled intervals. In this way, MPM controller 1302 can initiate non-scheduled MPM functionality based on monitored conditions (e.g., based on performance indicator(s)) that can indicate a health status of various components (e.g., equipment 1132) of the system.

MPM Controller

Figure 13:
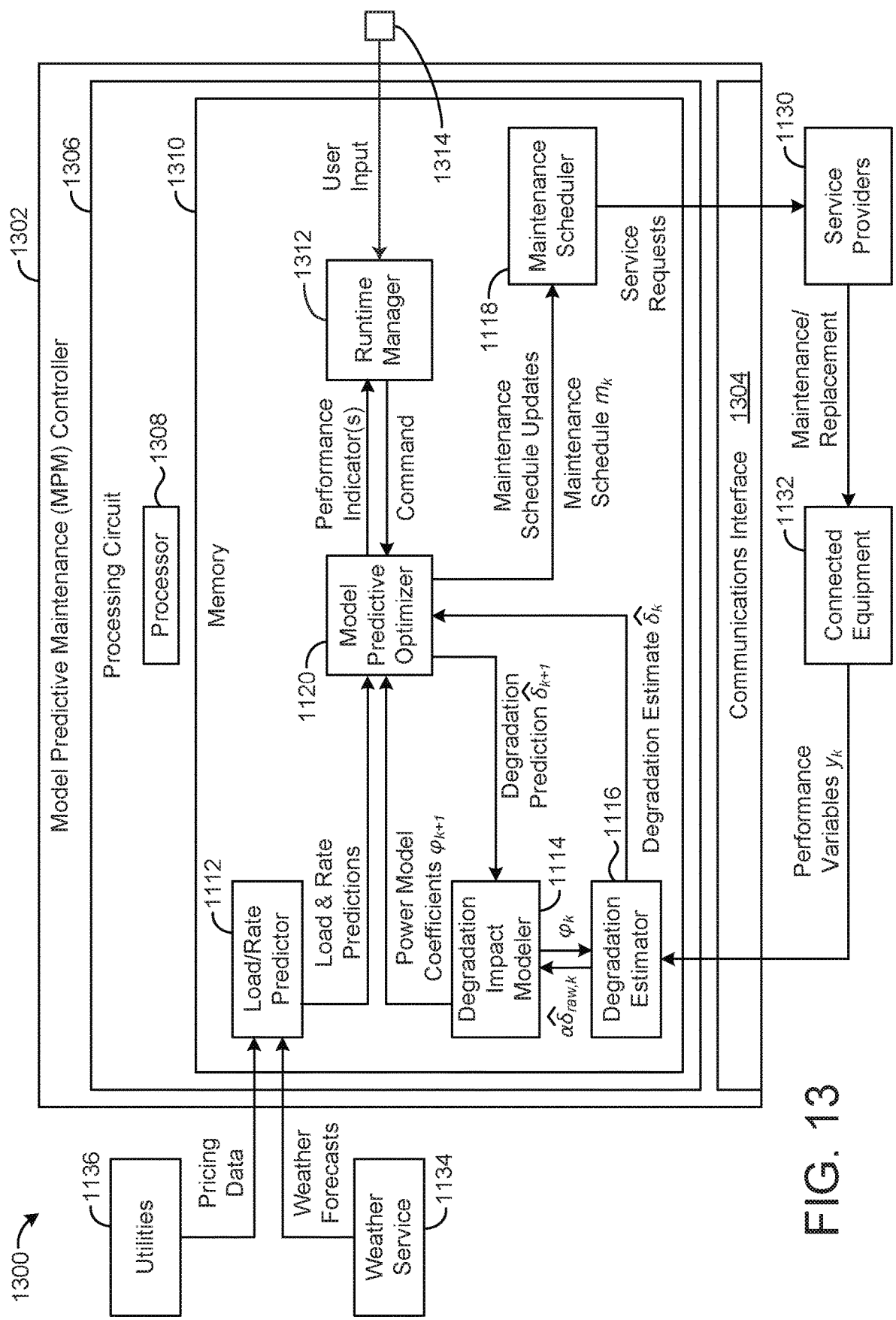
FIG. 13 is a block diagram of an MPM system configured to perform its functionality in an event or condition-driven manner, according to some embodiments.

Referring still to FIG. 13, MPM system 1300 includes MPM controller 1302, according to some embodiments. MPM controller 1302 is shown to include a communications interface 1304 and a processing circuit 1306. Communications interface 1304 may include wired or wireless interfaces (e.g., jacks, antennas, transmitters, receivers, transceivers, wire terminals, etc.) for conducting data communications with various systems, devices, or networks. For example, communications interface 1304 may include an Ethernet card and port for sending and receiving data via an Ethernet-based communications network and/or a Wi-Fi transceiver for communicating via a wireless communications network. Communications interface 1304 may be configured to communicate via local area networks or wide area networks (e.g., the Internet, a building WAN, etc.) and may use a variety of communications protocols (e.g., BACnet, IP, LON, etc.).

Communications interface 1304 may be a network interface configured to facilitate electronic data communications between MPM controller 1302 and various external systems or devices (e.g., connected equipment 1132, utilities 1136, weather service 1134, service providers 1130, etc.). For example, MPM controller 1302 may receive performance variables $y_k$ from connected equipment 1132 indicating one or more measured states of the controlled building (e.g., temperature, humidity, electric loads, etc.) and/or equipment performance information (e.g., run hours, power consumption, operating efficiency, etc.). Communications interface 1304 may receive inputs from utilities 1136, weather service 1134, connected equipment 1132 and may provide a maintenance schedule $m_k$ or service requests to service providers 1130 or other external systems or devices.

Processing circuit 1306 is shown to include a processor 1308 and memory 1310. Processor 1308 may be a general purpose or specific purpose processor, an application specific integrated circuit (ASIC), one or more field programmable gate arrays (FPGAs), a group of processing components, or other suitable processing components. Processor 1308 may be configured to execute computer code or instructions stored in memory 1310 or received from other computer readable media (e.g., CDROM, network storage, a remote server, etc.).

Memory 1310 may include one or more devices (e.g., memory units, memory devices, storage devices, etc.) for storing data and/or computer code for completing and/or facilitating the various processes described in the present disclosure. Memory 1310 may include random access memory (RAM), read-only memory (ROM), hard drive storage, temporary storage, non-volatile memory, flash memory, optical memory, or any other suitable memory for storing software objects and/or computer instructions. Memory 1310 may include database components, object code components, script components, or any other type of information structure for supporting the various activities and information structures described in the present disclosure. Memory 1310 may be communicably connected to processor 1308 via processing circuit 1306 and may include computer code for executing (e.g., by processor 1308) one or more processes described herein.

MPM controller 1302 can be the same as or similar to MPM controller 1102 and may be configured to perform similar functionality as MPM controller 1102. Specifically, memory 1310 of MPM controller 1302 includes a runtime manager 1312. Runtime manager 1312 is configured to initiate the functionality of model predictive optimizer 1120 (e.g., to perform MPM) by providing a command to model predictive optimizer 1120. In some embodiments, the command is generated by runtime manager 1312 and provided to model predictive optimizer 1120 at non-scheduled intervals. For example, model predictive optimizer 1120 may be configured to perform its functionality periodically (e.g., daily, weekly, bi-weekly, monthly, etc.) and runtime manager 1312 can be configured to initiate non-scheduled runs of model predictive optimizer 1120 based on real-time conditions, estimations, or predictions.

More generally, runtime manager 1312 can use one or more performance indicator(s) and determine if a condition is met that indicates that MPM should be initiated. In response to determining that the condition has been satisfied, runtime manager 1312 can be configured to provide the command to model predictive optimizer 1120 to initiate MPM. In some embodiments, runtime manager 1312 is configured to run continuously (e.g., between scheduled implementations of model predictive optimizer 1120) to determine non-scheduled or event-based times at which model predictive optimizer 1120 should be initiated.

Runtime manager 1312 can use different performance indicator(s) and thresholds to identify if a condition has been met that indicates that model predictive optimizer 1120 should be initiated. In some embodiments, runtime manager 1312 is configured to receive the performance indicator(s) from model predictive optimizer 1120. In some embodiments, the performance indicator(s) include one or more performance variables of the connected equipment 1132 (e.g., efficiency, setpoints, temperature readings, humidity readings, sensor data, etc.), the estimated degradation states $\hat{\delta}_k$, predicted future degradation states $\hat{\delta}_{k+1}$, etc. The performance indicator(s) can be obtained by runtime manager 1312 from model predictive optimizer 1120, degradation impact modeler 1114, degradation estimator 1116, directly from connected equipment 1132, from sensors, etc., for use in determining if model predictive optimizer 1120 should be initiated.

Runtime manager 1312 can also receive a user input from a user input device 1314 (e.g., a user interface device, a touchscreen display, a wirelessly communicable device, etc.). In some embodiments, the user input is or indicates a command to initiate model predictive optimizer 1120.

Figure 14:
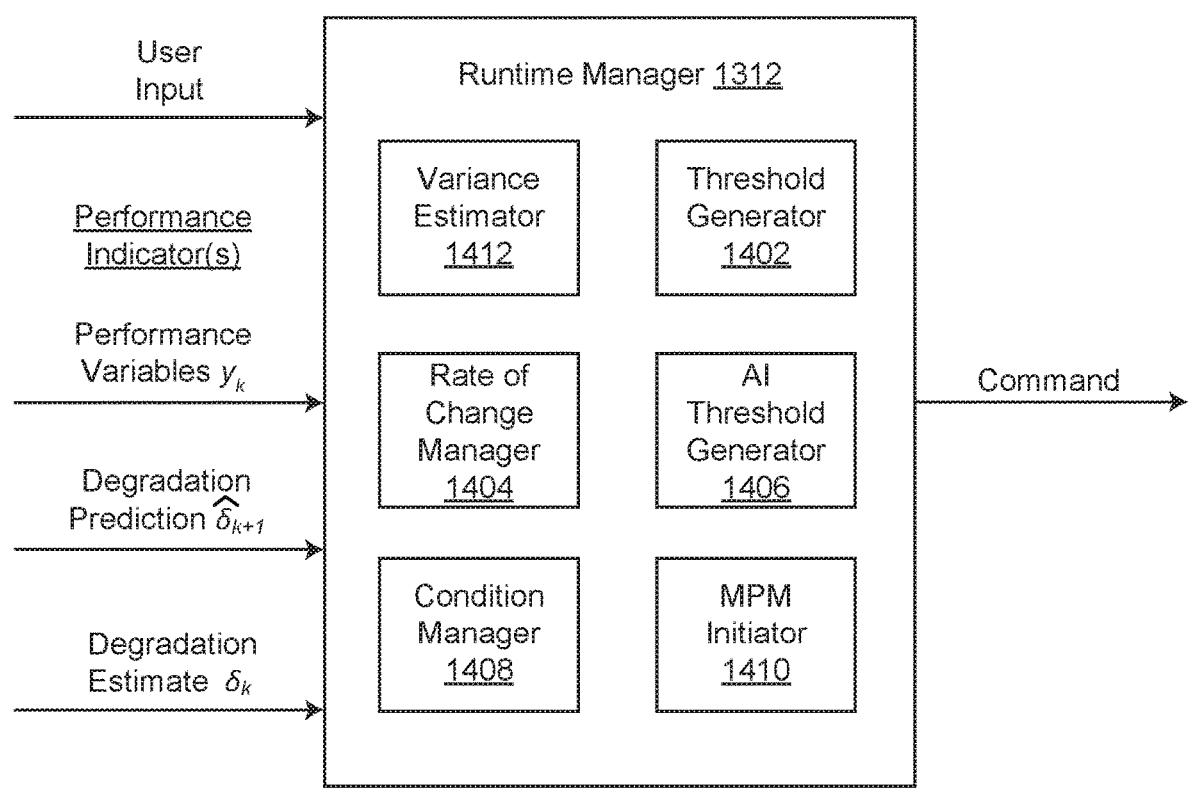
FIG. 14 is a block diagram of a portion of the MPM system of FIG. 13 in greater detail, according to some embodiments.

Referring particularly to FIG. 14, runtime manager 1312 is shown in greater detail, according to some embodiments. Runtime manager 1312 includes a threshold generator 1402, a rate of change manager 1404, an artificial intelligence (AI)

threshold generator 1406, a condition manager 1408, an MPM initiator 1410, and a variance estimator 1412. Runtime manager 1312 is configured to receive one or more performance variables $y_k$ (e.g., a temperature $T_k$ within a building zone that the connected equipment 1132 serves or operates to affect, a humidity $\varphi_k$ within the building zone that the connected equipment 1132 serves or operates to affect, a power consumption of the connected equipment 1132, an efficiency of the connected equipment 1132, etc.), according to some embodiments. In some embodiments, runtime manager 1312 is configured to receive one or more predicted values of the future degradation $\hat{\delta}_{k+1}$ of any of the connected equipment 1132. In some embodiments, runtime manager 1312 is configured to receive one or more values of the estimated degradation $\hat{\delta}_k$.

In some embodiments, runtime manager 1312 is configured to perform the functionality of degradation impact modeler 1114, degradation estimator 1116, degradation predictor 1122, etc. In this way, runtime manager 1312 can operate to determine predicted values of the future degradation $\hat{\delta}_{k+1}$ or the estimated degradation $\hat{\delta}_k$ even if model predictive optimizer 1120 is inactive or dormant.

Condition manager 1408 is configured to perform a comparison between any of the performance indicator(s) or a rate of change of any of the performance indicator(s) and a corresponding threshold value. In some embodiments, condition manager 1408 is configured to determine if a condition has been met that indicates that model predictive optimizer 1120 should be initiated.

Performance Indicator Threshold Event/Condition

For example, condition manager 1408 may directly use any of the performance indicator(s) and compare the performance indicator to a threshold amount $y_{thresh}$. In some embodiments, condition manager 1408 compares a current value of one of the performance variables $y_k$ (e.g., the efficiency of the connected equipment 1132) to the threshold amount $y_{thresh}$. If condition manager 1408 determines that the current value of the performance variable $y_k$ is greater than or less than the threshold amount $y_{thresh}$, condition manager 1408 may determine that the condition has been met and that model predictive optimizer 1120 should be initiated. In some embodiments, condition manager 1408 uses multiple threshold values. For example, each performance variable can have a first associated threshold range between a first threshold value $y_{thresh,1}$ and a second threshold value $y_{thresh,2}$ that indicates proper operation (or that model predictive optimizer 1120 should not be initiated). Likewise, each performance variable can have a second associated threshold range between the second threshold value $y_{thresh,2}$ and a third threshold value $y_{thresh,3}$ that indicates that model predictive optimizer 1120 should be initiated. Finally, each performance variable can have a third associated threshold range between the third threshold value $y_{thresh,3}$ and a fourth threshold value $y_{thresh,4}$ that indicates that the connected equipment 1132 is inoperational (e.g., at a point where the connected equipment 1132 should be replaced).

Condition manager 1408 can use the different threshold ranges (e.g., the first, second, and third threshold ranges) and the value of the corresponding performance variable $y_k$ to identify if model predictive optimizer 1120 should be initiated. Condition manager 1408 can compare the value of the corresponding performance variable $y_k$ to any of the threshold amounts to determine which of the threshold ranges the current value of the performance variable $y_k$ lies within. It should be understood that each of the different performance variables $y_k$ may have different associated or corresponding threshold values (e.g., different values of $y_{thresh,1}$, $y_{thresh,2}$, $y_{thresh,3}$, and $y_{thresh,4}$).

If condition manager 1408 determines that the condition has been satisfied (e.g., that the current value of the performance variable $y_k$ lies within the second threshold range), condition manager 1408 can notify MPM initiator 1410 that the condition has been met, according to some embodiments. In some embodiments, MPM initiator 1410 generates and provides a command to model predictive optimizer 1120 to perform its functionality 1120 in response to receiving the notification from condition manager 1408.

In some embodiments, condition manager 1408 is configured to use values of the degradation estimation $\hat{\delta}_k$ and/or the degradation prediction $\hat{\delta}_{k+1}$ instead of or addition to the values of the performance variable(s) $y_k$. In some embodiments, condition manager 1408 compares the values of the degradation estimation $\hat{\delta}_k$ and/or the degradation prediction $\hat{\delta}_{k+1}$ to corresponding threshold values to identify which of multiple threshold ranges the degradation estimation $\hat{\delta}_k$ and/or the degradation prediction $\hat{\delta}_{k+1}$ lie within. If the degradation estimation $\hat{\delta}_k$ and/or the degradation prediction $\hat{\delta}_{k+1}$ lie within a threshold range that indicates model predictive optimizer 1120 should be initiated, condition manager 1408 can generate and provide a command to model predictive optimizer 1120 to initiate model predictive optimizer 1120.

Figure 15:
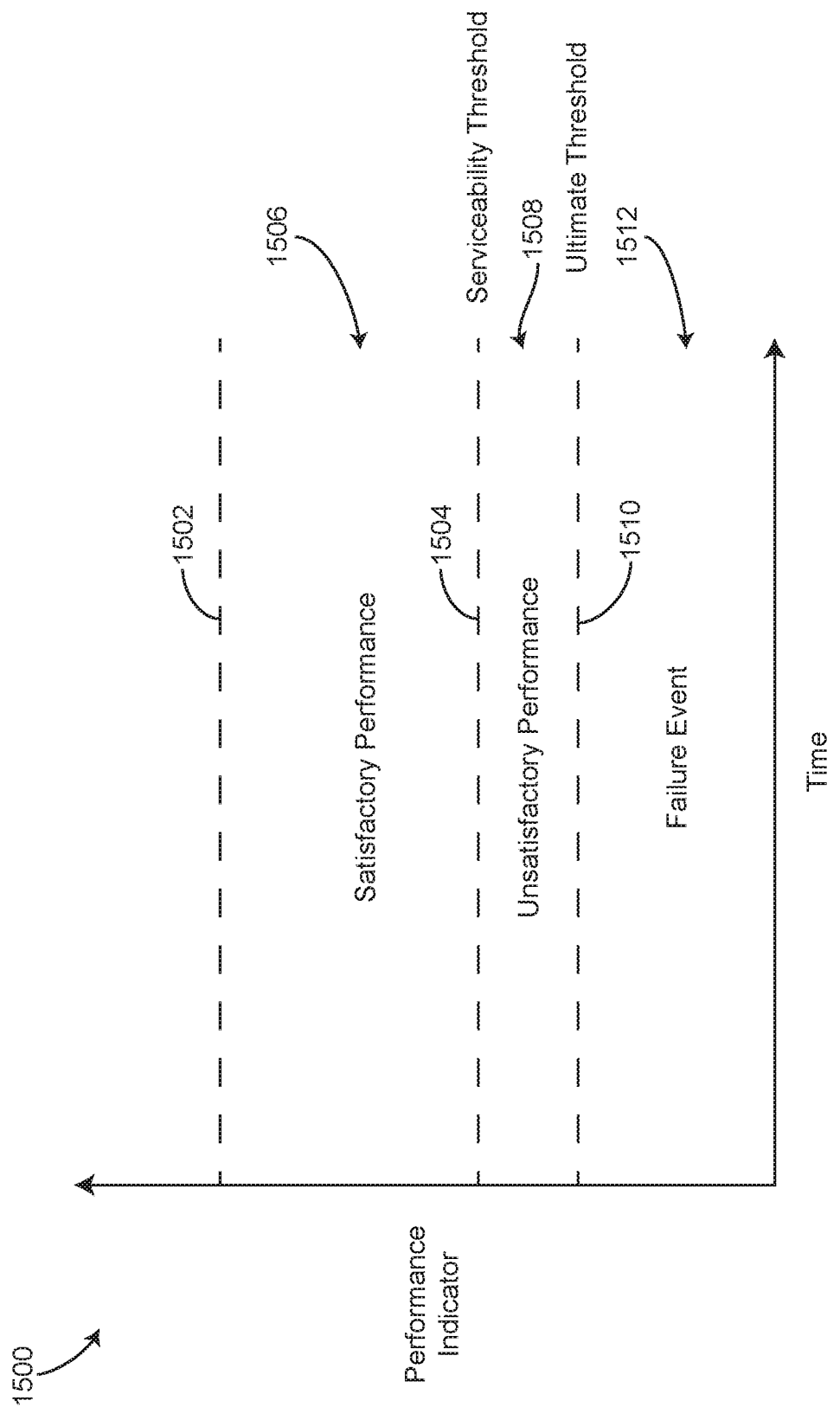
FIG. 15 is a graph showing different ranges of performance indicators used to initiate the functionality of the MPM system of FIG. 13, according to some embodiments.

Referring particularly to FIG. 14 and FIG. 15, graph 1500 illustrates different threshold ranges 1506, 1508, and 1512 for the performance indicator(s), according to some embodiments. In some embodiments, the different threshold ranges 1506, 1508, and 1512 are defined by different threshold values 1502, 1504, and 1510. The different threshold values 1502, 1504, and 1510 are values of the performance indicators that define the threshold ranges 1506, 1508, and 1512. For example, the first threshold range 1506 is defined between the first threshold value 1502 and the second threshold value 1504, the second threshold range 1508 is defined between the second threshold value 1504 and the third threshold value 1510, and the third threshold range 1512 is defined between the third threshold value 1510 and a fourth threshold value, or is unbounded.

The first threshold range 1506 shows values of the performance indicator over time that indicate satisfactory performance of the connected equipment 1132, according to some embodiments. The second threshold range 1508 shows values of the performance indicator over time that indicate unsatisfactory performance of the connected equipment 1132 (e.g., associated with an initiation of model predictive optimizer). The third threshold range 1512 indicates a failure event of the connected equipment 1132. In some embodiments, the values of the thresholds 1502, 1504, and 1510 are unique or tailored for each of the different performance indicators. In this way, runtime manager 1312 can monitor and track each of the performance indicators over time and initiate model predictive optimizer 1120 when one or more of the performance indicators lies within or trends into the second threshold range 1508.

User Input Event/Condition

Referring again to FIG. 14, condition manager 1408 can also be configured to determine if runtime manager 1312 has received a user input indicating that model predictive optimizer 1120 should be initiated. Condition manager 1408 can provide a notification to MPM initiator 1410 in response to receiving the user input so that MPM initiator 1410 provides the command to model predictive optimizer 1120 to perform MPM.

For example, the user input may be a decision to perform maintenance at a time or in a manner that is not recommended by MPM system 1300. For example, the user may view the maintenance schedule and determine that additional maintenance should be performed at a non-scheduled time, or that it is desirable to run model predictive optimizer 1120 at a non-scheduled time.

In some embodiments, the user input is a decision to skip maintenance that is recommended by MPM system 1300, thereby resulting in an unexpected departure from the recommended maintenance schedule or scheduled implementation of model predictive optimizer 1120. In some embodiments, the user input is a simple command to perform the functionality of model predictive optimizer 1120. In some embodiments, the user input is a manual adjustment to one or more parameters that are used by or considered by model predictive optimizer 1120. In some embodiments, the user input is an adjustment to a model used by model predictive optimizer 1120 (e.g., to include new equipment or remove equipment). For example, the user input may indicate a rearrangement of connected equipment 1132, an addition of new connected equipment 1132, or a removal of connected equipment 1132.

Rate of Change of Performance Indicators Event/Condition

Referring still to FIG. 14, runtime manager 1312 includes rate of change manager 1404, according to some embodiments. Rate of change manager 1404 is configured to receive any of the performance indicator(s) (e.g., the performance variable(s), the degradation prediction, the degradation estimate, etc.) and determine, calculate, estimate, etc., a rate of change (e.g., a time rate of change) of any of the performance indicator(s) (e.g., $\dot{y}_k$, $\dot{\hat{\delta}}_k$, or $\dot{\hat{\delta}}_{k+1}$). In some embodiments, rate of change manager 1404 is configured to estimate, calculate, determine, etc., a difference or a delta between values of any of the performance indicator(s) at subsequent time steps. For example, rate of change manager 1404 may determine an average rate of change, a change amount (e.g., an increase or a decrease amount) between subsequent time steps, an instantaneous rate of change, etc., of any of the performance indicators (e.g., the performance variables $y_k$, the degradation prediction, the degradation estimate, etc.).

Rate of change manager 1404 can provide any of the rates of changes of the performance indicator(s) to condition manager 1408. In some embodiments, condition manager 1408 is configured to use any of the delta values or the slopes provided by rate of change manager 1404 to determine if a condition has been met that indicates model predictive optimizer 1120 should be activated or run. For example, condition manager 1408 can estimate a slope of the predicted degradation, $\hat{\delta}_{k+1}$, and compare the slope $\hat{\delta}_{k+1}$ of the degradation to one or more threshold slope values $\hat{\delta}_{k+1,thresh_1}$, $\hat{\delta}_{k+1,thresh_2}$, $\hat{\delta}_{k+1,thresh_6}$, etc. If the slope $\hat{\delta}_{k+1}$ of the predicted degradation exceeds one or more of the thresholds (e.g., if the slope exceeds the second threshold slope $\hat{\delta}_{k+1,thresh_2}$) condition manager 1408 may identify that model predictive optimizer 1120 should be run (e.g., indicating that the degradation is increasing too rapidly). If the slope $\hat{\delta}_{k+1}$ of the predicted degradation exceeds a different one or more of the thresholds (e.g., if the slope exceeds the first threshold slope $\hat{\delta}_{k+1,thresh_1}$ but not the second threshold slope $\hat{\delta}_{k+1,thresh_2}$), condition manager 1408 may determine that the degradation is increasing at an acceptable rate, and therefore not initiate the model predictive optimizer 1120.

It should be understood that condition manager 1408 can estimate delta values (e.g., increase or decrease amounts), time rate of changes, slopes, etc., or any of the performance indicators as described herein and compare the slopes or rate of changes to corresponding slope thresholds. Condition manager 1408 may similarly calculate a rate of change or an increase or decrease amount between subsequent time steps for any of the performance variables $y_k$.

Predicted Vs. Actual Degradation Event/Condition

Figure 17:
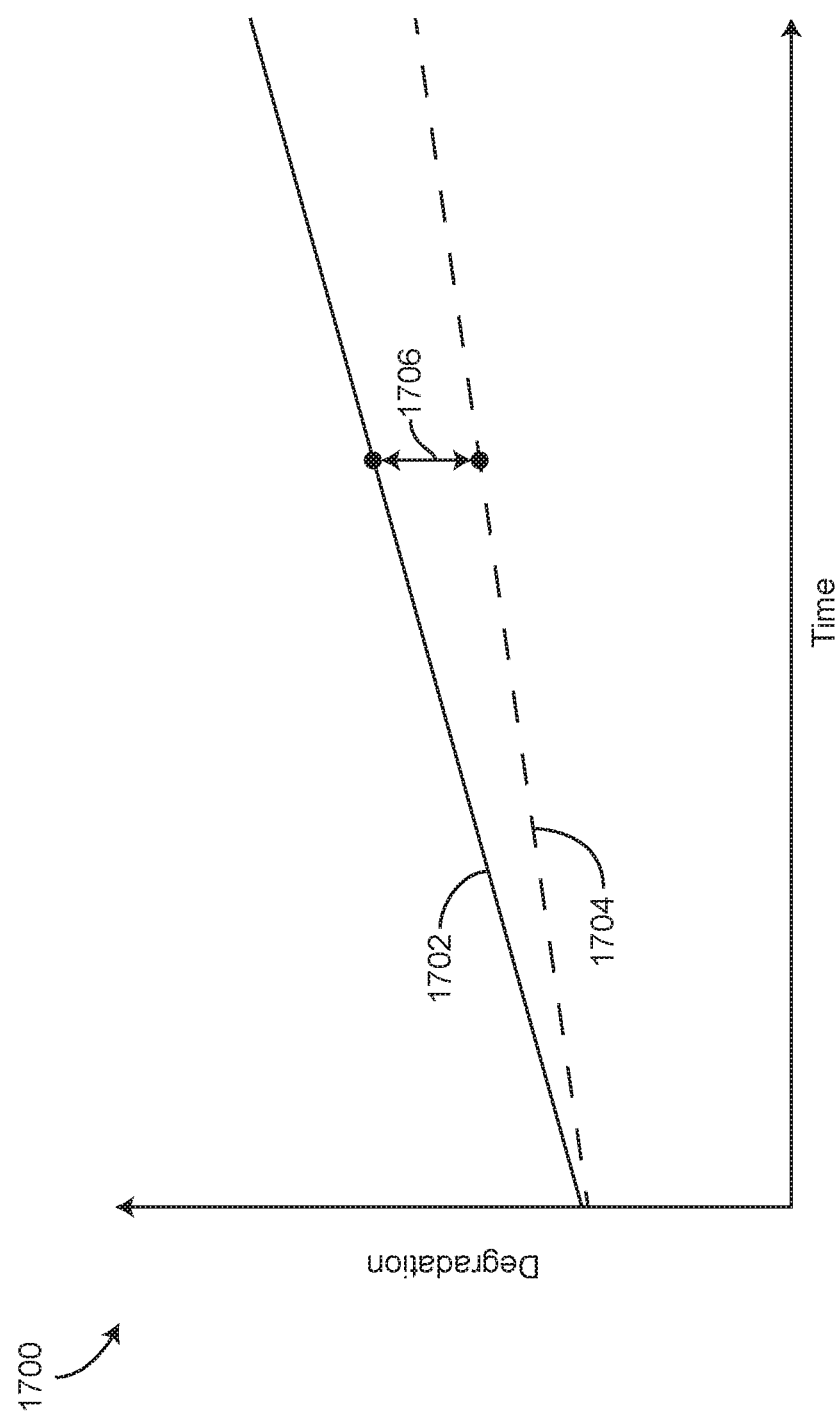
FIG. 17 is a graph of a predicted degradation and an actual degradation of equipment, showing a difference at a point in time that can be used to activate the functionality of the MPM system of FIG. 13, according to some embodiments.

Referring particularly to FIGS. 14 and 17, condition manager 1408 can be configured to use both degradation prediction and actual degradation to determine if a condition has been met and if model predictive optimizer 1120 should be activated or run. As shown in FIG. 17, a graph 1700 illustrates degradation (the Y-axis) of one of connected equipment 1132 over time (the X-axis), according to some embodiments. Series 1702 illustrates actual degradation of the connected equipment 1132, whereas series 1704 illustrates predicted degradation of the connected equipment 1132, according to some embodiments.

Graph 1700 illustrates a difference 1706 between the actual degradation 1702 and the predicted degradation 1704, according to some embodiments. In some embodiments, condition manager 1408 is configured to estimate the difference 1706 between the predicted degradation 1704 and the actual degradation 1702. In some embodiments, condition manager 1408 is configured to compare the difference 1706 to a threshold difference. For example, if the actual degradation 1702 deviates from a previously predicted degradation 1704 by a threshold amount or more (e.g., if the difference 1706 is greater than or equal to the threshold difference), condition manager 1408 may determine that the condition has been met and may provide a command to MPM initiator 1410.

Covariance Event/Condition

Referring particularly to FIG. 14, runtime manager 1312 includes variance estimator 1412, according to some embodiments. Variance estimator 1412 is configured to estimate a variance, a covariance, a deviation, a standard deviation, etc., of one or more of the performance indicators (e.g., over time). For example, variance estimator 1412 may be configured to calculate a covariance in a pressure ratio of the connected equipment 1132. In some embodiments, the covariance, variance, deviation, standard deviation, etc., indicates changes of any of the performance indicator(s) over time (e.g., across different time steps).

Variance estimator 1412 can provide any of the variance, the covariance, the deviation, the standard deviation, etc., to condition manager 1408. In some embodiments, condition manager 1408 is configured to compare the variance, covariance, deviation, etc., to a corresponding threshold amount (e.g., a threshold variance, a threshold covariance, etc.). If condition manager 1408 determines that the performance indicator is significant (e.g., that the variance, covariance, deviation, etc., exceeds the threshold variance, the threshold covariance, etc.), condition manager 1408 can determine that model predictive optimizer 1120 should be initiated, and may prompt MPM initiator 1410 to activate or run model predictive optimizer 1120.

Thresholds

Referring still to FIG. 14, runtime manager 1312 includes threshold generator 1402, according to some embodiments. In some embodiments, threshold generator 1402 is configured to generate any of the thresholds for use by condition manager 1408. In some embodiments, threshold generator 1402 stores predetermined threshold values for the different connected equipment 1132 and expected operating or performance characteristics. For example, threshold generator 1402 can store information regarding each of the connected equipment 1132 and known operating conditions (e.g., expected power consumption levels, expected efficiency, expected degradation rate, etc.). Threshold generator 1402 can generate the threshold values used by condition manager 1408 (e.g., the threshold values for the performance indicators and/or the thresholds for the rate of change of the performance indicators) based on expected or known information regarding the connected equipment 1132. In this way, the thresholds may be predetermined values that are determined analytically based on various parameters, operating settings, size, configuration, type, model, etc., of the connected equipment 1132 or expected values of any of the performance indicator(s) for normal operating or given a life of the connected equipment 1132. For example, the thresholds can be generated based on system requirements (e.g., component requirements) or spec-sheets of the different connected equipment 1132.

In some embodiments, the thresholds are based on user inputs obtained from the user input device 1314. For example, the user may set or select the thresholds for the runtime manager 1312. In some embodiments, the user may select between various levels of cautionary performance. For example, if a user desires a more cautious approach, the user may select a higher level, which corresponds with generating or using thresholds that will result in more frequent non-scheduled implementations of model predictive optimizer 1120.

In some embodiments, the thresholds are non-static. For example, threshold generator 1402 can generate a functional threshold (e.g., a function of time) that varies with an expected target value of any of the performance indicators (e.g., if the performance indicators follow a ramp trend).

In some embodiments, the one or more thresholds used by condition manager 1408 are generated by AI threshold generator 1406. AI threshold generator 1406 can be configured to use an AI model to determine when to initiate model predictive optimizer 1120 (e.g., different conditions or thresholds that should result in performance of model predictive optimizer 1120). In some embodiments, the AI model is based on real-time monitoring techniques (e.g., real-time sensor data) to determine critical boundaries (e.g., thresholds) for any of the performance indicators.

Unavailable Performance Indicators

In some embodiments, one or more of the performance indicators (e.g., the degradation estimates) may be unavailable. In some embodiments, for example, degradation estimates or predictions that are unavailable are assigned a value of NaN. Condition manager 1408 determines that it is inadvisable or unable to perform its functionality for the particular performance indicator(s) that have a value of NaN, and may use any of the other techniques described herein to determine if model predictive optimizer 1120 should be run, according to some embodiments. In some embodiments, condition manager 1408 may postpone use of unavailable or undefined performance indicators for a later time when said performance indicators become available or defined.

Process

Figure 16:
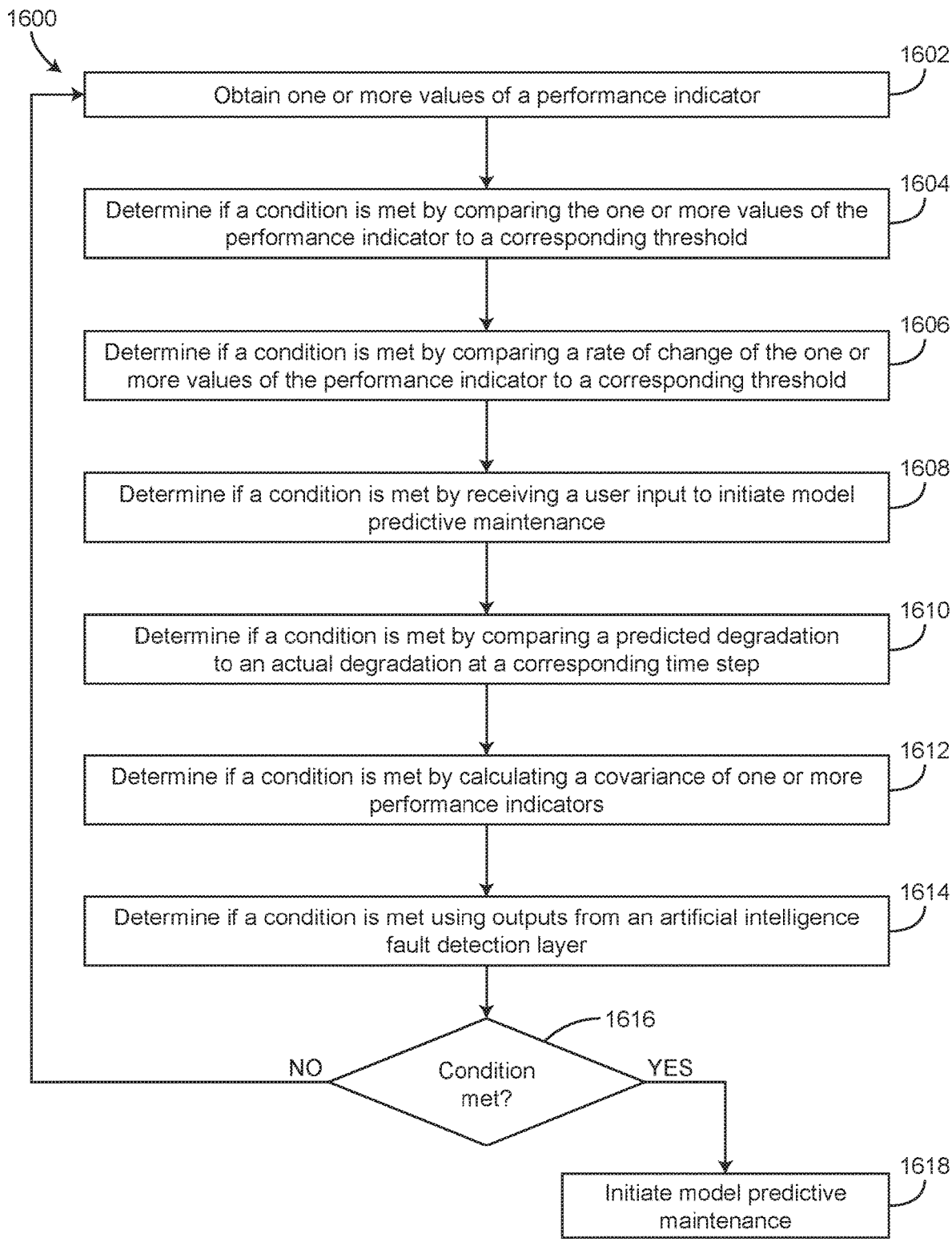
FIG. 16 is a flow diagram of a process for performing MPM in response to an event or a condition, according to some embodiments.

Referring particularly to FIG. 16, a process 1600 for determining if model predictive maintenance should be performed is shown, according to some embodiments. Process 1600 includes steps 1602-1618 and can be performed by MPM controller 1302. In some embodiments, steps 1602-1616 are performed by runtime manager 1312, or the various components thereof, to determine if a non-scheduled (e.g., an event or condition driven) run of model predictive optimizer 1120 should be performed.

Process 1600 includes obtaining one or more values of a performance indicator (step 1602), according to some embodiments. Step 1602 may be performed by runtime manager 1312. The performance indicator(s) may include estimated degradation of equipment, predicted degradation of equipment, and/or one or more performance variables (e.g., operating setpoints, operational values, sensor readings, pressure, temperature, humidity, pressure ratio, efficiency, power consumption, etc.).

Process 1600 includes determining if a condition is met by comparing the one or more values of the performance indicator to a corresponding threshold (step 1604), according to some embodiments. In some embodiments, the threshold is unique or specific to the performance indicator. Step 1604 can include determining that the condition is met in response to determining that the performance indicator exceeds or is less than the corresponding threshold. In some embodiments, step 1604 is optional. The thresholds can be generated by threshold generator 1402 and/or AI threshold generator 1406. Step 1604 can include comparing any of the performance variables, the predicted degradation, or the estimated degradation to a corresponding threshold to determine if the condition is met or to determine if an event has occurred (or if a trigger condition is satisfied).

Process 1600 includes determining if a condition is met by comparing a rate of change of the one or more values of the performance indicators to a corresponding threshold (step 1606), according to some embodiments. In some embodiments, step 1606 includes determining a rate of change of any of the performance indicators (e.g., an increase or decrease amount between different time steps, a slope of any of the performance indicators, a time rate of change of any of the performance indicators, etc.). The rate of change, or change amount of the performance indicators can be performed by rate of change manager 1404 as described in greater detail above. Step 1606 may be similar to step 1604 but performed by comparing rates, increase or decrease amounts, change amounts, slopes, a time rate of change, etc., of any of the performance indicators to corresponding thresholds (e.g., a corresponding slope threshold, a change threshold, a time rate of change threshold, etc.). Step 1606 can include determining that the condition has been met or that an event has occurred in response to the rate of change (or change amount) of the performance indicator exceeding or being less than the corresponding threshold. For example, step 1606 may include determining that a condition has been met or an event has occurred in response to a determination that the rate of change of the degradation increases too rapidly (e.g., that the rate of change of the degradation exceeds a corresponding threshold).

Process 1600 includes determining if a condition is met by receiving a user input to initiate model predictive maintenance (step 1608), according to some embodiments. In some embodiments, step 1608 is performed by condition manager 1408. A user input or a command may be considered by condition manager 1408 as one of the events or conditions that should prompt a run of model predictive optimizer 1120.

Process 1600 includes determining if a condition is met by comparing a predicted degradation to an actual degradation at a corresponding time step (step 1610), according to some embodiments. In some embodiments, step 1610 is performed by condition manager 1408. Condition manager 1408 may monitor and store the predicted degradation for a future time step. When the future time step arrives, condition manager 1408 can compare an actual, present, current, or estimated degradation of equipment to the previously predicted degradation. In some embodiments, if the previously predicted degradation and the current degradation deviate from each other by a threshold amount or more, step 1610 includes determining that the condition has been met and that model predictive optimizer 1120 should be initiated.

Process 1600 includes determining if a condition is met by calculating a covariance of one or more of the performance indicators (step 1612), according to some embodiments. In some embodiments, step 1612 includes calculating a variance, a deviation, a standard deviation, etc., of the one or more performance indicators over time. In some embodiments, step 1612 is performed by variance estimator 1412. If the covariance, variance, deviation, etc., of the one or more performance indicators exceeds a corresponding threshold amount (e.g., deviates significantly over time), step 1612 can include determining that the event or condition has been met and that model predictive optimizer 1120 should be initiated. In some embodiments, step 1612 is performed by both condition manager 1408 and variance estimator 1412.

Process 1600 includes determining if a condition is met using outputs from an artificial intelligence fault detection layer (step 1614), according to some embodiments. In some embodiments, condition manager 1408 is configured to receive outputs of an artificial intelligence fault detection layer and use the outputs to identify if any faults have occurred. If any faults have occurred as determined by the artificial intelligence fault detection layer, runtime manager 1312 can determine that an event or condition has occurred that should result in a run of model predictive optimizer 1120.

Process 1600 includes determining if a condition has been met or if an event has occurred (step 1616), according to some embodiments. Step 1616 can be performed by condition manager 1408 as a result of any of steps 1604-1614. In some embodiments, if one or more of steps 1604-1614 indicate that a condition has been met or that an event has occurred (step 1616, "YES"), process 1600 proceeds to step 1618. In some embodiments, if a condition has not been met or an event has not occurred (step 1616, "NO"), process 1600 returns to step 1602. In some embodiments, performing step 1618 includes initiating or running a model predictive maintenance technique or process. In some embodiments, performing step 1618 includes performing process 1000.

Advantageously, process 1600 can be performed to initiate operation of model predictive optimizer 1120. In some embodiments, process 1600 is performed (e.g., by runtime manager 1312) even when model predictive optimizer 1120 is in-operational. The thresholds as described in process 1600 can be generated by threshold generator 1402 and/or artificial intelligence threshold generator 1406.

Events and Conditions

Figure 18:
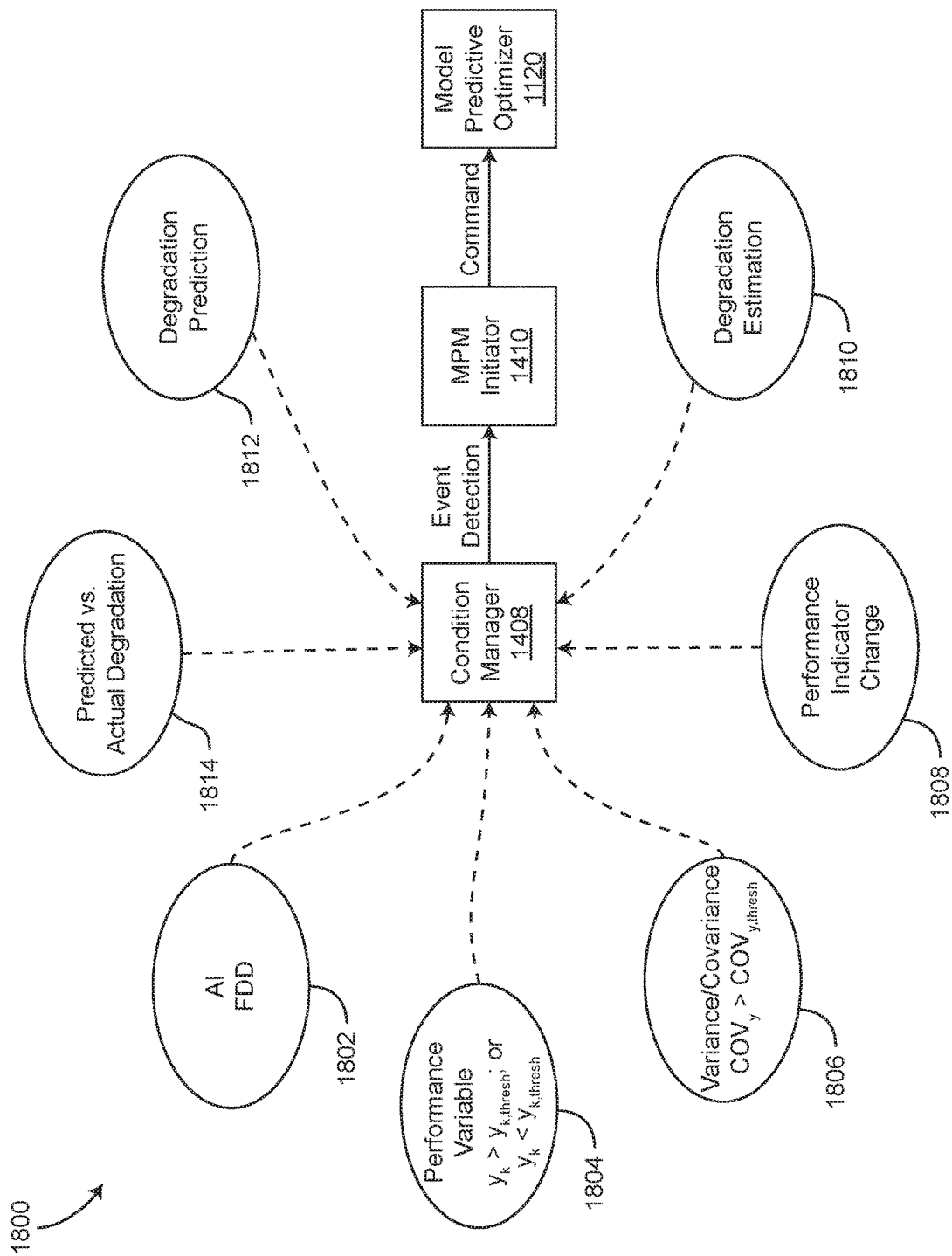
FIG. 18 is a diagram illustrating the different events or conditions that may initiate the functionality of the MPM system of FIG. 13, according to some embodiments.

Referring particularly to FIG. 18, a diagram 1800 shows various events or conditions (e.g., trigger conditions) that condition manager 1408 may detect to operate (e.g., trigger) MPM initiator 1410 to run model predictive optimizer 1120, according to some embodiments. Condition manager 1408 can be configured to use any of the events or conditions to determine if it would be advantageous to perform the functionality of model predictive optimizer 1120 at a non-scheduled time. In this way, condition manager 1408 may initiate model predictive optimizer 1120 in an event-driven or condition-driven manner.

Condition manager 1408 can identify event or condition detection based on outputs from an artificial intelligence fault detector (AI FDD event 1802), a performance variable comparison to a threshold (performance variable event 1804), a variance or covariance exceeding a threshold amount (covariance event 1806), a performance indicator changing by at least a threshold amount (or a rate of change of a performance indicator changing by at least a threshold amount, shown as performance indicator change event 1808), a degradation estimation exceeding a threshold amount (degradation estimation event 1810), a degradation prediction exceeding a threshold amount (degradation prediction event 1812), or a comparison between a predicted and an actual degradation (predicted vs. actual degradation event 1814). The performance variable event 1804, the covariance event 1806, the performance indicator change event 1808, the degradation estimation event 1810, the degradation prediction event 1812, and the predicted vs. actual degradation event 1814 are described in greater detail above. The AI FDD event 1802 is described in greater detail below with reference to FIG. 20.

Advantageously, condition manager 1408 can use the events or conditions 1802-1814 described herein to determine event detection that indicates model predictive optimizer 1120 should be run (e.g., in response to the event or condition detection). In this way, condition manager 1408 can initiate an event or condition driven implementation of model predictive optimizer 1120.

Artificial Intelligence Fault Detection

Figure 19:
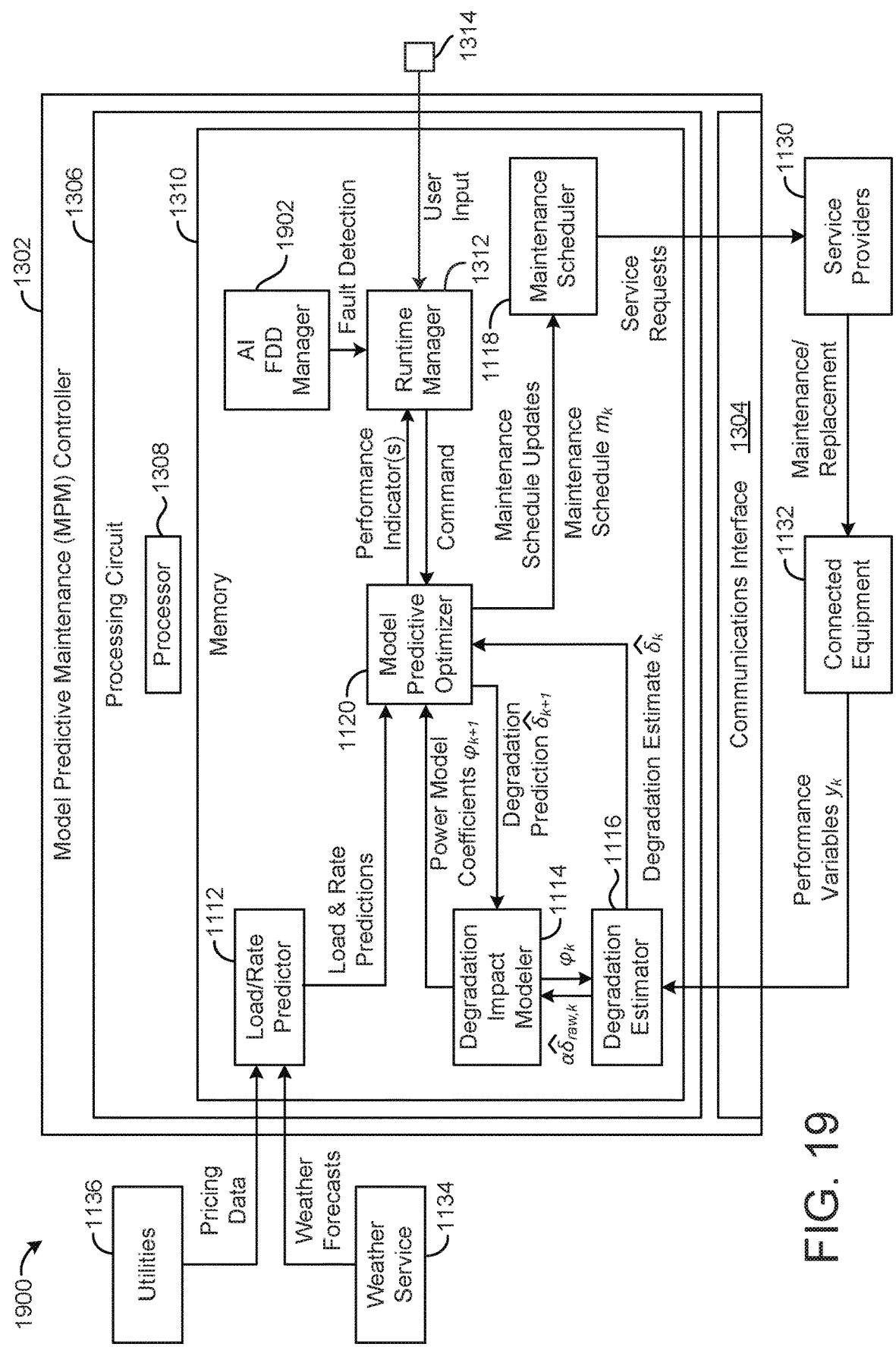
FIG. 19 is a block diagram of the MPM system of FIG. 13 including an artificial intelligence based fault detection manager that can be used to initiate MPM, according to some embodiments.

Referring particularly to FIG. 19, an MPM system 1900 that includes an artificial intelligence (AI) fault detection (FDD) manager 1902 is shown, according to some embodiments. In some embodiments, MPM system 1900 is the same as or similar to MPM system 1300. For example, MPM system 1900 includes MPM controller 1302 that is configured to implement AI FDD manager 1902. In some embodiments, AI FDD manager 1902 is configured to output fault detection to runtime manager 1312. In some embodiments, condition manager 1408 is configured to receive the outputs of AI FDD manager 1902, and if AI FDD manager 1902 indicates that a fault has been detected, condition manager 1408 (or more generally runtime manager 1312) are configured to initiate model predictive optimizer 1120 to perform its functionality.

Figure 20:
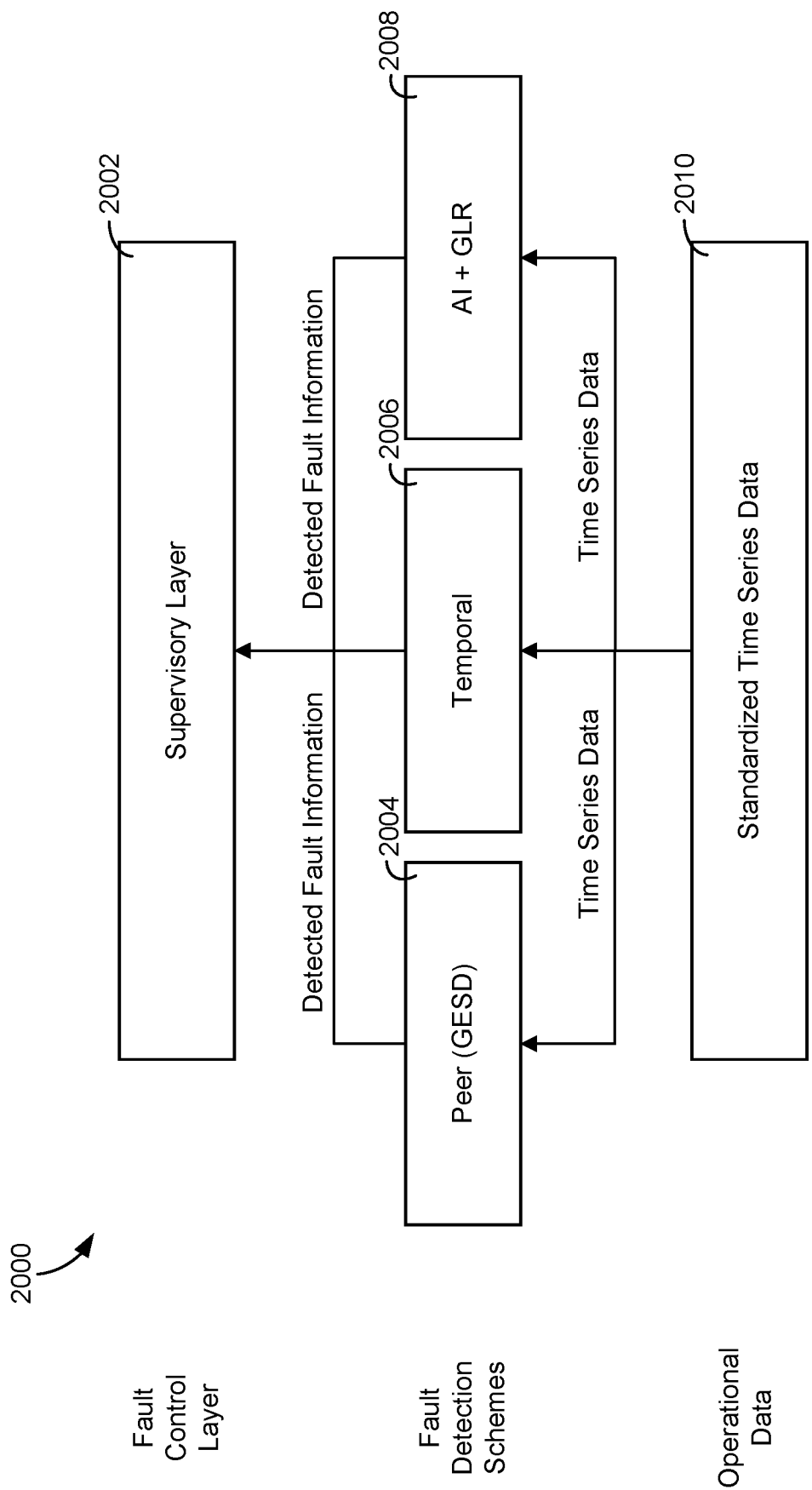
FIG. 20 is a block diagram of a system that implements fault detection functionality, according to some embodiments.

Referring now to FIG. 20, system 2000 illustrates the functionality of AI FDD manager 1902 for determining fault conditions in a control system based on one or more fault indicators is shown, according to exemplary embodiments. System 2000 may make control decisions based a determination for whether a fault has been detected within an HVAC system (e.g., system 100, central plant 200, airside system 300, BMS 400. In some embodiments, system 2000 determines not only whether a fault has been detected, but also the type, criticality, location, or other parameters related to the fault. System 2000 may be configured to receive data relating to operation of HVAC system 100, determine several fault detections (e.g., via temporal detection, via peer detection, via AI+Generalized Likelihood Ratio (GLR) detection, etc.). Then, system 2000 may make control decisions based on the received control detections. System 2000 is shown to include standardized time series data ("data") 2010, Peer (GESD) ("peer detection method") 2004, temporal ("temporal detection method") 2006, AI+GLR ("AI detection method") 2008, and supervisory layer 2002.

Data 2010 may be configured to provide various operational data to a controller (e.g., BMS controller 366, MPM controller 1302, MPM controller 1102, etc.). Data 2010 may include time series data, wherein the data is a series of data points indexed in time order. The time series data may be a sequence taken at successive equally spaced points in time (e.g., 5 ms, 50 ms, 500 ms, etc.) and is thus a sequence of discrete-time data. In some embodiments, data 2010 includes information relating to compressor speeds, compressor current, pump speeds, power out, power input, operating voltage, operating current, pump pressure, and temperature measurements. These types of a data are meant to be exemplary and are not intended to be limiting. As such, data 2010 may include significantly more types of data relating to equipment (e.g., boilers, chillers, pumps, compressors, VAV boxes, AHU's, etc.) operation within HVAC system 100.

In some embodiments, data 2010 is sent simultaneously (e.g., several data sets are sent at the same time). For example, the pump speed, pump pressure, operating voltage, and temperature of pumps 222 and 224 are provided at the same time to a controller. In other embodiments, data 2010 is sent discreetly (e.g., one piece of data at a time). In some embodiments, data 2010 will have a constant mean and variance, except for when a fault is injected into the data. Because the incoming data has constant mean and variance, the incoming data will be standardized (e.g., converted to zero mean and unit variance using the equation: $x_{std}=(x_{in}-\bar{x})/\sigma$, where $\bar{x}$ is the mean, and a is the standard deviation, etc.) before being sent to the detection schemes (e.g., peer detection method 2004 or temporal detection method 2006 or AI detection method 2008, etc.).

Data 2010 may typically be implemented as floating point numbers, however data 2010 may include any type of data formatting typically found in computing (e.g., Not a Number (NaN), integer, fixed point, double, single precision, double precision, etc.). In some embodiments, data 2010 will be received and analyzed in a "sliding window" approach, where new data 2010 will be added to the detection scheme, and old data will be "forgotten" after a period of time (e.g., 100 ms, 1 minute, 10 minutes, 1 hour, 1 day, 1 year, etc.) such that the detection window will "slide" through time. This may be necessary to support the time series nature of the data, and to support detection over a very long period of time (e.g., years), without loss of accuracy.

Peer detection method 2004 (and similarly temporal detection method 2006 and AI detection method 2008) may be various processes and/or methods implemented by a building controller to detect and determine faults in a system. Peer detection method 2004 is shown to receive time series data from data 2010 and provide detected fault information to supervisory layer 2002. In some embodiments, peer detection method 2004 is one method for detecting faults considered by system 2000, wherein multiple different methods for detecting faults are considered. Then the detected fault information is weighed against other methods that have provided detected fault information to supervisory layer 2002 to determine the most accurate fault detection information and appropriate control response.

In some embodiments, peer detection method 2004 is configured to identify which HVAC devices in a system (e.g., HVAC system 100) are operating differently than the other HVAC devices. For example, peer detection method 2004 may consider past operational data of several AHU's operating in system 100. Based on the a priori operational information, peer detection method 2004 may be able to determine that one of the several AHU's is malfunctioning based on its received operational data being distinctly different (e.g., an outlier) than the other AHU's operational data.

Temporal method 2006 may be another detection method considered by supervisory layer 2002. In some embodiments, temporal method 2006 is configured to calculate one or more linear regression coefficients at each time step of the provided data 2010 (e.g., time series data). Temporal method 2006 may then monitor how those coefficients change over time.

AI detection method 2008 may be another detection method considered by supervisory layer 2002. AI detection method 2008 may be configured to use an auto-encoder neural network (NN) as a control model to calculate an output of the system. In some embodiments, output of the NN and the measured output are provided to a statistic calculator. The calculator may then produce a single number (e.g., a GLR statistic, etc.) which is provided to supervisory layer 2002 and used to determine if there is a fault. AI detection method 2008 is described in greater detail below with reference to FIG. 20.

Figure 21:
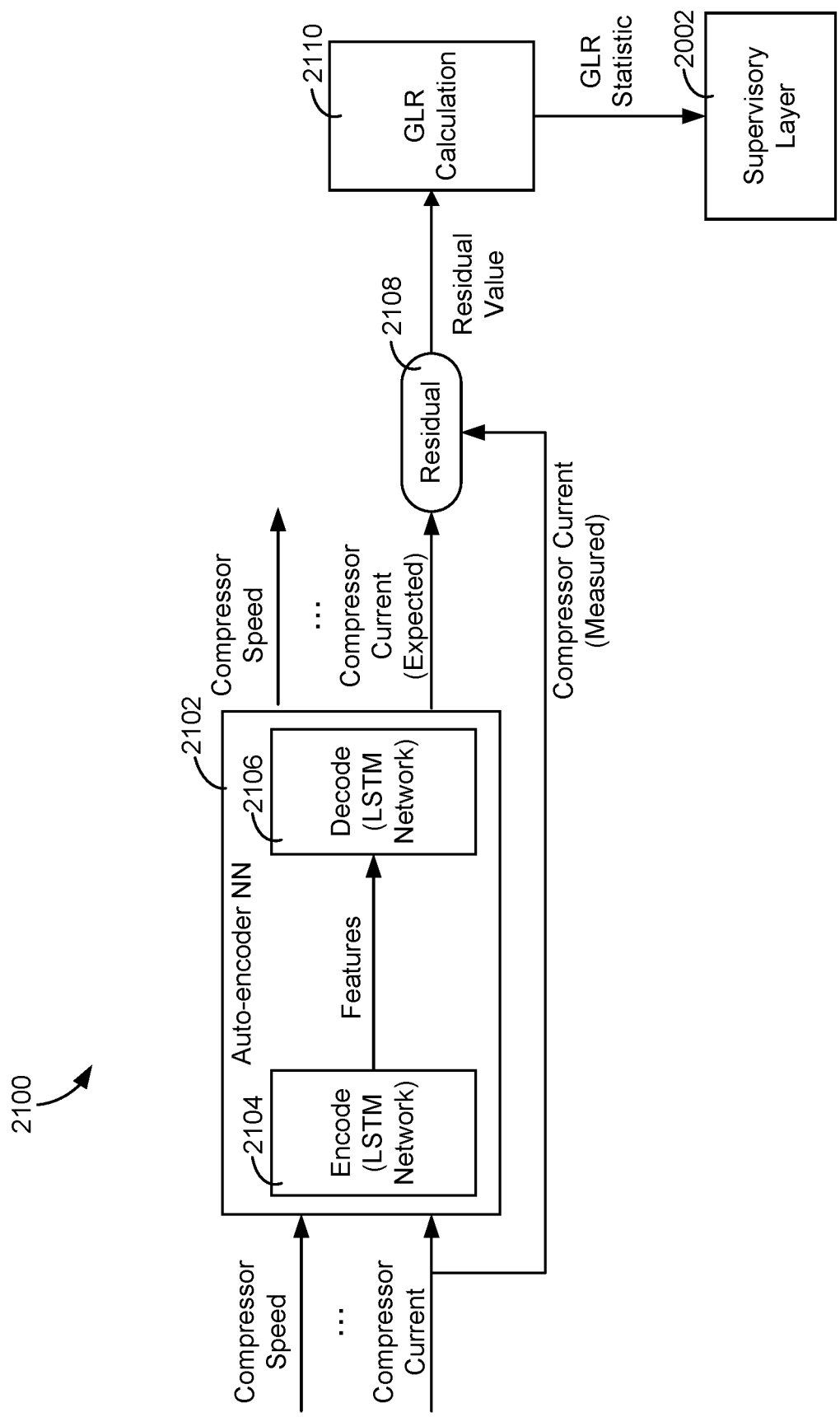
FIG. 21 is a block diagram of a portion of the system of FIG. 20 in greater detail, according to some embodiments.

Referring now to FIG. 21, a diagram 2100 of the functionality of AI FDD manager 1902, or more particularly, AI detection method 2008 is shown, according to some embodiments. Diagram 2100 provides fault information based on decisions made by auto-encoder neural network 2102 as shown, according to exemplary embodiments. The system described in diagram 2100 may be incorporated partially or entirely in the various systems described herein, and vice versa. For example, the system or functionality described in diagram 2100 may be incorporated into MPM system 1900. Diagram 2100 is shown to include auto-encoder neural network 2102 including an encode module 2104, a decode module 2106, a residual module 2108, a GLR calculation module 2110, and supervisory layer 2002. Diagram 2100 may describe systems and/or process that can be implemented by AI FDD manager 1902 (e.g., a fault adaptive controller).

Auto-encoder neural network 2102 may be or include functionality that receives various sets of operational data of an HVAC system (e.g., pump speed, temperature measurements, compressor operating voltage, compressor speed, current measurements, etc.) and uses the received data to train a neural network. When used for fault detection, auto-encoder neural network 2102 may be trained on only good data. For example, when a fault happens and the input data is changed due to the fault, auto-encoder neural network 2102 will not be able to duplicate the new faulty data and will instead reproduce only the equivalent good data, because auto-encoder neural network 2102 "knows" is how to produce good data. In other embodiments, both bad data (e.g., erroneous data intentionally provided to auto-encoder neural network 2102 for training purposes) and good data are provided to auto-encoder neural network 2102. Auto-encoder neural network 2102 can be or include any type of neural network, include long short-term memory, a recursive neural network, a WindowResidualDetector detector class of MATLAB, or a convolutional neural network. In some embodiments, auto-encoder neural network 2102 is a long short-term memory (LSTM) neural network that attempts to match the calculated output to the received input using the weighted hidden layers of a neural network process. This may be done to determine an estimation of the received data.

Residual module 2108 may receive the actual measured data and estimated data generated by auto-encoder neural network 2102 to determine the residual. As described herein, the residual may refer to the difference between the estimated data and the measured data. In some embodiments, the difference between the output of auto-encoder neural network 2102 and the measured output is used to calculate a residual. A residual value is the difference between a measured value and expected value, and can be represented by the following equation: r=y−ŷ, where y is the measured data, and ŷ is the data calculated from the model. In some embodiments, the residual is provided to a statistical calculator (e.g., GLR calculation module 2110) and implemented in the following equation:

$$g_k = \frac{1}{2\sigma^2} \max_{1 \le j \le k} \left( \frac{1}{k-j+1} \left[ \sum_{i=j}^{k} r[i] \right]^2 \right)$$

to calculate the GLR statistic, $g_k$, at every time step. Then, $g_k$ is sent to supervisory layer 2002 for final fault determination.

For example, auto-encoder neural network 2102 receives five pieces of data: compressor speed, $P_s$, $P_d$, $T_d$, and compressor current. While auto-encoder neural network 2102 reproduces all 5 pieces of data, only the compressor current is considered for fault detection. The measured compressor current data is provided to residual 2108, along with the expected compressor current data, to determine the residual value. The residual value is provided to GLR calculation module 2110 to determine a GLR statistic, which is provided to supervisory layer 2002 and is indicative of fault detection.

In some embodiments, the systems and methods described in diagram 2100 outline one of several methods for determining faults in an HVAC system. Particularly, diagram 2100 utilizes analyzing a difference between expected and measured measurements (e.g., a residual), and making inferences on faults (e.g., stuck valve, malfunctioning compressor, low pump speed, etc.) based on the residual. This information may be provided to a supervisory layer of a building controller (e.g., supervisory layer 2002) to determine whether corrective action needs to be taken based on the detected fault information (e.g., the GLR statistic).

Referring again to FIG. 19, runtime manager 1312 can be configured to receive an output from AI FDD manager 1902 (e.g., an output of supervisory layer 2002 and/or AI detection method 2008) to determine if a fault has been detected. In some embodiments, a fault detection output of AI FDD manager 1902 indicates that a trigger condition has been satisfied and that runtime manager 1312 should initiate model predictive optimizer 1120.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A model predictive maintenance (MPM) system for building equipment, the MPM system comprising:
one or more processing circuits comprising one or more processors and memory storing instructions that, when executed by the one or more processors, cause the one or more processors to perform operations comprising:
at a first time, predicting a future state of the building equipment predicted to occur at a second time after the first time;
obtaining one or more performance indicators for the building equipment indicating an actual state of the building equipment at a second time;
determining whether a trigger condition has been satisfied based on the one or more performance indicators by comparing the actual state of the building equipment at the second time with the predicted future state of the building equipment predicted to occur at the second time;
triggering a model predictive maintenance process to generate a maintenance schedule for the building equipment and operating decisions for the building equipment in response to determining that the trigger condition has been satisfied, wherein the model predictive maintenance process comprises:
  predicting a resource consumption of the building equipment over an optimization period as a function of an estimated degradation state of the building equipment;
  defining a cost of operating the building equipment over the optimization period as a function of the predicted resource consumption;
  defining a cost of performing maintenance on the building equipment over the optimization period as a function of the maintenance schedule for the building equipment; and
  optimizing an objective function including the cost of operating the building equipment and the cost of performing maintenance on the building equipment to determine the maintenance schedule;
  initiating a maintenance activity for the building equipment in accordance with the maintenance schedule; and
  controlling the building equipment by generating electronic control signals based on the operating decisions for the building equipment and causing the building equipment to affect a variable state or condition in a building using the electronic control signals.

2. The MPM system of claim 1, wherein the one or more performance indicators comprise at least one of an estimated current degradation of the building equipment, a predicted future degradation of the building equipment, or a performance variable of the building equipment, wherein the operations further comprise:
  comparing the estimated current degradation, the predicted future degradation, or the performance variable of the building equipment to a corresponding threshold; and
  determining that the trigger condition has been satisfied in response to the estimated current degradation, the predicted future degradation, or the performance variable crossing the corresponding threshold.

3. The MPM system of claim 1, wherein the one or more performance indicators comprise a rate of change of at least one of an estimated current degradation of the building equipment, a predicted future degradation of the building equipment, or a performance variable of the building equipment, wherein the operations further comprise:
  comparing the rate of change of the estimated current degradation, the predicted future degradation, or the performance variable of the building equipment to a corresponding threshold rate of change; and
  determining that the trigger condition is satisfied in response to the rate of change of the estimated current degradation, the predicted future degradation, or the performance variable crossing the corresponding threshold rate of change.

4. The MPM system of claim 1, wherein the operations further comprise:
  determining a variance or a covariance of at least one of the one or more performance indicators of the building equipment;
  comparing the variance or covariance to a corresponding variance or covariance threshold;
  determining that the trigger condition is satisfied in response to the variance or the covariance and the corresponding variance or covariance threshold.

5. The MPM system of claim 1, wherein the predicted future state of the building equipment is a previously predicted future degradation of the building equipment and the actual state of the building equipment is an actual current degradation of the building equipment, wherein the operations further comprise:
  determining a difference between the previously predicted future degradation of the building equipment and the actual current degradation of the building equipment for the second time, the second time being a corresponding time step;
  comparing the difference to a corresponding difference threshold;
  determining that the trigger condition is satisfied in response to the difference and the corresponding difference threshold.

6. The MPM system of claim 1, wherein the operations further comprise:
  receiving an output of a fault detection circuit, the fault detection circuit configured to receive time series data and perform at least one of a peer detection method, a temporal detection method, and an artificial intelligence detection method to generate the output; and
  determining that the trigger condition is satisfied in response to the output indicating a fault of the building equipment.

7. A method for determining optimal maintenance of building equipment, the method comprising:
  at a first time, predicting a future state of the building equipment predicted to occur at a second time after the first time;
  obtaining one or more performance indicators for the building equipment indicating an actual state of the building equipment at a second time;
  determining whether a trigger condition has been satisfied based on the one or more performance indicators by comparing the actual state of the building equipment at the second time with the predicted future state of the building equipment predicted to occur at the second time;
  triggering a model predictive maintenance process to generate a maintenance schedule for the building equipment and operating decisions for the building equipment in response to determining that the trigger condition has been satisfied, wherein the model predictive maintenance process comprises:
    predicting a resource consumption of the building equipment over an optimization period as a function of an estimated degradation state of the building equipment;
    defining a cost of operating the building equipment over the optimization period as a function of the predicted resource consumption;
    defining a cost of performing maintenance on the building equipment over the optimization period as a function of the maintenance schedule for the building equipment; and
    optimizing an objective function including the cost of operating the building equipment and the cost of performing maintenance on the building equipment to determine the maintenance schedule;
  initiating a maintenance activity for the building equipment in accordance with the maintenance schedule; and
  controlling the building equipment by generating electronic control signals based on the operating decisions for the building equipment and causing the building equipment to affect a variable state or condition in a building using the electronic control signals.

8. The method of claim 7, wherein the one or more performance indicators comprise at least one of an estimated current degradation of the building equipment, a predicted future degradation of the building equipment, or a performance variable of the building equipment, wherein the method further comprises:
   comparing the estimated current degradation, the predicted future degradation, or the performance variable of the building to a corresponding threshold; and
   determining that the trigger condition has been satisfied in response to the estimated current degradation, the predicted future degradation, or the performance variable crossing the corresponding threshold.

9. The method of claim 7, wherein the one or more performance indicators comprise a rate of change of at least one of an estimated current degradation of the building equipment, a predicted future degradation of the building equipment, or a performance variable of the building equipment, wherein the method further comprises:
   comparing the rate of change of the estimated current degradation, the predicted future degradation, or the performance variable of the building equipment to a corresponding threshold rate of change; and
   determining that the trigger condition has been satisfied in response to the rate of change of the estimated current degradation, the predicted future degradation, or the performance variable crossing the corresponding threshold rate of change.

10. The method of claim 7, further comprising:
    determining a variance or a covariance of at least one of the one or more performance indicators of the building equipment;
    comparing the variance or covariance to a corresponding variance or covariance threshold;
    determining that the trigger condition is satisfied in response to the variance or the covariance crossing the corresponding variance or covariance threshold.

11. The method of claim 7, wherein the predicted future state of the building equipment is a previously predicted future degradation of the building equipment and the actual state of the building equipment is an actual current degradation of the building equipment, wherein the method further comprises:
    determining a difference between the predicted future degradation of the building equipment and the actual current degradation of the building equipment for the second time, the second time being a corresponding time step;
    comparing the difference to a corresponding difference threshold;
    determining that the trigger condition is satisfied in response to the difference crossing the corresponding difference threshold.

12. The method of claim 7, further comprising:
    receiving an output of a fault detection circuit, the fault detection circuit configured to receive time series data and perform at least one of a peer detection method, a temporal detection method, and an artificial intelligence detection method to generate the output; and
    determining that the trigger condition is satisfied in response to the output indicating a fault of the building equipment.

13. The method of claim 7, wherein the model predictive maintenance process further comprises:
    predicting an energy consumption of the building equipment over the optimization period as a function of an estimated efficiency of the building equipment;
    defining the cost of operating the building equipment over the optimization period as a function of the predicted energy consumption;
    defining the cost of performing maintenance on the building equipment over the optimization period as a function of an estimated reliability of the building equipment; and
    optimizing the objective function including the cost of operating the building equipment and the cost of performing maintenance on the building equipment to determine the maintenance schedule.

14. A model predictive maintenance (MPM) controller for building equipment, the MPM controller comprising:
    one or more processing circuits comprising one or more processors and memory storing instructions that, when executed by the one or more processors, cause the one or more processors to perform operations comprising:
        determining whether a trigger condition has been satisfied based on one or more time-varying inputs to the MPM controller and at least one time-varying threshold; and
        triggering a model predictive maintenance process to generate a maintenance schedule for the building equipment and operating decisions for the building equipment in response to determining that the trigger condition has been satisfied, wherein the model predictive maintenance process comprises:
            predicting a resource consumption of the building equipment over an optimization period as a function of an estimated degradation state of the building equipment;
            defining a cost of operating the building equipment over the optimization period as a function of the predicted resource consumption;
            defining a cost of performing maintenance on the building equipment over the optimization period as a function of the maintenance schedule for the building equipment; and
            optimizing an objective function including the cost of operating the building equipment and the cost of performing maintenance on the building equipment to determine the maintenance schedule; and
        initiating a maintenance activity for the building equipment in accordance with the maintenance schedule; and
        controlling the building equipment by generating electronic control signals based on the operating decisions for the building equipment and causing the building equipment to affect a variable state or condition in a building using the electronic control signals.

15. The MPM controller of claim 14, wherein the one or more time-varying inputs comprise at least one of an estimated current degradation of the building equipment, a predicted future degradation of the building equipment, or a performance variable of the building equipment, wherein the operations further comprise:
    comparing the estimated current degradation, the predicted future degradation, or the performance variable of the building equipment to a corresponding threshold; and
    determining that the trigger condition is satisfied in response to the comparison between the estimated current degradation, the predicted future degradation, or the performance variable crossing the corresponding threshold.

16. The MPM controller of claim 14, wherein the one or more time-varying inputs comprise a rate of change of at least one of an estimated current degradation of the building equipment, a predicted future degradation of the building equipment, or a performance variable of the building equipment, wherein the operations further comprise:
- comparing the rate of change of the estimated current degradation, the predicted future degradation, or the performance variable of the building equipment to a corresponding threshold rate of change; and
- determining that the trigger condition is satisfied in response to the comparison between the rate of change of the estimated current degradation, the predicted future degradation, or the performance variable crossing the corresponding threshold rate of change.

17. The MPM controller of claim 14, wherein the operations further comprise:
- determining a variance or a covariance of at least one of the one or more time-varying inputs;
- comparing the variance or covariance to a corresponding variance or covariance threshold;
- determining that the trigger condition is satisfied in response to the variance or the covariance crossing the corresponding variance or covariance threshold.

18. The MPM controller of claim 14, wherein the one or more time-varying inputs comprise a previously predicted future degradation of the building equipment and an estimated current degradation of the building equipment, wherein the operations further comprise:
- determining a difference between the previously predicted future degradation of the building equipment and the estimated current degradation of the building equipment for a corresponding time step;
- comparing the difference to a corresponding difference threshold;
- determining that the trigger condition is satisfied in response to the difference crossing the corresponding difference threshold.

19. The MPM controller of claim 14, wherein the operations further comprise:
- receiving an output of a fault detection circuit, the fault detection circuit configured to receive time series data and perform a peer detection method, a temporal detection method, and an artificial intelligence detection method to generate the output; and
- determining that the trigger condition is satisfied in response to the output indicating a fault of the building equipment.

* * * * *